US011222415B2

(12) United States Patent
Ozcan et al.

(10) Patent No.: US 11,222,415 B2
(45) Date of Patent: Jan. 11, 2022

(54) SYSTEMS AND METHODS FOR DEEP LEARNING MICROSCOPY

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Hongda Wang, Los Angeles, CA (US); Harun Gunaydin, Los Angeles, CA (US); Kevin de Haan, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/395,674

(22) Filed: Apr. 26, 2019

(65) Prior Publication Data
US 2019/0333199 A1   Oct. 31, 2019

Related U.S. Application Data

(60) Provisional application No. 62/662,943, filed on Apr. 26, 2018, provisional application No. 62/670,612, (Continued)

(51) Int. Cl.
*G06T 5/50*   (2006.01)
*G06N 3/08*   (2006.01)
(Continued)

(52) U.S. Cl.
CPC ............... *G06T 5/50* (2013.01); *G06N 3/08* (2013.01); *G06T 3/4076* (2013.01); *G06T 5/002* (2013.01);
(Continued)

(58) Field of Classification Search
CPC ...... G06N 3/0481; G06N 3/0454; G06N 3/08; G06N 3/0472; G06N 3/084; G06N 3/088;
(Continued)

(56) References Cited

U.S. PATENT DOCUMENTS

2012/0099803 A1   4/2012   Ozcan et al.
2012/0148141 A1   6/2012   Ozcan et al.
(Continued)

OTHER PUBLICATIONS

Rivenson, Yair et al., Deep learning-based virtual histology staining using auto-fluorescence of label-free tissue, arXiv:1803.11293 [cs.CV], Apr. 2, 2018 (22 pages).
(Continued)

*Primary Examiner* — Brenda C Bernardi
(74) *Attorney, Agent, or Firm* — Vista IP Law Group LLP

(57) ABSTRACT

A microscopy method includes a trained deep neural network that is executed by software using one or more processors of a computing device, the trained deep neural network trained with a training set of images comprising co-registered pairs of high-resolution microscopy images or image patches of a sample and their corresponding low-resolution microscopy images or image patches of the same sample. A microscopy input image of a sample to be imaged is input to the trained deep neural network which rapidly outputs an output image of the sample, the output image having improved one or more of spatial resolution, depth-of-field, signal-to-noise ratio, and/or image contrast.

21 Claims, 37 Drawing Sheets

Related U.S. Application Data filed on May 11, 2018, provisional application No. 62/698,581, filed on Jul. 16, 2018, provisional application No. 62/798,336, filed on Jan. 29, 2019.

(51) Int. Cl.
*G06T 3/40* (2006.01)
*G06T 5/00* (2006.01)

(52) U.S. Cl.
CPC .............. *G06T 5/003* (2013.01); *G06T 5/009* (2013.01); *G06T 2207/10056* (2013.01); *G06T 2207/10064* (2013.01); *G06T 2207/10101* (2013.01); *G06T 2207/20081* (2013.01); *G06T 2207/20084* (2013.01); *G06T 2207/30024* (2013.01)

(58) Field of Classification Search
CPC ..... G06T 3/4053; G06T 5/009; G06T 3/4076; G06T 3/4046; G06T 5/002; G06T 5/003; G06T 5/50; G06T 2207/30024; G06T 2207/10064; G06T 2207/20084; G06T 2207/20081; G06T 2207/10056; G06T 2207/10101

See application file for complete search history.

(56) References Cited

U.S. PATENT DOCUMENTS

| | | |
|---|---|---|
| 2012/0157160 A1 | 6/2012 | Ozcan et al. |
| 2012/0218379 A1 | 8/2012 | Ozcan et al. |
| 2012/0248292 A1 | 10/2012 | Ozcan et al. |
| 2012/0281899 A1 | 11/2012 | Ozcan et al. |
| 2013/0092821 A1 | 4/2013 | Ozcan et al. |
| 2013/0157351 A1 | 6/2013 | Ozcan et al. |
| 2013/0193544 A1 | 8/2013 | Ozcan et al. |
| 2013/0203043 A1 | 8/2013 | Ozcan et al. |
| 2013/0258091 A1 | 10/2013 | Ozcan et al. |
| 2013/0280752 A1 | 10/2013 | Ozcan et al. |
| 2014/0120563 A1 | 5/2014 | Ozcan et al. |
| 2014/0160236 A1 | 6/2014 | Ozcan et al. |
| 2014/0300696 A1 | 10/2014 | Ozcan et al. |
| 2015/0111201 A1 | 4/2015 | Ozcan et al. |
| 2015/0153558 A1 | 6/2015 | Ozcan et al. |
| 2015/0204773 A1 | 7/2015 | Ozcan et al. |
| 2015/0357083 A1 | 12/2015 | Ozcan et al. |
| 2016/0070092 A1 | 3/2016 | Ozcan et al. |
| 2016/0161409 A1 | 6/2016 | Ozcan et al. |
| 2016/0327473 A1 | 11/2016 | Ozcan et al. |
| 2016/0334614 A1 | 11/2016 | Ozcan et al. |
| 2017/0153106 A1 | 6/2017 | Ozcan et al. |
| 2017/0160197 A1 | 6/2017 | Ozcan et al. |
| 2017/0168285 A1 | 6/2017 | Ozcan et al. |
| 2017/0220000 A1 | 8/2017 | Ozcan et al. |
| 2018/0003686 A1 | 1/2018 | Ozcan et al. |
| 2018/0052425 A1 | 2/2018 | Ozcan et al. |
| 2018/0196193 A1 | 7/2018 | Ozcan et al. |
| 2018/0373921 A1 | 12/2018 | Di Carlo et al. |
| 2019/0272638 A1* | 9/2019 | Mouton .................. G06T 5/002 |
| 2020/0184637 A1* | 6/2020 | El-Zehiry .............. G06K 9/628 |
| 2020/0250794 A1* | 8/2020 | Zimmer ................ G06T 3/4076 |
| 2020/0372635 A1* | 11/2020 | Veidman ................... G06T 7/11 |

OTHER PUBLICATIONS

Abadi, Martin et al., TensorFlow: A system for large-scale machine learning, https://github.com/tensorflow/tensorflow, arXiv:1605.08695v2 [cs.DC] Mar. 31, 2016, pp. 1-18.

Bishara, Waheb et al., Lensfree on-chip microscopy over a wide field-of-view using pixel super-resolution, Optics Expresss, May 24, 2018, vol. 18, No. 11, 11181-11191.

Farsiu, Sina et al., Fast and Robust Multiframe Super Resolution, IEEE Transactions on Image Processing, vol. 13, No. 10, Oct. 2004, pp. 1327-1344.

Goodfellow, Ian J. et al., Generative Adversarial Nets, date: unknown; http://www.github.com/goodfell/adversarial (9 pages).

Greenbaum, Alon et al., Maskless imaging of dense samples using pixel super-resolution based multi-height lensfree on-chip microscopy, Jan. 30, 2012, vol. 20, No. 3, Optics Express, pp. 3129-3143.

Hayat, Khizar et al., Super-Resolution via Deep Learning, arXiv:1706.09077v1 [cs.CV[ Jun. 28, 2017 (33 pages).

He, Kaiming et al., Deep Residual Learning for Image Recognition, http://image-net.org/challenges/LSVRC/2015/ and http://mscoco.org/dataset/#detections-challenge20158, pp. 770-778 (2016).

Huang, Xiwei et al., Machine Learning Based Single-Frame Super-Resolution Processing for Lensless Blood Cell Counting, Sensors 2016, 16, 1836; doi:10.3390/s16111836, www.mdpi.com/journal/sensors.

Kingma, Diederik P. et al., Adam: A Method for Stochastic Optimization, Published as a conference paper at ICLR 2015, arXiv:1412.6980v9 [cs.LG] Jan. 30, 2017, pp. 1-15.

Ledig, Christian et al., Photo-Realistic Single Image Super-Resolution Using a Generative Adversarial Network, Computer Vision Foundation, date: unknown, pp. 4681-4690.

Li, Dong et al., Extended-resolution structured illumination imaging of endocytic and cytoskeletal dynamics, Science. Aug. 28, 2015; 346(6251):aab3500. doi:10.1126/science.aab3500 (26 pages).

Liu, Tairan et al., Deep Learning-based super-resolution in coherent imaging systems, Scientific Reports (2019) 9:3926; https://doi.org/10.1038/s41598-019-40554-1 (13 pages).

Luo, Wei et al., Propagation phasor approach for holographic image reconstruction, Scientific Reports, 6:22738, DOI:10.1038/srep22738, pp. 1-14.

Rivenson, Yair et al., Deep learning-based virtual histology staining using auto-fluorescence of label-free tissue, arXiv: 1803 11293 [cs.CV], May 30, 2018 (22 pages).

Rivenson, Yair et al., Phase recovery and holographic image reconstruction using deep learning in neural networks, ArXiv170504286 Phys. (2017) (30 pages).

Rivenson, Yair et al., Deep learning microscopy, vol. 4, No. 11, Nov. 2017, Optica, pp. 1437-1443.

Ronneberger, Olaf et al., U-Net: Convolutional Networks for Biomedical Image Segmentation, arXiv:1505.04597v1 [cs.CV] May 18, 2015, pp. 1-8.

Shimobaba, Tomoyoshi et al., Convolutional neural network-based regression for depth prediction in digital holography, arXiv: 1802.00664v1 [cs.CV] Feb. 2, 2018, pp. 1-4.

Sinha, Ayan et al., Lensless computational imaging through deep learning, vol. 4, No. 9, Sep. 2017, Optica, pp. 1117-1125.

Jin, Kyong Hwan et al., Deep Convolutional Neural Network for Inverse Problems in Imaging, IEEE Transactions on Image Processing, vol. 26, No. 9, Sep. 2017, 4509-4522.

Yang, Wenming et al., Deep Learning for Single Image Super-Resolution: A Brief Review, arXiv:1808.03344v1 [cs.CV] Aug. 9, 2018 (15 pages).

Willy, N.M. et al., Membrane mechanics govern spatiotemporal heterogeneity of endocytic clathrin coat dynamics, Molecular Biology of the Cell (2017), 3480-3488.

Wu, Yichen et al., Extended depth-of-field in holographic imaging using deep-learning-based autofocusing and phase recovery, vol. 5, No. 6, Jun. 2018, Optica, pp. 704-710.

Zhang, Yibo et al., Accurate color imaging of pathology slides using holography and absorbance spectrum estimation of histochemical stains, J Biophotonics. 2019; 12:e201800335.

Heinrich, Larissa et al., Deep Learning for Isotropic Super-Resolution from Non-isotropic 3D Electron Microscopy, MICCAI 2017, Part II, LNCS 10434, pp. 135-143 (2017) doi:10.1007/978-3-319-66185-8_16.

Weigert, Martin et al., Isotropic Reconstruction of 3D Fluorescence Microscopy Images Using Convolutional Neural Networks, MICCAI 2017, Part II, LNCS 10434, pp. 126-134 (2017) doi: 10.1007/978-3-319-66185-8_15.

\* cited by examiner

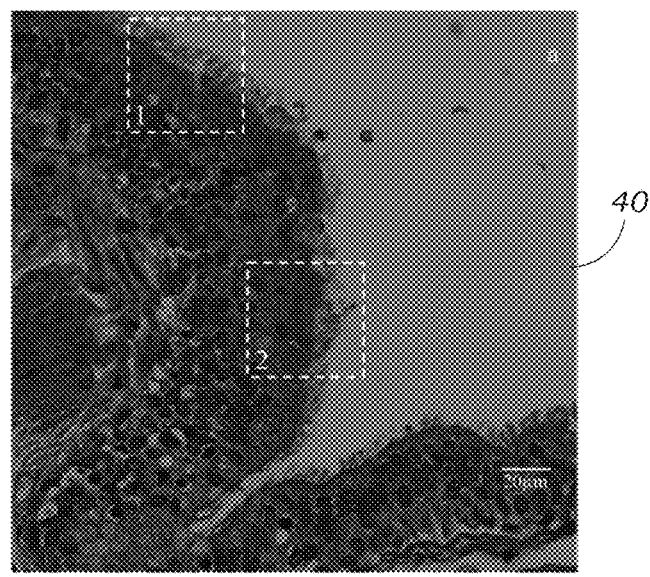
FIG. 6A
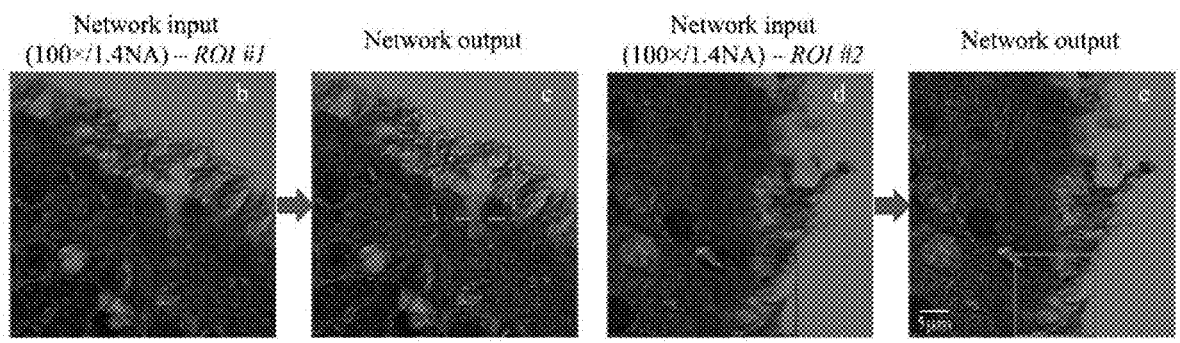
FIG. 6B  FIG. 6C  FIG. 6D  FIG. 6E
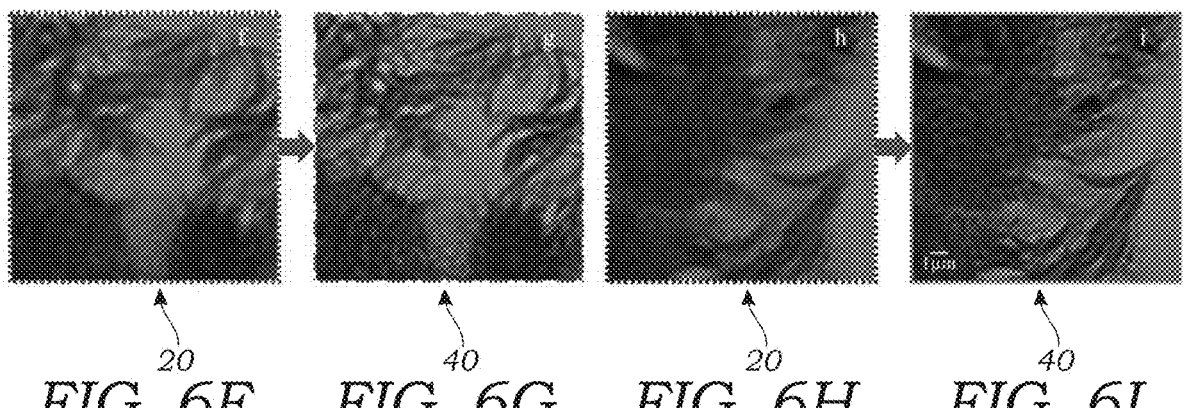
FIG. 6F  FIG. 6G  FIG. 6H  FIG. 6I

FIG. 7A
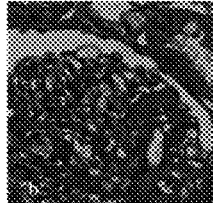 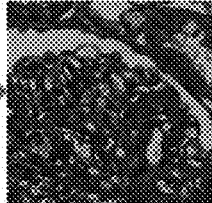   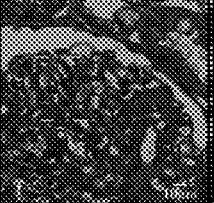
FIG. 7B    FIG. 7C    FIG. 7D    FIG. 7E    FIG. 7F
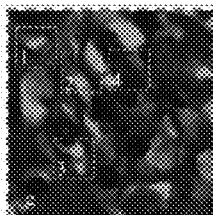 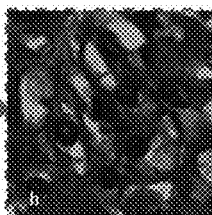 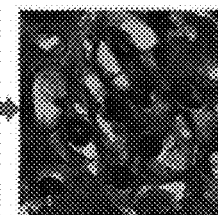  
FIG. 7G    FIG. 7H    FIG. 7I    FIG. 7J    FIG. 7K
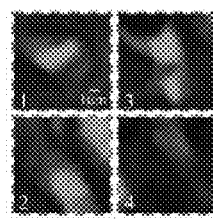 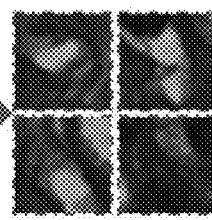 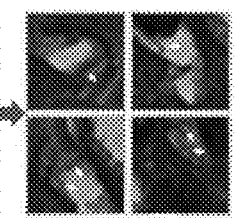 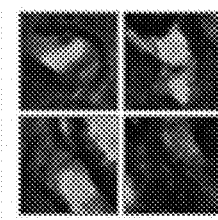 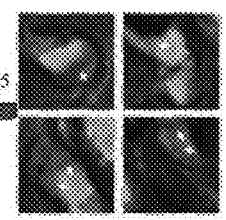
FIG. 7L    FIG. 7M    FIG. 7N    FIG. 7O    FIG. 7P

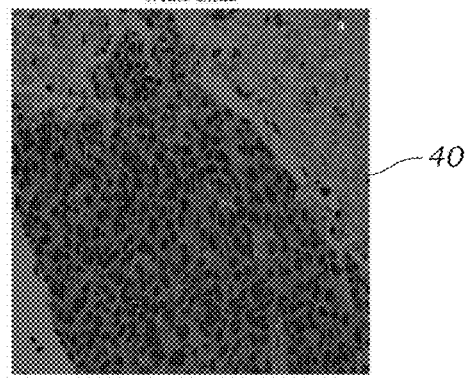
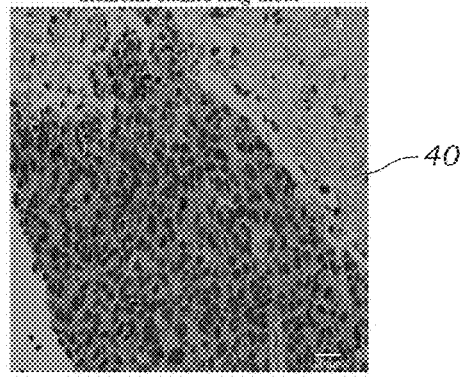
FIG. 8A    FIG. 8B
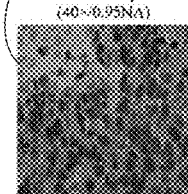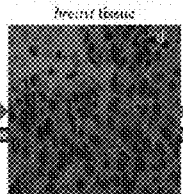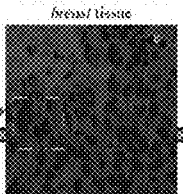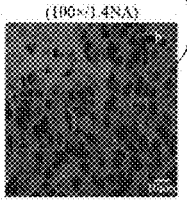
FIG. 8C   FIG. 8D   FIG. 8E   FIG. 8F   FIG. 8G   FIG. 8H
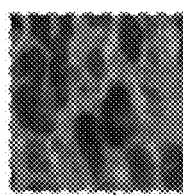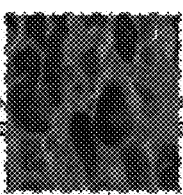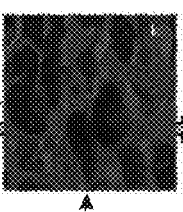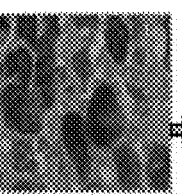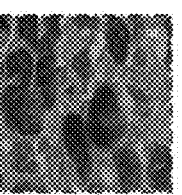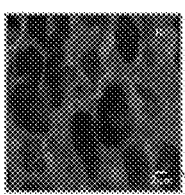
FIG. 8I   FIG. 8J   FIG. 8K   FIG. 8L   FIG. 8M   FIG. 8N Output of the network trained on Masson's trichrome stained *lung* tissue
Output of the network trained on H&E stained breast tissue
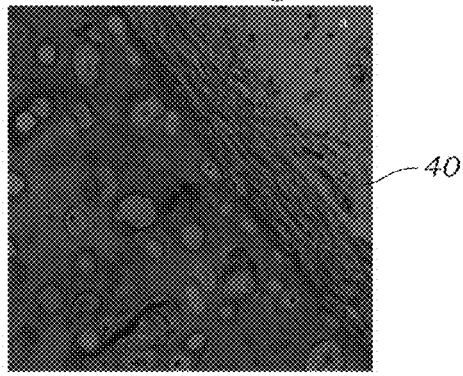
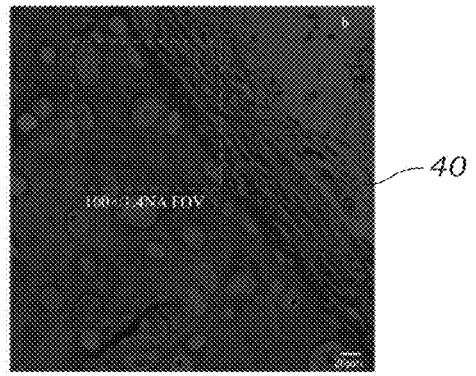
FIG. 9A  FIG. 9B
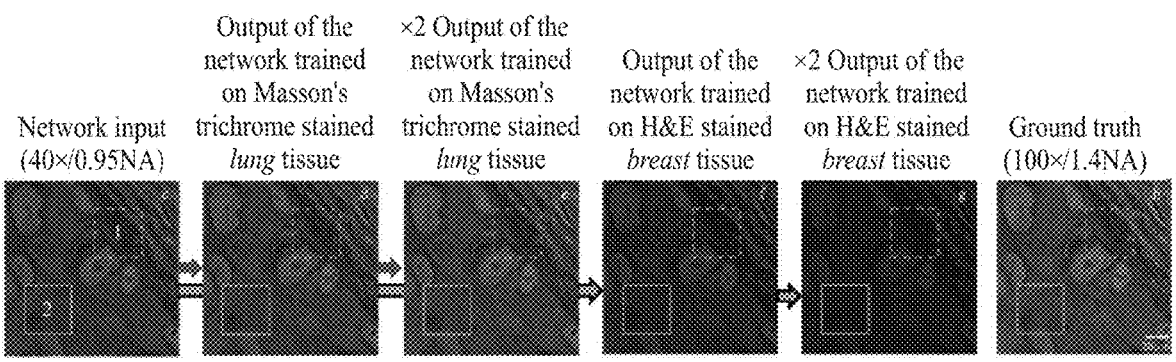
FIG. 9C  FIG. 9D  FIG. 9E  FIG. 9F  FIG. 9G  FIG. 9H
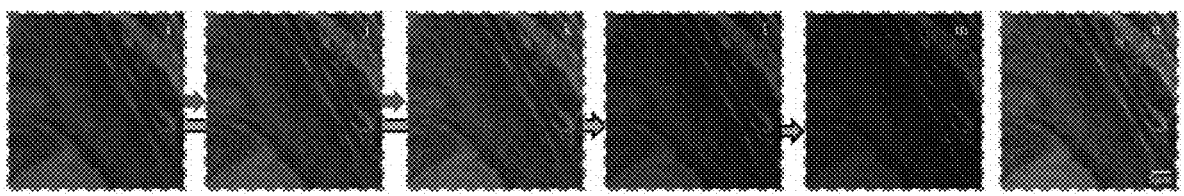
FIG. 9I  FIG. 9J  FIG. 9K  FIG. 9L  FIG. 9M  FIG. 9N
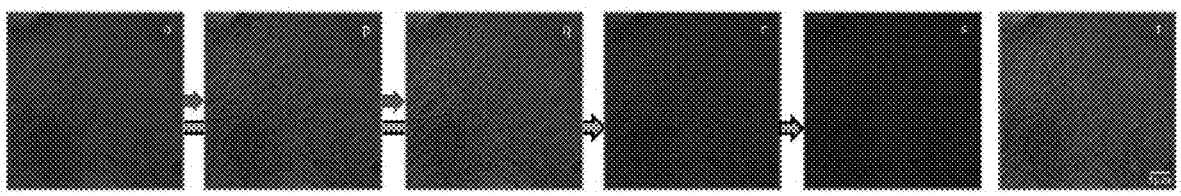
FIG. 9O  FIG. 9P  FIG. 9Q  FIG. 9R  FIG. 9S  FIG. 9T

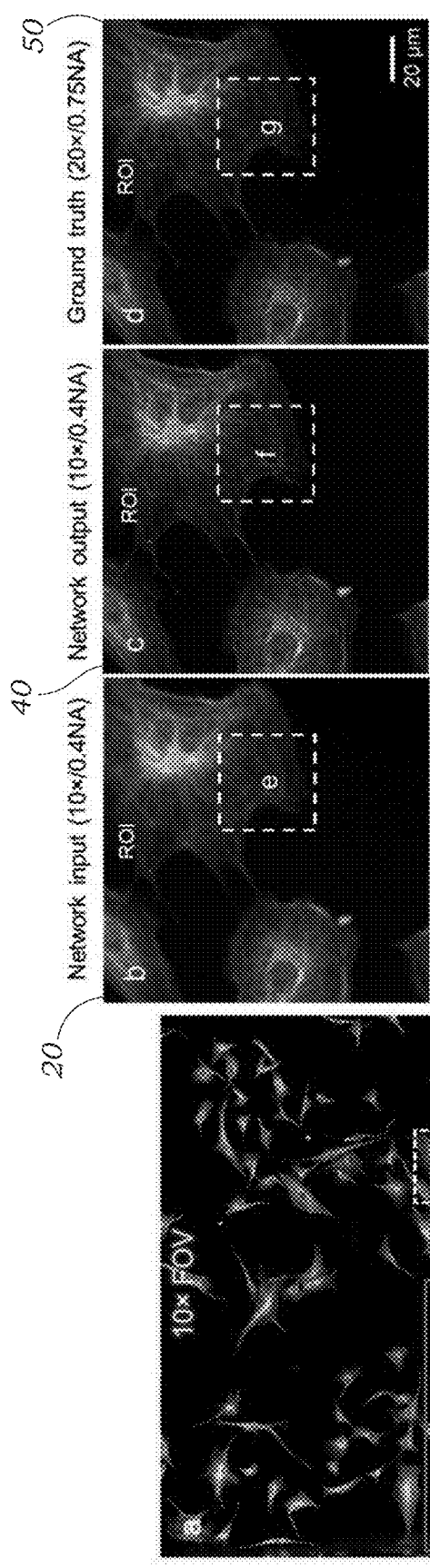
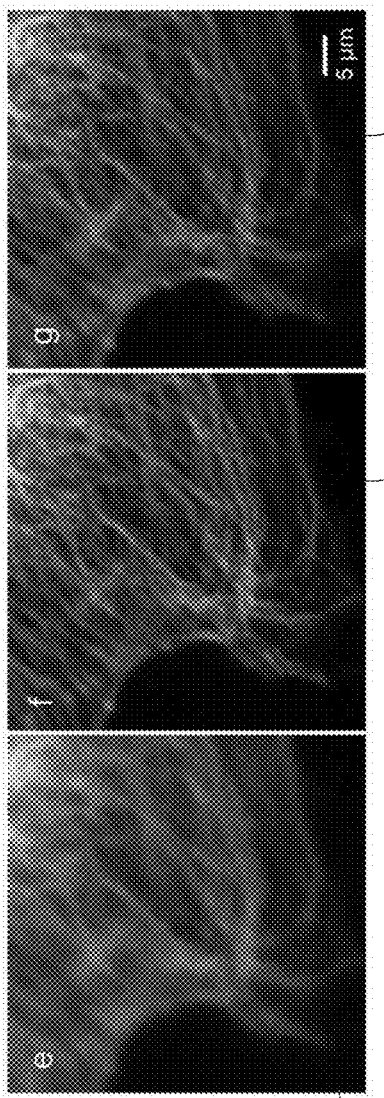
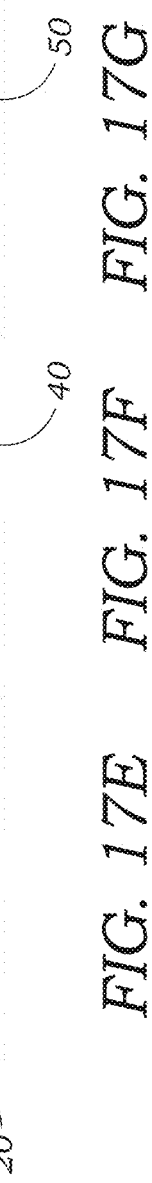
FIG. 17A FIG. 17B FIG. 17C FIG. 17D FIG. 17E FIG. 17F FIG. 17G

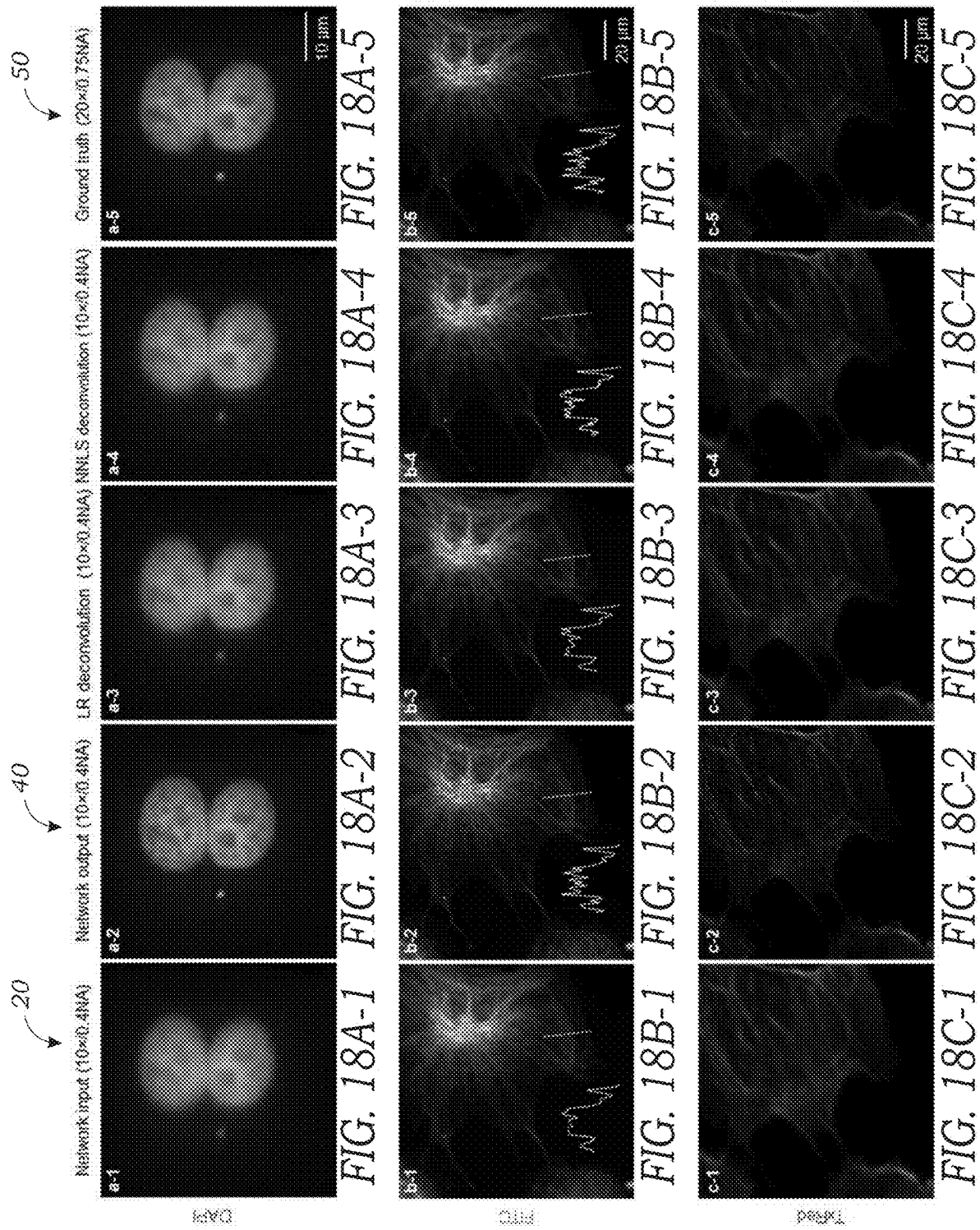

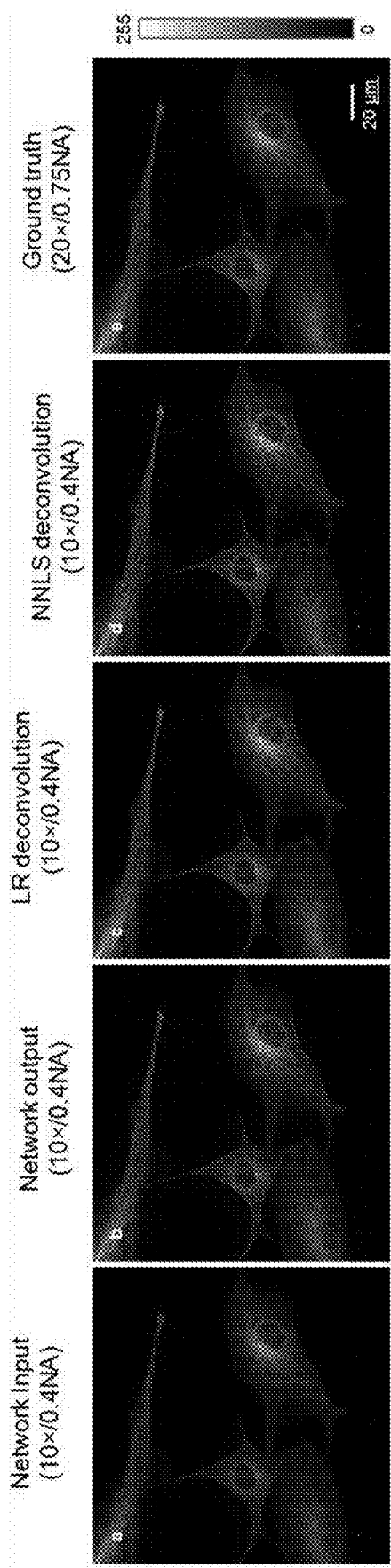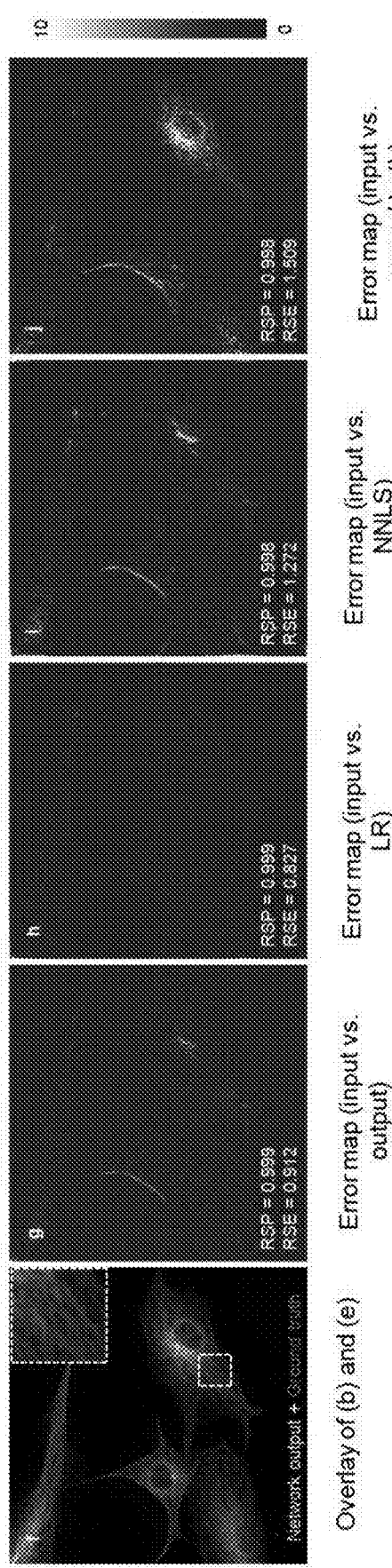
FIG. 19A  FIG. 19B  FIG. 19C  FIG. 19D  FIG. 19E
FIG. 19F  FIG. 19G  FIG. 19H  FIG. 19I  FIG. 19J

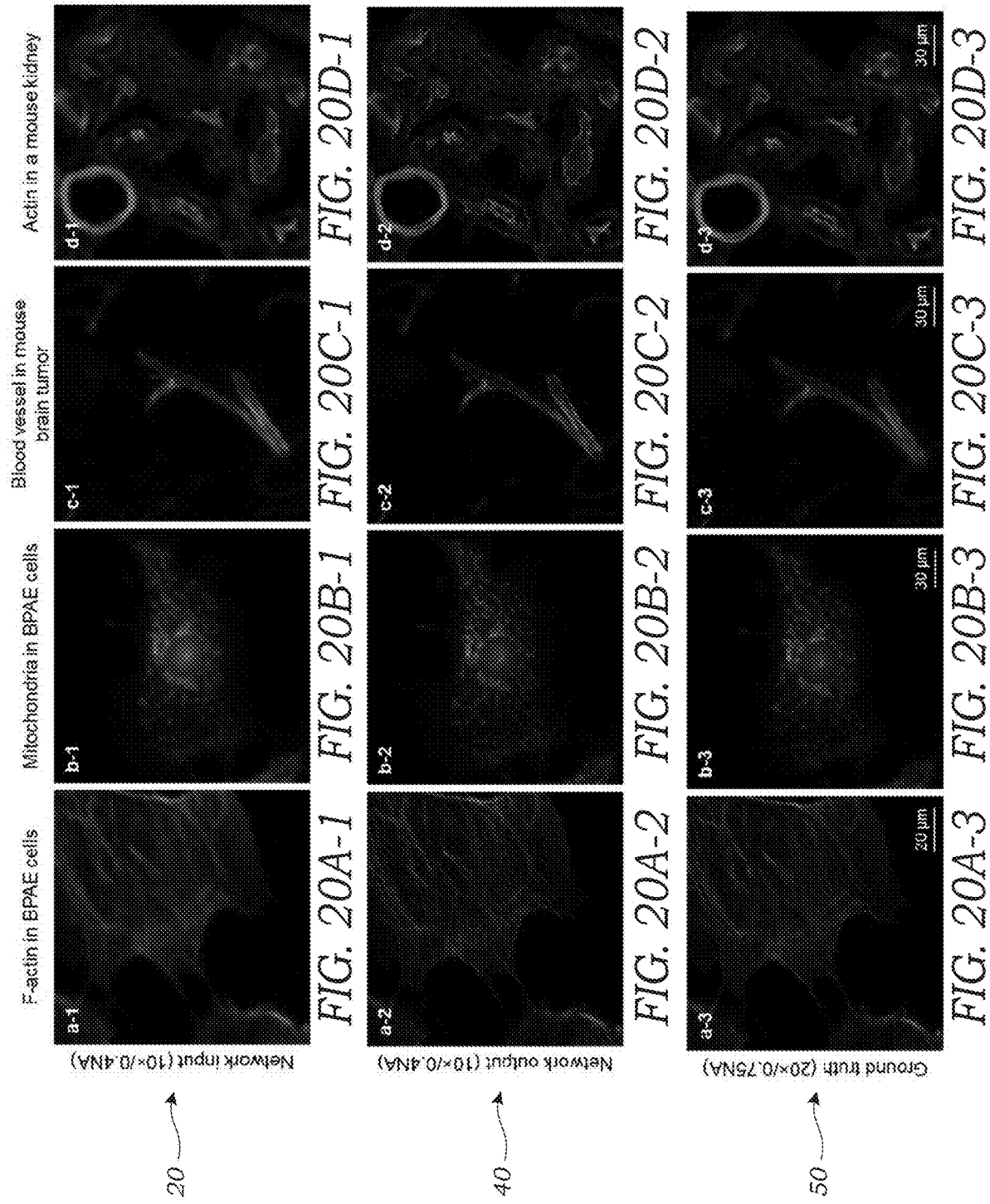

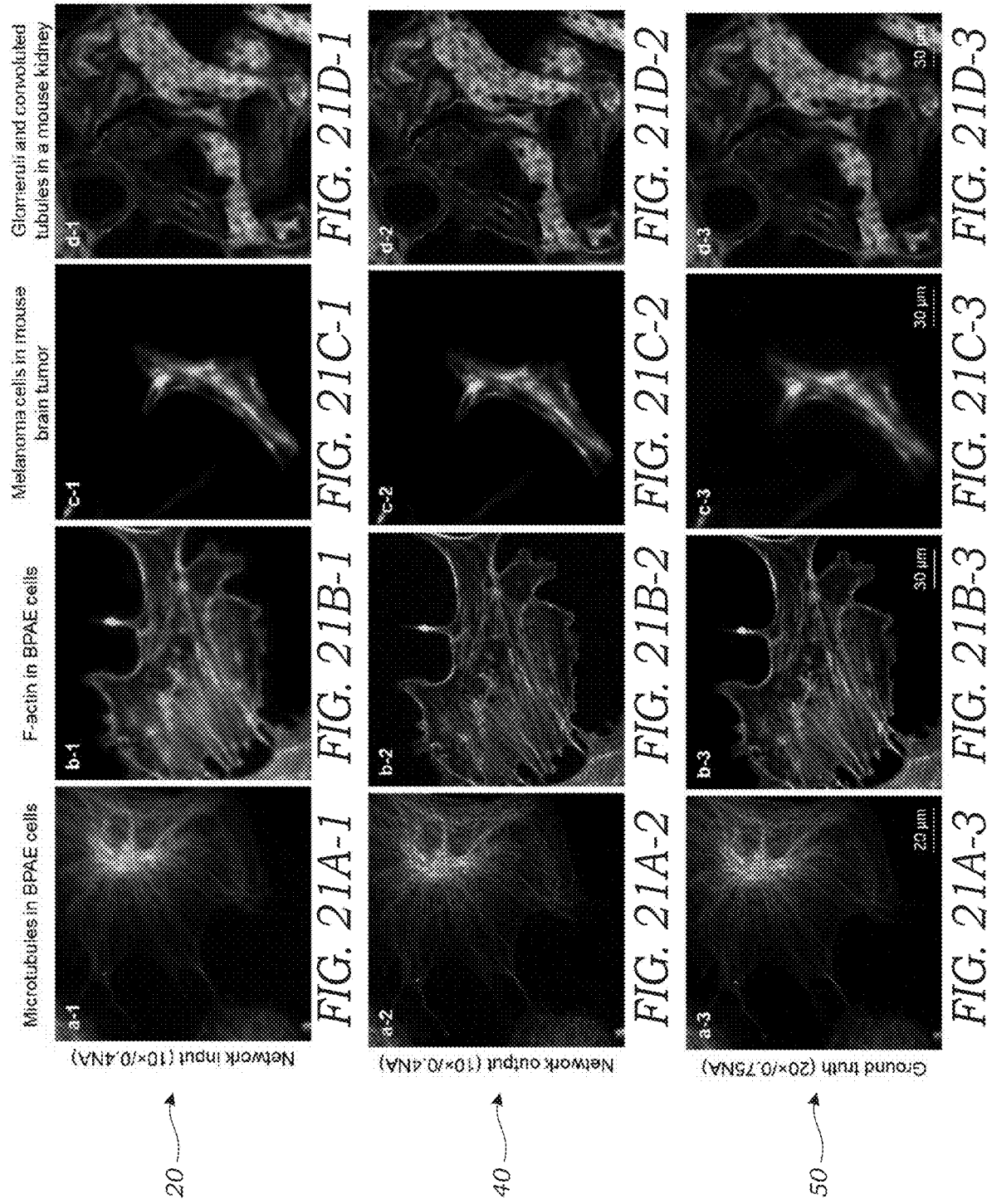

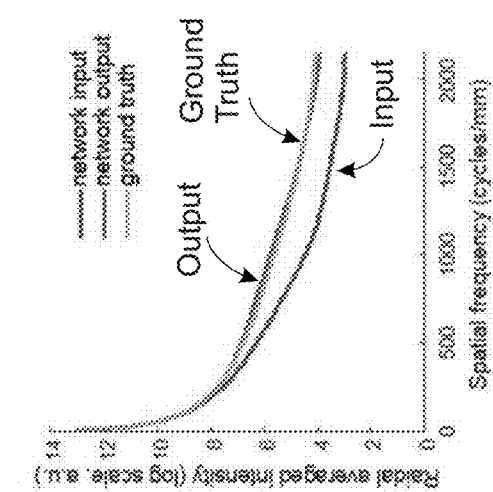
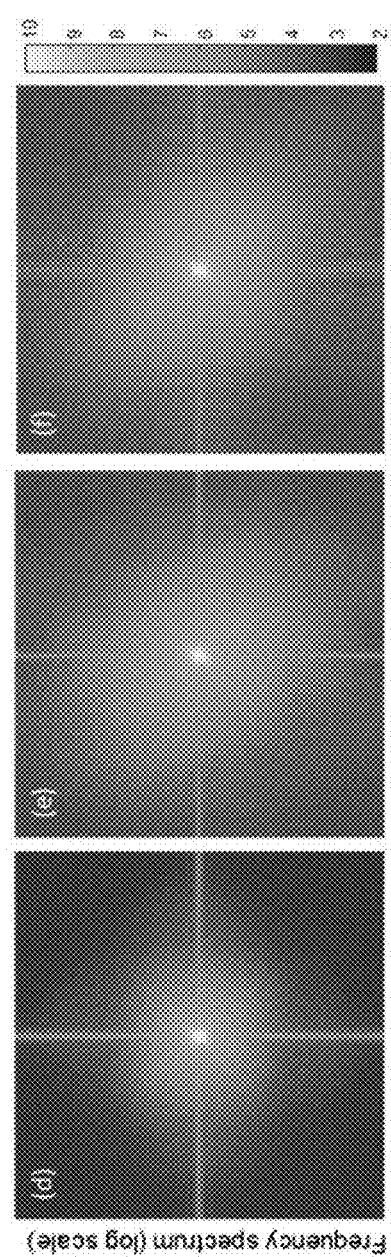
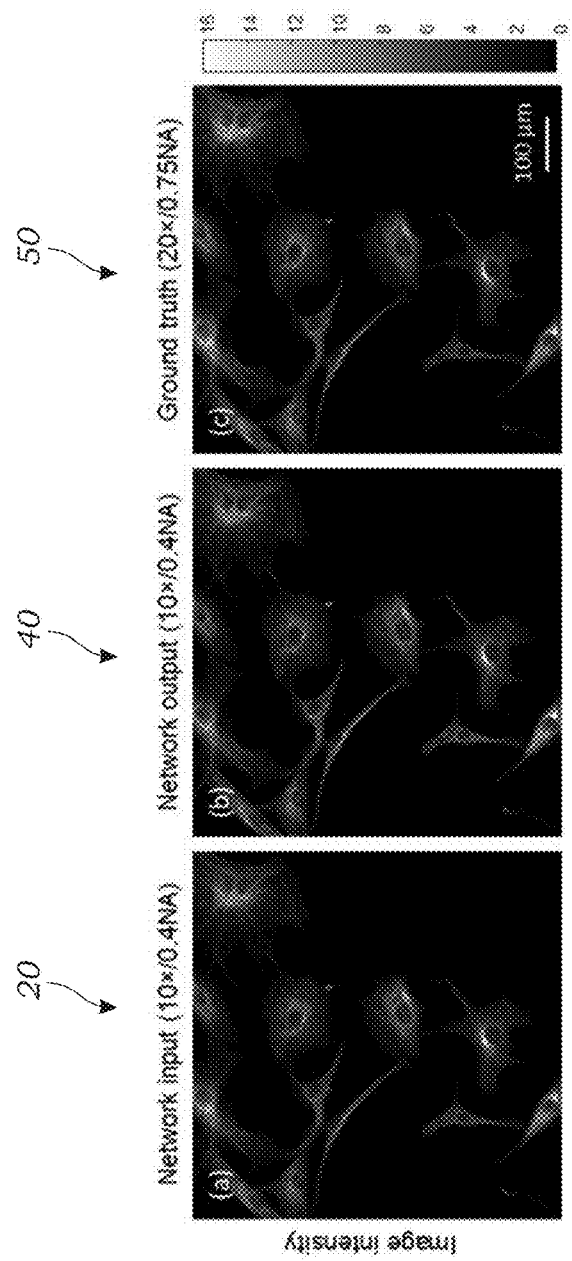

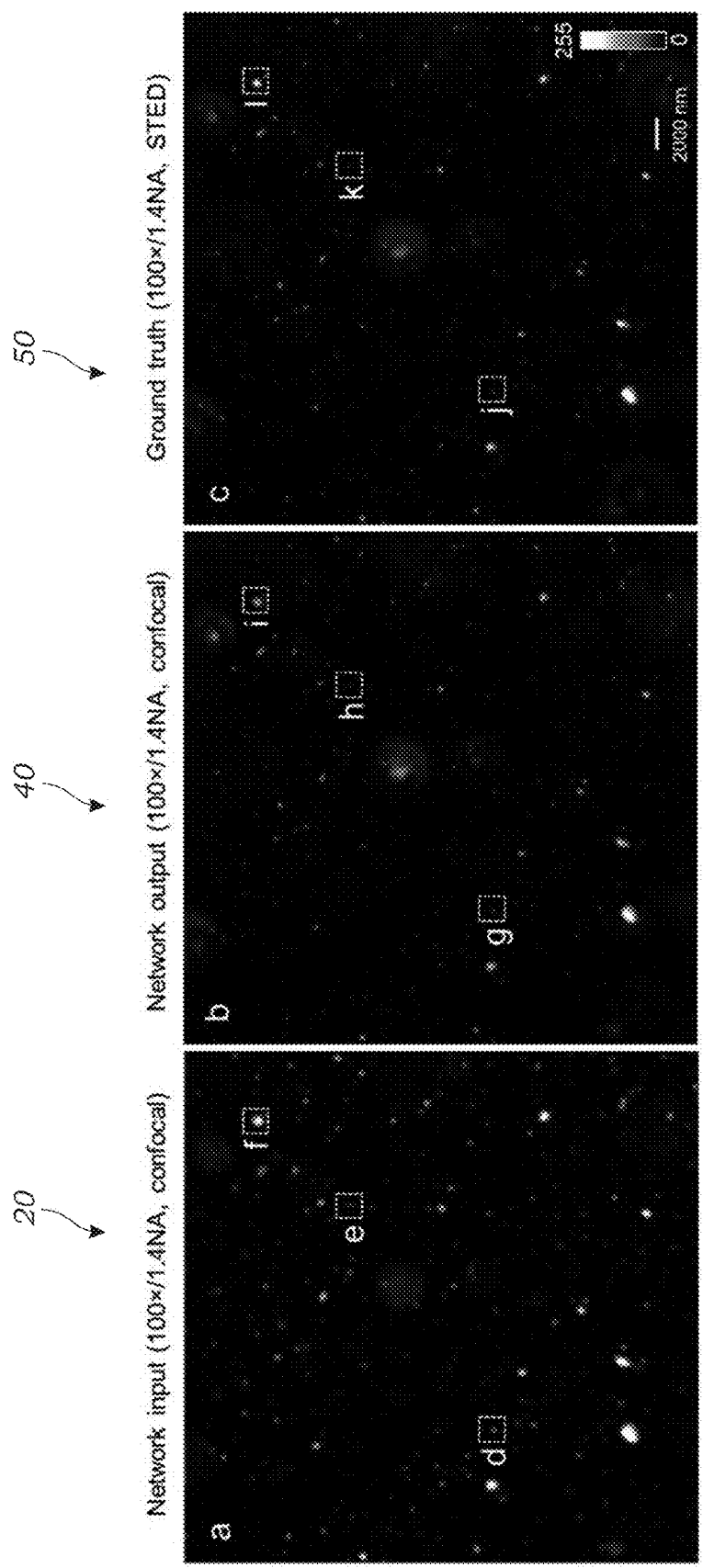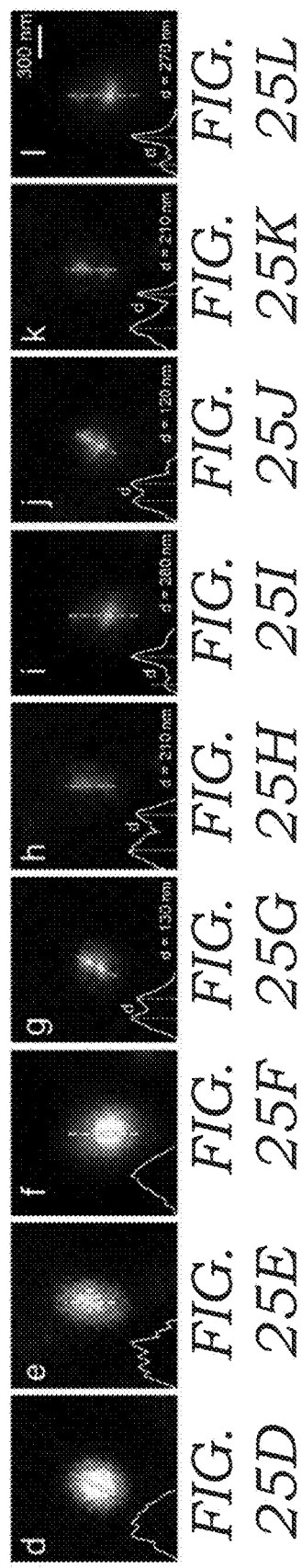

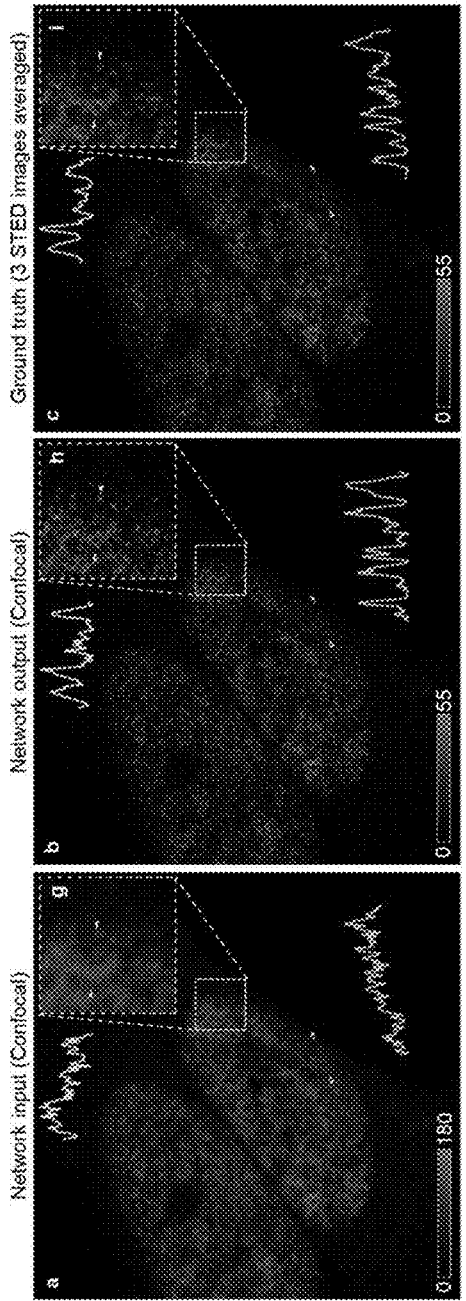
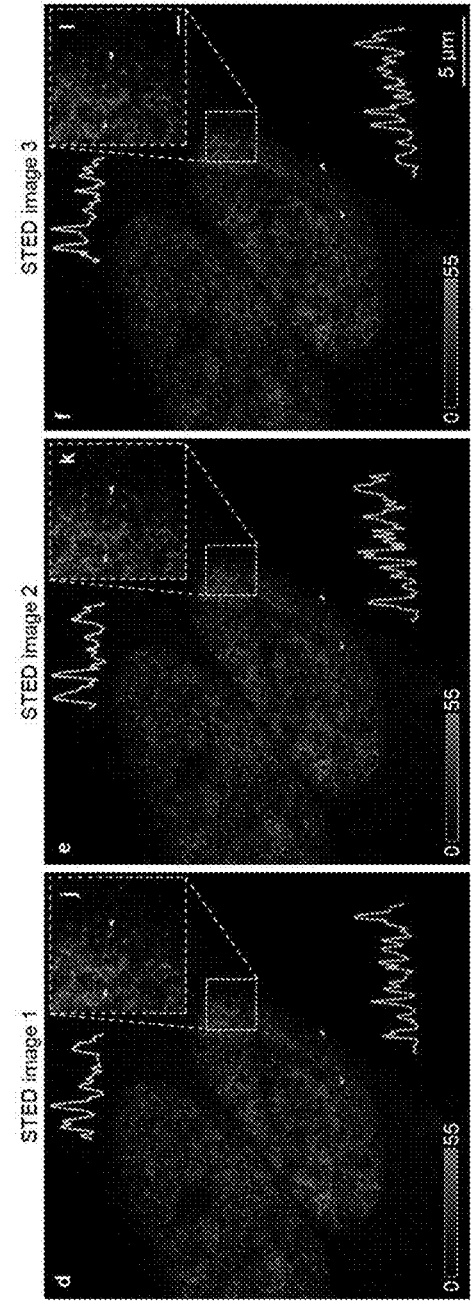
FIG. 27A  FIG. 27B  FIG. 27C
FIG. 27D  FIG. 27E  FIG. 27F

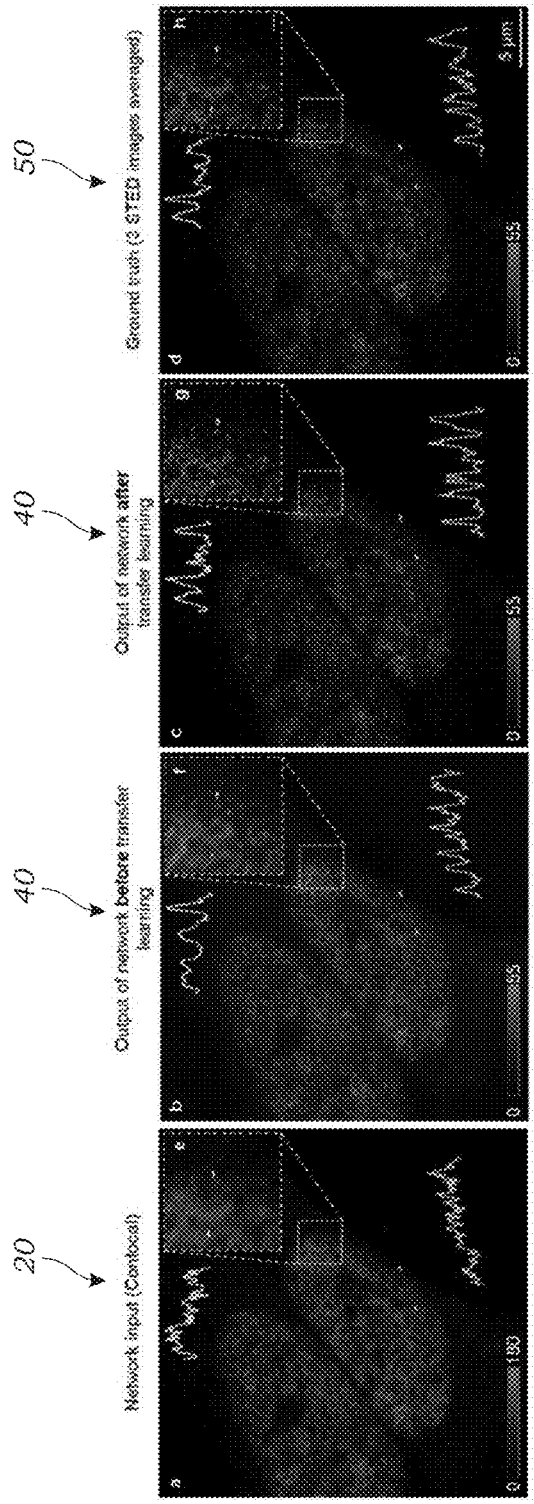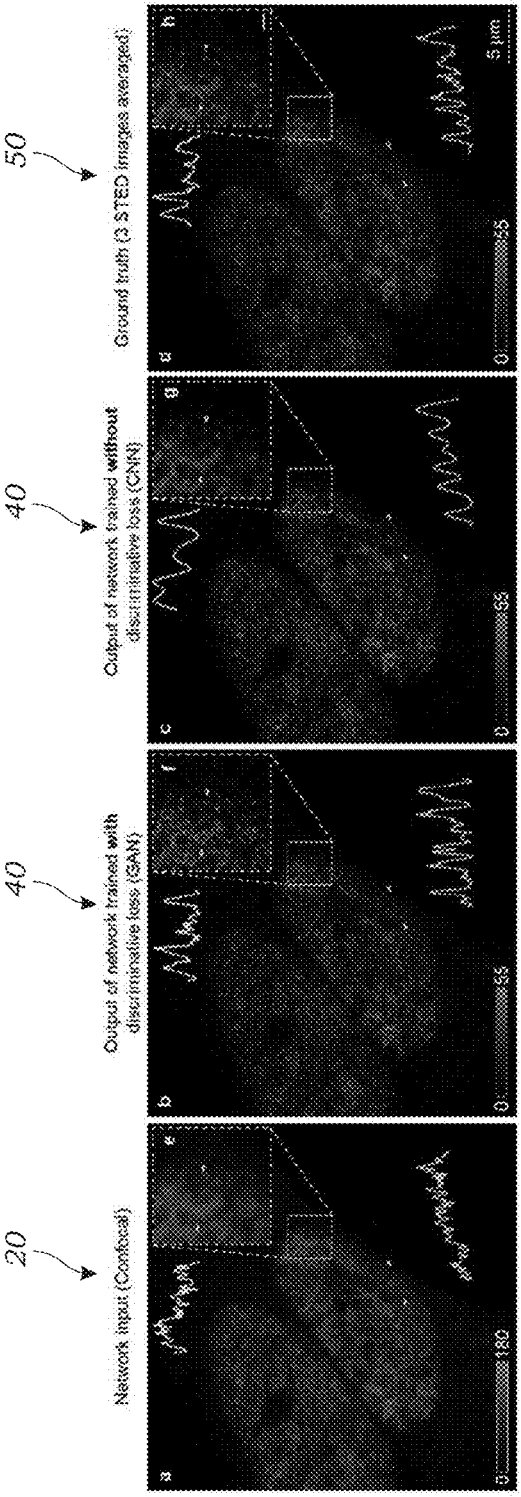

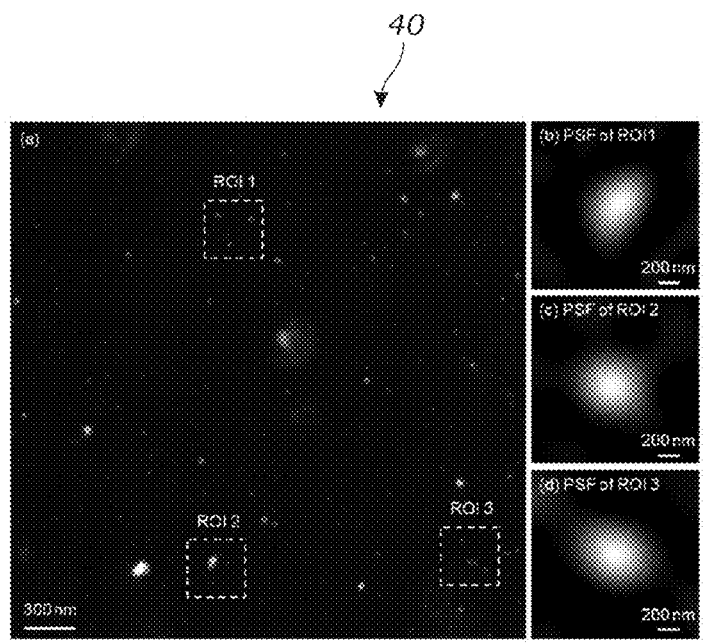
FIG. 32B
FIG. 32C
FIG. 32D
FIG. 32A
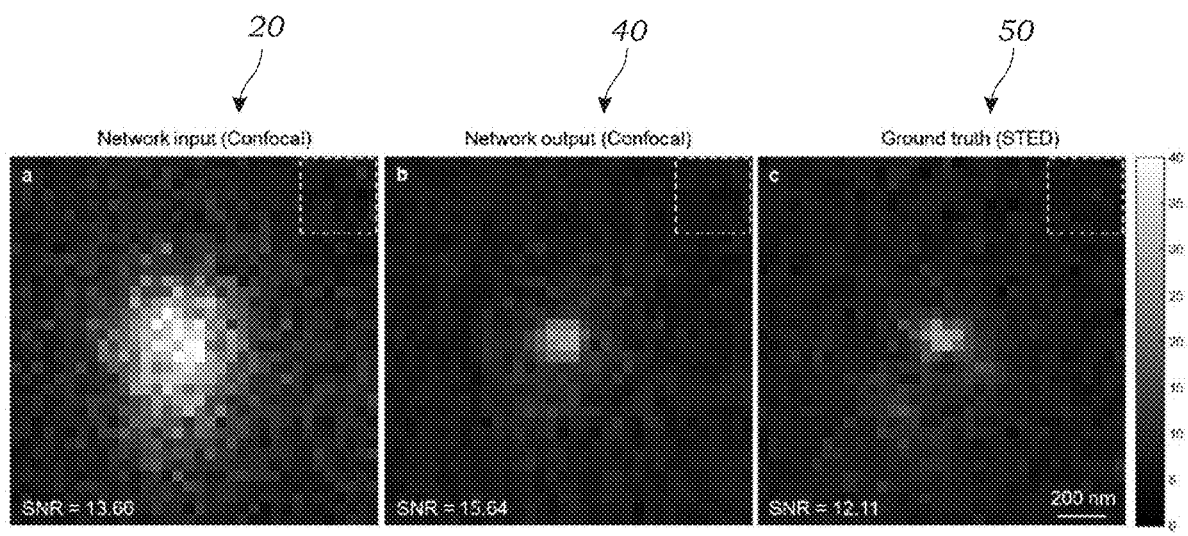
FIG. 33A  FIG. 33B  FIG. 33C

SYSTEMS AND METHODS FOR DEEP LEARNING MICROSCOPY

RELATED APPLICATIONS

This application claims priority to U.S. Provisional Patent Application No. 62/662,943 filed on Apr. 26, 2018, U.S. Provisional Patent Application No. 62/670,612 filed on May 11, 2018, U.S. Provisional Patent Application No. 62/698,581 filed on Jul. 16, 2018, and U.S. Provisional Patent Application No. 62/798,336 filed on Jan. 29, 2019, which are hereby incorporated by reference. Priority is claimed pursuant to 35 U.S.C. § 119 and any other applicable statute.

TECHNICAL FIELD

The technical field generally relates microscopy methods and devices that utilize deep neural network learning. Deep learning in neural networks, a class of machine learning algorithms, significantly improves various microscopy modalities. This includes, for example, optical microscopy, fluorescence microscopy, and electron microscopy.

BACKGROUND

Computational super-resolution microscopy techniques in general make use of a priori knowledge about the sample and/or the image formation process to enhance the resolution of an acquired image. At the heart of the existing super-resolution methods, numerical models are utilized to simulate the imaging process, including, for example, an estimation of the point spread function (PSF) of the imaging system, its spatial sampling rate and/or sensor-specific noise patterns. The image modeling-related challenges leads to formulation of forward models with different simplifying assumptions. In general, more accurate models yield higher quality results, often with a trade-off of exhaustive parameter search and computational cost. Deep learning is a class of machine learning techniques that uses multi-layered artificial neural networks for automated analysis of signals or data. The name comes from the general structure of deep neural networks, which consist of several layers of artificial neurons stacked over each other.

One type of a deep neural network is the deep convolutional neural network (CNN). Typically, an individual layer of a deep convolutional network is composed of a convolutional layer and a non-linear operator. The kernels (filters) in these convolutional layers are randomly initialized and can then be trained to learn how to perform specific tasks using supervised or unsupervised machine learning techniques. CNNs form a rapidly growing research field with various applications in e.g., image classification, annotation, style transfer, and compression, among others. Recently, deep neural networks have also been used for deconvolution in photography from numerically down-sampled or blurred images. While deep learning and other machine learning techniques have used on a variety of input signals and data the use of deep learning techniques to improve upon and expand microscopy methods and techniques have yet to be realized.

SUMMARY

In one embodiment, a microscopy method includes providing a trained deep neural network embodied in software such as image processing software that is executed using one or more processors of a computing device. An input image of a sample obtained from a microscope device is input to the trained deep neural network. The trained deep neural network outputs an output image, the output image having improved one or more of spatial resolution, depth-of-field, signal-to-noise ratio, and/or image contrast. The method has particular applicability for bright-field microscopy but may also be used in connection with fluorescent microscopy, electron microscopy, dark-field microscopy, coherent microscopy, confocal microscopy, multi-photon microscopy, optical coherence tomography (OCT) microscopy, and the like.

In one embodiment, the deep neural network is a convolutional neural network that is trained using a plurality of co-registered training images or image patches as well as one or more ground truth images or image patches, and wherein the parameter space of the convolutional neural network is established during the training phase. The system may be implemented using a computing device such as a computer that is configured to execute software that contains or embodies the trained deep neural network. The computer may include a personal computer, laptop, server, mobile computing device, or the like. The computer may also include one or more graphics processing units (GPUs) that are used for image training and/or image output. Thus, in one embodiment, a system for outputting improved microscopy images includes a computing device having image processing software executed thereon, the image processing software comprising a trained deep neural network that is executed using one or more processors of the computing device, wherein the trained deep neural network is trained with a series of co-registered ground truth images or image patches and training images or image patches which are used to establish parameters for the deep neural network, the image processing software configured to receive a microscopy input image of a sample and output an output image of the sample having improved one or more of spatial resolution, depth-of-field, signal-to-noise ratio, and/or image contrast.

In one embodiment, a microscopy method includes providing a trained deep neural network that is executed by software using one or more processors of a computing device and inputting a microscopy input image of a sample to the trained deep neural network. The trained deep neural network then outputs an output image of the sample, the output image having improved one or more of spatial resolution, depth-of-field, signal-to-noise ratio, and/or image contrast. The microscopy image that is input to the trained deep neural network may be obtained from a bright-field microscope, a fluorescent microscope, or an electron microscope in one embodiment.

In another embodiment, a system for outputting improved microscopy images includes a computing device having image processing software executed thereon, the image processing software comprising a trained deep neural network that is executed using one or more processors of the computing device, wherein the trained deep neural network is trained with a set of co-registered ground truth images or image patches and training images or image patches which are used to establish parameters for the deep neural network, the image processing software configured to receive a microscopy input image of a sample and output an output image of the sample having improved one or more of spatial resolution, and/or depth-of-field, signal-to-noise ratio, and/or image contrast.

The particular type or nature of the sample may vary depending on the microscope modality that is used. For example, for medical or biological applications microscopy images are often obtained of tissue. The tissue, which may include mammalian tissue or plant tissue, may be stained with one or more dyes or stains which is then imaged using bright-field microscopy techniques. Tissue may also contain added fluorophores which emit light in response to excitation radiation from a fluorescent microscope. As explained herein, in some embodiments, the trained deep neural network is trained using, for example, microscopy images of the same type of tissue that is to be imaged. For example, lung tissue may be used to train the deep neural network to image lung tissue. Alternatively, the trained deep neural network is trained using microscopy images of different types of tissue than the sample that is to be imaged. For example, even though the trained deep neural network was trained with lung tissue, it may be used to output higher quality images of another tissue type (e.g., liver). The same applies with dyes, stains or fluorophores that are used to image the sample. The training images may include, for example, pathological slide samples stained with the same stain used in the sample to be imaged. Alternatively, the training images may include pathological slide samples that were stained with a different stain.

In one embodiment, a microscopy method includes providing a trained deep learning network embodied in software such as image processing software that is executed using one or more processors of a computing device. A fluorescence input image of a sample is input to the trained deep learning network. The fluorescence input image may be wide-field fluorescence image that is acquired using, for example, a scanned sample using a conventional inverted microscope using standard objective lens/filter sets use for fluorescence images. The input fluorescence image may also include an image obtained from a confocal microscope image. The input fluorescence image may be obtained from a total-internal reflection fluorescence (TIRF) microscope.

The trained deep learning network outputs a fluorescence output image, the fluorescence output image having improved one or more of spatial resolution, and depth-of-field, signal-to-noise ratio, and/or contrast. In one embodiment, the trained deep learning network is trained using, for example, microscopy images of the same sample type (or objects contained therein) of the sample is to be imaged. For example, if cell nuclei are desired to be imaged, the training images also contain cell nuclei. Alternatively, the trained deep learning network is trained using microscopy images of different sample types (or objects contained therein) than the sample that is to be imaged. For instance, the training images may contain images of other objects (e.g., mitochondria or other organelle) yet this still is able to train the deep learning network to image cell nuclei. Of course, a mixture of the same and different type of objects may also be used for training images. The same applies with fluorescent dyes or stains that are used to image the sample. These are high resolution training images.

The training images may include, for example, samples stained with the same fluorescent stain or dye used in the sample to be imaged. Alternatively, the training images may include slide samples that were stained with a different stain. The system may be implemented using a computer or computing device that is configured to execute software that contains or embodies the trained deep learning network. In one embodiment, the deep learning network is configured as a Convolution Neural Network (CNN) that is a GAN-trained model or deep neural network. The computer may include a personal computer, laptop, server, mobile computer, or the like. The computer may also include one or more GPUs that are used for image training and/or image output.

In one embodiment, a system for generating fluorescence images of a sample having improved resolution includes a computing device having image processing software executed thereon, the image processing software comprising a trained deep neural network that is executed using one or more processors of the computing device, wherein the trained neural network is trained with a plurality of co-registered or matched low resolution and high resolution fluorescence training images, the image processing software configured to receive one or more input fluorescence image(s) of the sample and output corresponding fluorescence images of the sample having improved one or more of resolution, depth-of-field, signal-to-noise ratio, and/or contrast.

In another embodiment, a system for generating resolution-enhanced electron microscopy images of a sample includes a computing device having image processing software executed thereon, the image processing software comprising a trained deep neural network that is executed using one or more processors of the computing device, wherein the trained neural network is trained with a plurality of co-registered lower resolution and higher resolution electron microscopy training images, the image processing software configured to receive one or more input electron microscopy image(s) of the sample and output corresponding images of the sample having improved resolution. In one embodiment, the images having improved resolution that are output by the deep neural network have frequency spectra that substantially match higher resolution images of the same field-of-view.

In another embodiment, a method for generating resolution-enhanced electron microscopy images of a sample includes providing a trained deep neural network that is executed using one or more processors of a computing device. An electron microscopy input image of a sample is then input to the trained deep neural network. The trained deep neural network outputs an output image of the sample from the trained deep neural network, the output image having improved resolution.

BRIEF DESCRIPTION OF THE DRAWINGS

FIGS. 4A-4P: Illustrate deep neural network output images corresponding to a Masson's trichrome stained lung tissue section taken from a pneumonia patient. The network was trained on images of a Masson's trichrome stained lung tissue sample taken from another patient. FIG. 4A is an image of the deep neural network output corresponding to a 40×/0.95 NA input image. The highlighted region denotes the FOV of a 100×/1.4 NA objective lens. FIGS. 4B, 4G, 4L are zoomed-in regions of interest (ROIs) of the input image (40×/0.95 NA). FIGS. 4C, 4H, 4M are zoomed-in ROIs of the neural network output image. FIGS. 4D, 4I, 4N are zoomed-in ROIs of the neural network output image, taking the first output of the network, shown in FIGS. 4C, 4H, 4M, as input. FIGS. 4E, 4J, 4O are comparison images of the same ROIs, acquired using a 100×/1.4 NA objective lens (e.g., high-resolution images). FIGS. 4F, 4K, 4P network output images of the same deep neural network model applied on the 100×/1.4 NA objective lens images. The arrows in FIG. 4O point to some of the out-of-focus features that are brought to focus in the network output image shown in FIG. 4N. Circles in FIG. 4J, 4K point to some dust particles in the images acquired with a 100×/1.4 NA objective lens and do not appear in FIGS. 4G-4I. The average network computation time for different ROIs is listed in Table 3.

FIG. 5A is an input image acquired with a 40×/0.95 NA objective lens. The deep neural network is applied on this input image once, twice and three times, where the results are shown in FIGS. 5B, 5C, and 5D, respectively. FIG. 5E illustrates an image (obtained with a 100×/1.4 NA microscope) of the same field-of-view is shown for comparison.

FIGS. 6A-6I illustrates the results of the deep neural network to output images corresponding to a Masson's trichrome stained lung tissue section taken from a pneumonia patient. The network was trained on images of a Masson's trichrome stained lung tissue taken from a different tissue block that was not used as part of the CNN training phase. FIG. 6A illustrates the output image of the deep neural network output corresponding to a 100×/1.4 NA input image. FIGS. 6B, 6F, 6D, 6H are zoomed-in ROIs of the input image (100×/1.4 NA). FIGS. 6C, 6G, 6E, 6I are zoomed-in ROIs of the neural network output image.

FIGS. 7A-7P illustrates the results of the deep neural network to output images of Masson's trichrome stained kidney tissue section obtained from a moderately advanced diabetic nephropathy patient. The network was trained on images of a Masson's trichrome stained lung tissue taken from another patient. FIG. 7A illustrates the output result of two-successive applications of the same deep neural network on a 40×/0.95 NA image of the kidney tissue that is used as input. The highlighted region denotes the FOV of a 100×/1.4 NA objective lens. FIGS. 7B, 7G, 7L illustrates zoomed-in ROIs of the input image (40×/0.95 NA). FIGS. 7C, 7H, 7M illustrate zoomed-in ROIs of the neural network output image, taking the corresponding 40×/0.95 NA images as input. FIGS. 7D, 7I, 7N illustrate zoomed-in ROIs of the neural network output image, taking the first output of the network, shown in FIGS. 7C, 7H, and 7M, as input. FIGS. 7E, 7J, and 7O illustrate extended depth-of-field images, algorithmically calculated using $N_z$=5 images taken at different depths using a 100×/1.4 NA objective lens. FIGS. 7F, 7K, and 7P illustrate the auto-focused images of the same ROIs, acquired using a 100×/1.4 NA objective lens. The arrows in FIG. 7P point to some of the out-of-focus features that are brought to focus in the network output images shown in FIG. 7N.

FIGS. 8A-8N illustrate the results of deep neural network-based imaging of H&E stained breast tissue section. The output images of two different deep neural networks are compared to each other. The first network is trained on H&E stained breast tissue (FIG. 8A), taken from a different tissue section that is not used in the training phase. The second network is trained on a different tissue type and stain, i.e., Masson's trichrome stained lung tissue sections (FIG. 8B). FIGS. 8C-8N illustrate zoomed-in images of different ROIs of the input and output images. Ground truth images are shown in FIGS. 8H and 8N.

FIGS. 9A-9T illustrate the results of the deep neural network of on lung samples trained either on lung tissue or breast tissue. FIG. 9A illustrates the results of applying the lung tissue trained deep neural network model on a 40×/0.95 NA lung tissue input image. FIG. 9B illustrates the result of applying the breast tissue trained deep neural network model on a 40×/0.95 NA lung tissue input image. FIGS. 9C, 9I, 9O illustrate zoomed in ROIs corresponding to the 40×/0.95 NA input image. FIGS. 9D, 9J, 9P illustrate neural network output images, corresponding to input images FIGS. 9C, 9I, 9O, respectively; the network is trained with lung tissue images. FIGS. 9E, 9K, and 9Q are neural network output images, corresponding to input images FIGS. 9D, 9J, 9P, respectively; the network is trained with lung tissue images. FIGS. 9F, 9L, 9R are neural network output images, corresponding to input images of FIGS. 9C, 9I, 9O, respectively; the network is trained with breast tissue images stained with a different dye, H&E. FIGS. 9G, 9M, 9S are neural network output images, corresponding to input images of FIGS. 9F, 9L, 9R, respectively; the network is trained with breast tissue images stained with H&E. FIGS. 9H, 9N, 9T are comparison images of the same ROIs acquired using a 100×/1.4 NA objective lens (ground truth images).

1.4 NA objective lens. ROIs correspond to the Masson's trichrome stained lung tissue shown in FIG. 4. The percentage bar spans between 0-100%.

Figure 16:
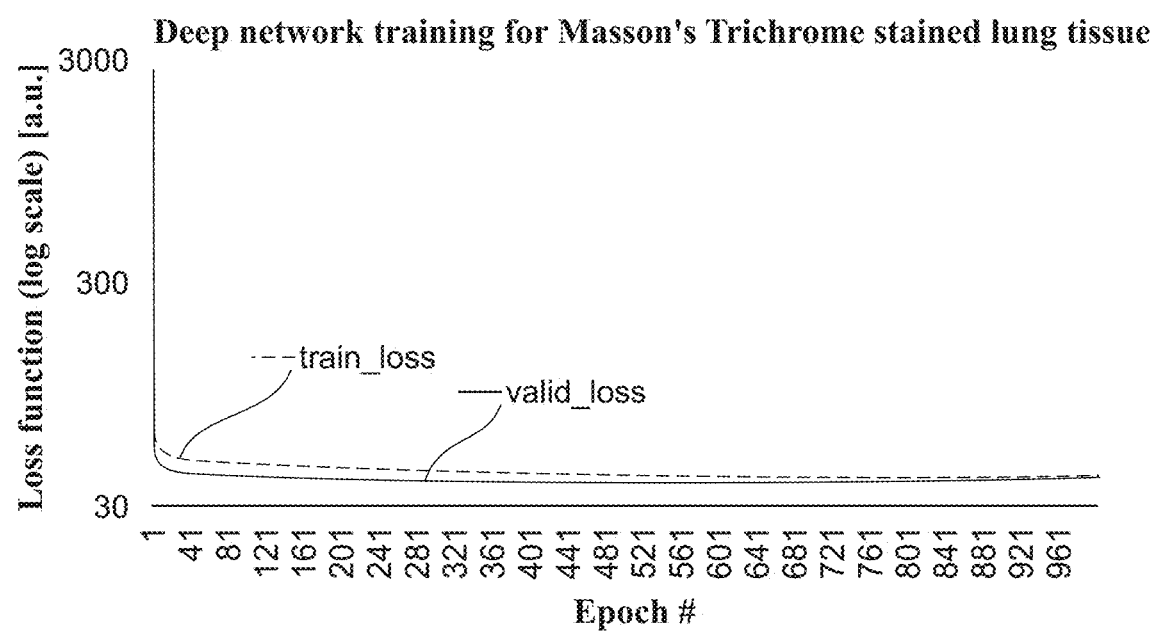

FIG. 16 illustrates a graph showing the training and validation dataset errors as a function of the number of epochs for the Masson's trichome stained lung tissue dataset.

FIG. 17A illustrates the network input image of bovine pulmonary artery endothelial cells (BPAEC) acquired with a 10×/0.4 NA objective lens.

FIG. 17B illustrates a zoomed-in image of the ROI of FIG. 17A.

FIG. 17C illustrates the network output of the same zoomed-in region of FIG. 17B.

FIG. 17D illustrates the ground truth image of the same ROI (20×/0.75 NA).

FIG. 17E illustrates a further zoomed-in image of a cell's F-actin and microtubules, corresponding to the dashed region the identified region "e" in in FIG. 17B.

FIG. 17F illustrates a further zoomed-in image of a cell's F-actin and microtubules, corresponding to the dashed region the identified region "f" in in FIG. 17C.

FIG. 17G illustrates a further zoomed-in image of a cell's F-actin and microtubules, corresponding to the dashed region the identified region "g" in in FIG. 17D.

Figure 1:
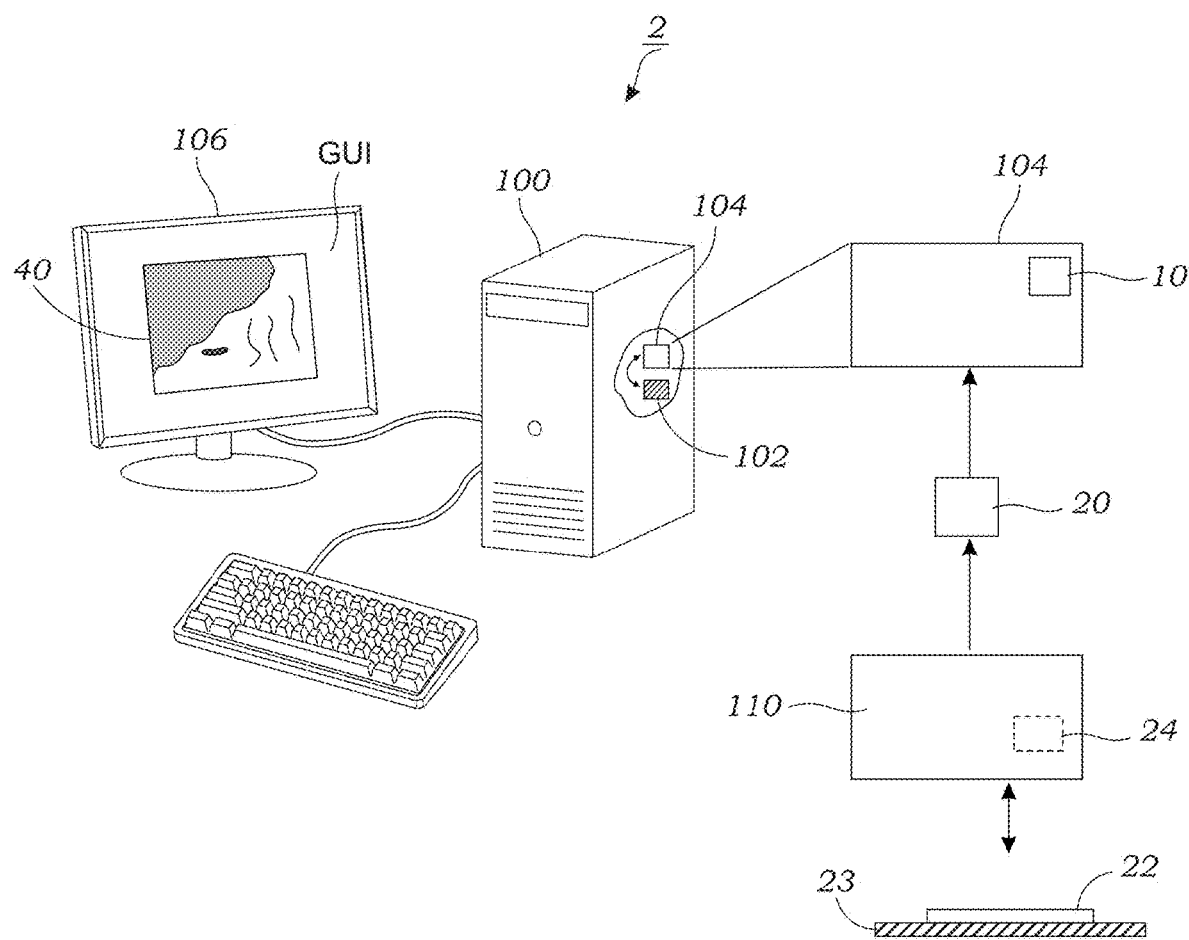
FIG. 1 schematically illustrates one embodiment of a system for receiving an input image obtained from a microscopy device that outputs or generates an output image that has improved one or more of resolution, depth-of-field, signal-to-noise ratio, and/or contrast.
Figures 5A, 5B, 5C, 5D, 5E:
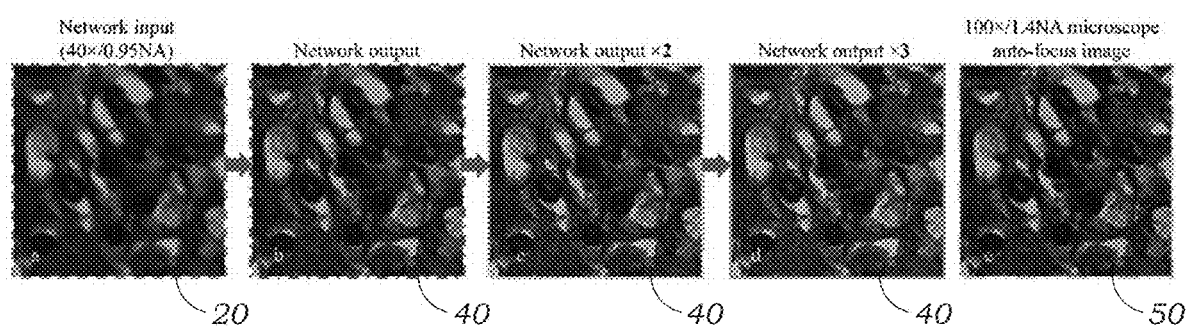
FIGS. 5A-5E illustrate the results of applying the deep neural network in a cyclic manner on Masson's trichrome stained kidney section images.

FIGS. 18A-1 to 18A-5; 18B-1 to 18B-5; 18C-1 to 18C-5 illustrate a comparison of deep learning results against Lucy-Richardson and non-negative least squares (NNLS) image deconvolution algorithms for three different fluorescent stains/dyes (DAPI, FITC, TxRed). Inputs are seen in FIGS. 18A-1, 18B-1, 18C-1. Ground truth images are seen in FIGS. 18A-5, 18B-5, 18C-5.

FIGS. 19A-19J illustrate the quantification of super-resolution artifacts using the NanoJ-Squirrel Plugin. FIG. 19A is the network input, FIG. 19B is the network output, FIG. 19C is the LR deconvolution image, FIG. 19D is the NNLS deconvolution image, FIG. 19E is the ground truth image of microtubule structure inside a BPAEC. FIG. 19F is an overlay image of the network output of FIG. 19B and the ground truth of FIG. 19E. FIG. 19G is an error map of the network input image vs. the network output image. FIG. 19H is an error map of the network input image and the LR output. FIG. 19I is an error map of the network input image and the NNLS deconvolution image. FIG. 19J is an error map of the input image vs. the ground truth image. All the maps show high RSP (resolution scale Pearson-correlation) scores that are almost 1, and low resolution scaled error (RSE) scores of ~1, out of 255.

Figures 1, 2, 3, 4, 22A:
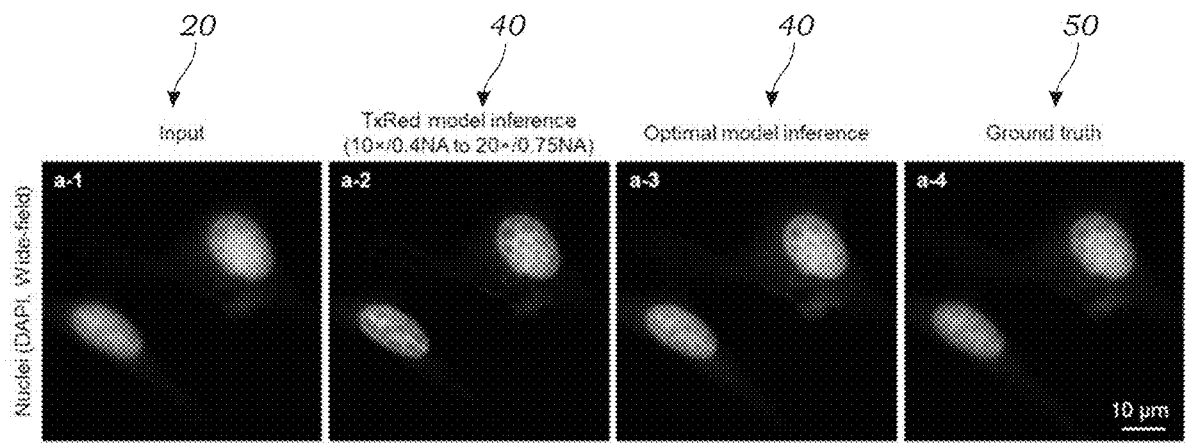

FIGS. 20A-1 to 20A-3; 20B-1 to 20B-3; 20C-1 to 20C-3; 20D-1 to 20D-3 illustrate the generalization of a neural network model trained with F-actin to new types of structures that it was not trained for. Network input, output, and ground truth images corresponding to FIGS. 20A-1, 20A-2, 20A-3 F-actin inside a BPAEC (image not in the training dataset), FIGS. 20B-1, 20B-2, 20B-3 mitochondria inside a BPAEC, FIGS. 20C-1, 20C-2, 20C-3 blood vessel in mouse brain tumor, and FIGS. 20D-1, 20D-2, 20D-3 actin in a mouse kidney section demonstrate that all these structures can be blindly super-resolved by a neural network that was trained with only F-actin images.

FIGS. 21A-1 to 21A-3; 21B-1 to 21B-3; 21C-1 to 21C-3; 21D-1 to 21D-3 illustrate the generalization of a neural network model trained with microtubules to new types of structures that it was not trained for. Network input, output, and ground truth images corresponding to (FIGS. 21A-1, 21A-2, 21A-3) microtubules inside a BPAEC (image not in the training dataset), (FIGS. 21B-1, 21B-2, 21B-3) F-actin inside a BPAEC, (FIGS. 21C-1, 21C-2, 21C-3) melanoma cells in mouse brain tumor, and (FIGS. 21D-1, 21D-2, 21D-3) glomeruli and convoluted tubules in a mouse kidney section demonstrate that all these structures can be blindly super-resolved by a neural network that was trained with only microtubule images.

Figures 1, 2, 3, 4, 22B:
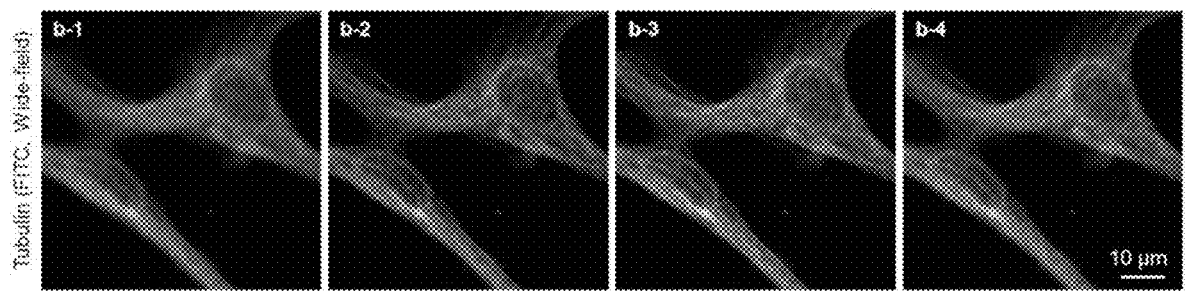
Figures 1, 2, 3, 4, 22C:
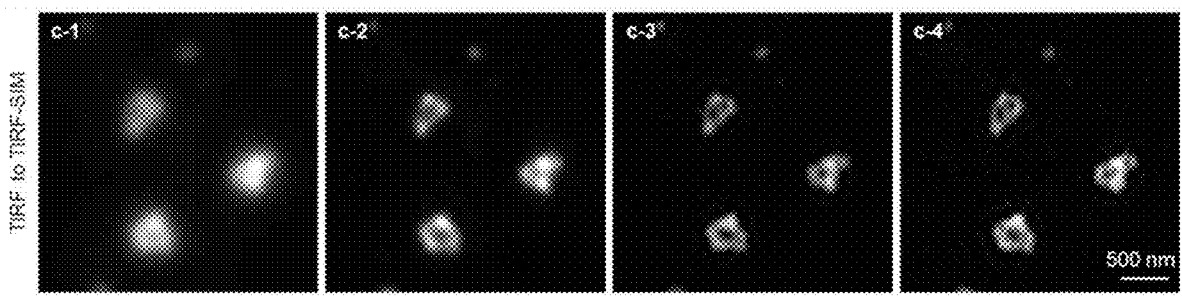
Figures 1, 2, 3, 4, 22D:
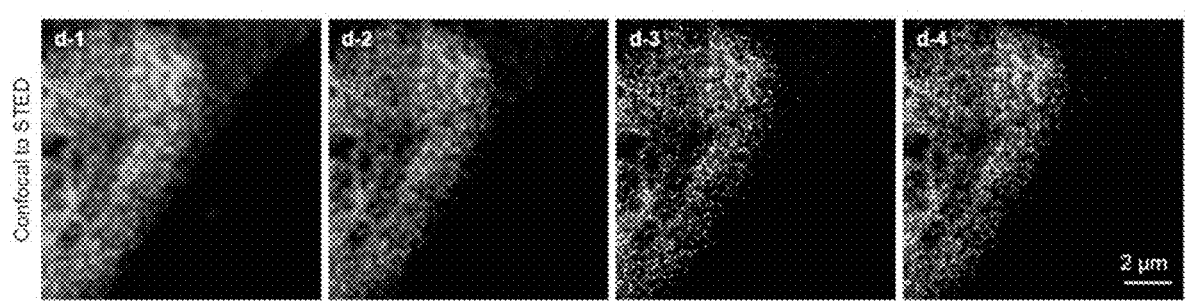

FIGS. 22A-1 to 22A-4; 22B-1 to 22B-4; 22C-1 to 22C-4; 22D-1 to 22D-4 illustrates a summary of the results where a deep neural network, trained on a specific image dataset and hardware (e.g., super-resolution model from 10×/0.4 NA objective to 20×/0.75 NA objective, using a Texas Red excitation/emission filter cube, trained with only the images of F-actin) was blindly applied on image datasets that originated from different types of objects/samples and imaging hardware. FIGS. 22A-1 to 22A-4 are wide-field images of BPAEC nuclei acquired with DAPI filter set; the input image is acquired using a 10×/0.4 NA objective lens, and the $2^{nd}$ and $3^{rd}$ columns refer to the corresponding network output images for this input. The ground truth image is acquired using a 20×/0.75 NA. FIGS. 22B-1 to 22B-4 are wide-field images of BPAEC acquired with FITC filter set; the input image is acquired using a 10×/0.4 NA objective lens, and the $2^{nd}$ and $3^{rd}$ columns refer to the corresponding network output images for this input. The ground truth image is acquired using a 20×/0.75 NA. FIGS. 22C-1 to 22C-4 are TIRF and TIRF-SIM images. The input image is acquired using a TIRF microscope, and the ground truth image is acquired using a TIRF-SIM. FIGS. 22D-1 to 22D-4 are confocal and STED images of a HeLa cell nucleus. The input image is acquired using a confocal microscope, and the ground truth image is acquired using a STED microscope. The optimal model inference ($3^{rd}$ column) refers to the results of the correct network model trained on the same imaging hardware as the input image.

FIGS. 23A-23G illustrate the spatial frequency extrapolation achieved by deep learning. The deep learning model takes (FIG. 23A) an input image of microtubules in BAPEC obtained using a 10×/0.4 NA objective lens and super-resolves it as shown in (FIG. 23B), to match the resolution of (FIG. 23C) the ground truth image which is acquired with a 20×/0.75 NA objective lens. FIGS. 23D-23F show the spatial frequency spectra in log scale, corresponding to (FIGS. 23A-C), respectively. FIG. 23G shows a graph of the radially-averaged intensity of each one of the spatial frequency spectra shown in (FIGS. 23D, 23E, 23F).

Figures 24A, 24B, 24C:
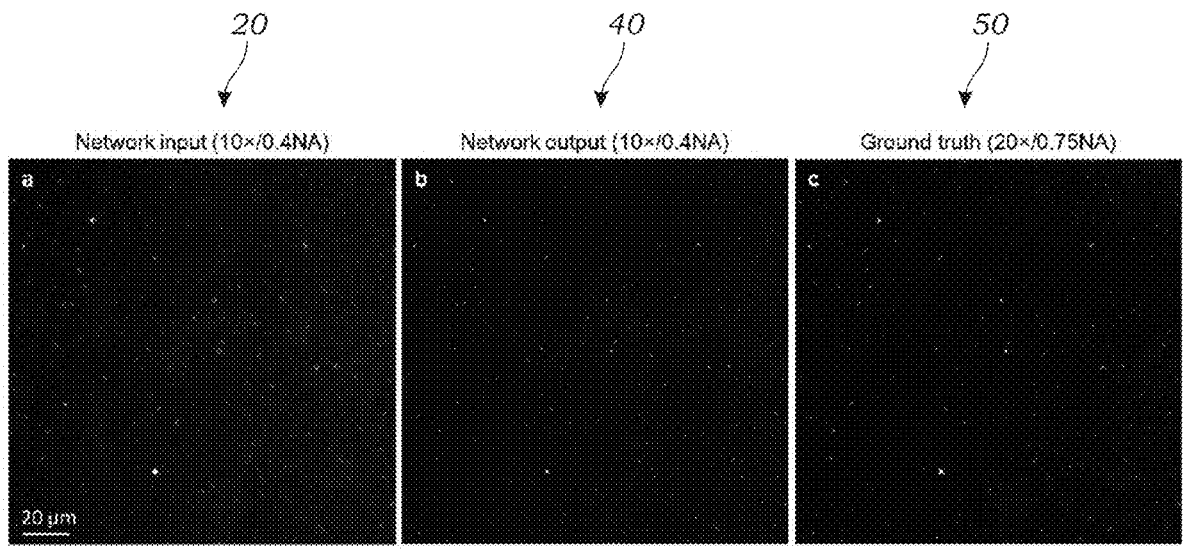
Figure 24D:
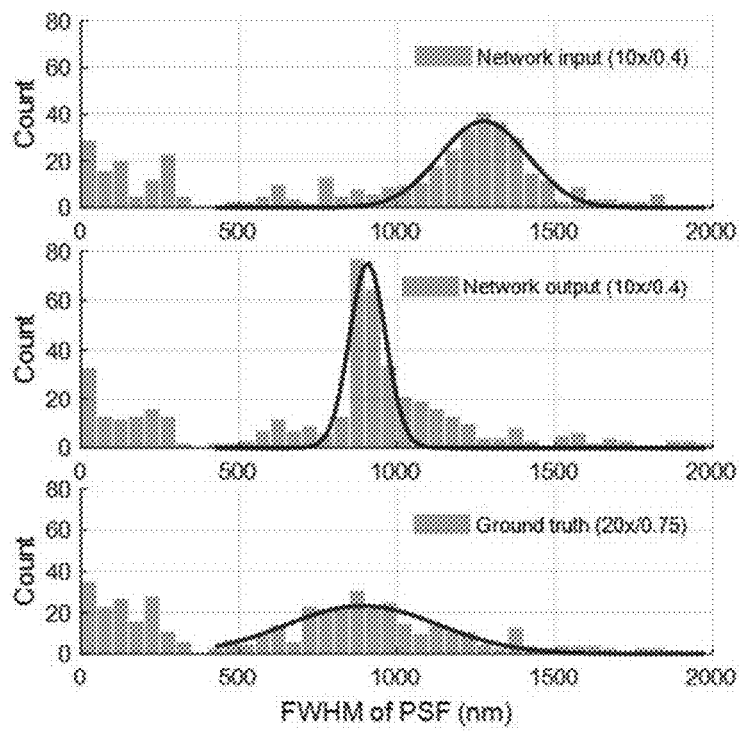

FIGS. 24A-24D illustrate PSF characterization of the network input image (lox/0.4 NA) (FIG. 24A), the network output image (FIG. 24B), and the ground truth image (FIG. 24C) (20×/0.75 NA) using 20 nm fluorescent particles. FIG. 24D is a graph showing the signal (count) as a function of FWHM of PSF (nm) for the network input, network output, and ground truth.

FIGS. 25A-25L illustrate image resolution improvement beyond the diffraction limit: from confocal microscopy to STED. FIG. 25A is a diffraction-limited confocal microscope image is used as input to the network and is super-resolved to blindly yield the network output (FIG. 25B), which is comparable to STED image of the same FOV (FIG. 25C), used as the ground truth. FIGS. 25D-25F show examples of closely spaced nano-beads that cannot be resolved by confocal microscopy. FIGS. 25H-25I show the trained neural network takes FIGS. 25D-25F as input and resolves the individual beads, very well agreeing with FIGS. 25J-25L STED microscopy images. The cross-sectional profiles reported in FIGS. 25D-25L are extracted from the original images.

Figure 26:
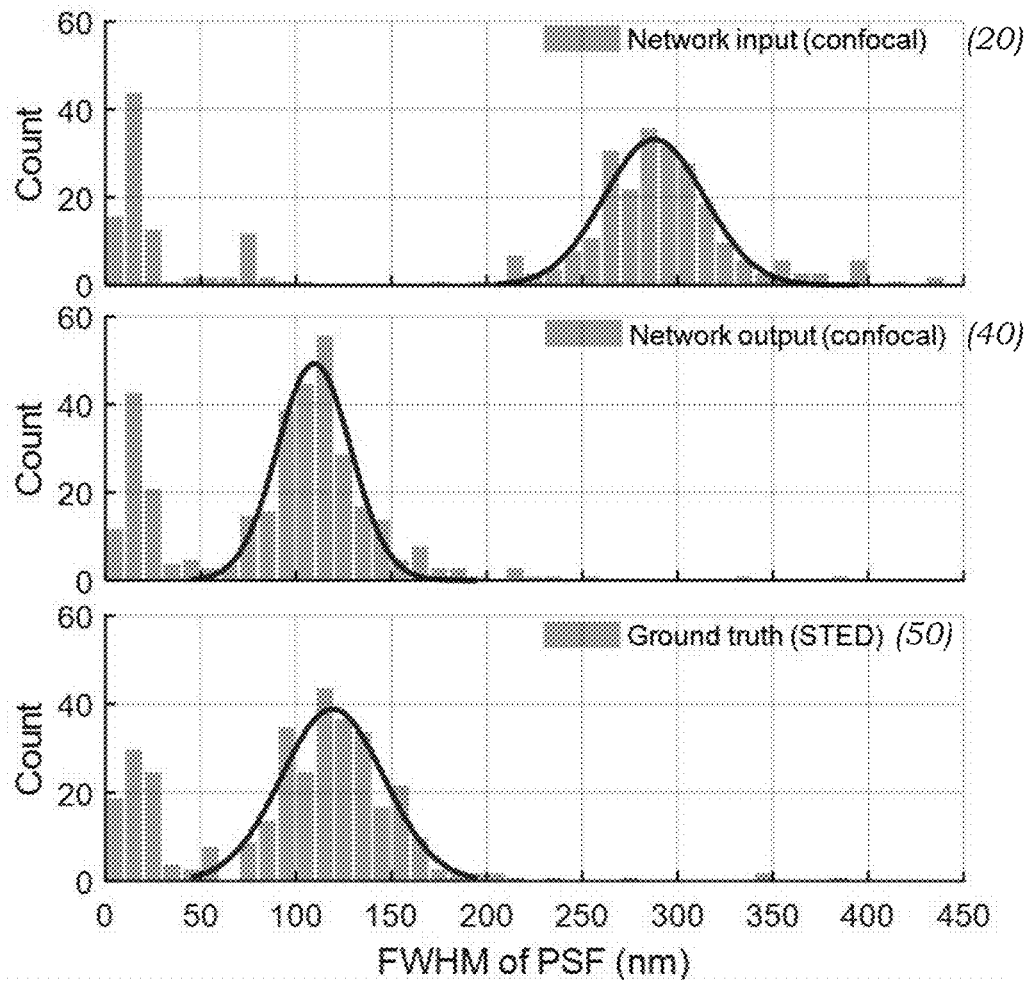

FIG. 26 illustrates PSF characterization, before and after the network, and its comparison to STED. More than 400 bright spots were extracted from the same locations of the network input (confocal), network output (confocal), and the corresponding ground truth (STED) images. Each one of these spots was fit to a 2D Gaussian function and the corresponding FWHM distributions are shown in each histogram. These results show that the resolution of the network output images is significantly improved from ~290 nm (top row: network input using a confocal microscope) down to ~110 nm (middle row: network output), which provides a very good fit to the ground truth STED images of the same nano-particles, summarized at the bottom row.

FIGS. 27A-27F illustrate deep-learning enabled cross-modality image transformation from confocal to STED. Zoomed-in ROIs are seen in panel images g, h, i, j, k, l. FIG. 27A is a diffraction-limited confocal microscope image of Histone 3 distributions within HeLa cell nuclei is used as input to the neural network to blindly yield the network output image (FIG. 27B), which is comparable to STED image of the same FOV (FIG. 27C). FIG. 27C is the average of three (3) individual STED scans of the same FOV, shown in (FIGS. 27D, 27E, 27F) respectively. Scale bar in (ROI "l" in FIG. 27F) is 500 nm. Arrows in each image refer to the line of the shown cross-section.

FIGS. 28A-28D illustrate a neural network model trained with nano-bead images exhibits significantly improved performance in blindly inferring Histone 3 distributions within fixed HeLa cell nuclei after applying transfer learning with similar images. Zoomed-in ROIs are seen in panel images e, f, g, h. Scale bar in (h) is 500 nm. Arrows in each image point to the line of the shown cross-section.

FIGS. 29A-29D illustrate how discriminative loss is a key aspect to the training of a generative network. Zoomed-in ROIs are seen in panel images e, f, g, h. The same generative model as in FIG. 27, trained without the discriminative loss, shows compromised performance compared to the training with the discriminative loss, i.e., the GAN framework: FIG. 29C panel (g) show over-smoothed structures and missing details. Scale bar in (h) is 500 nm. Arrows in each image refer to the line of the shown cross-section.

Figures 30A, 30B, 30C:
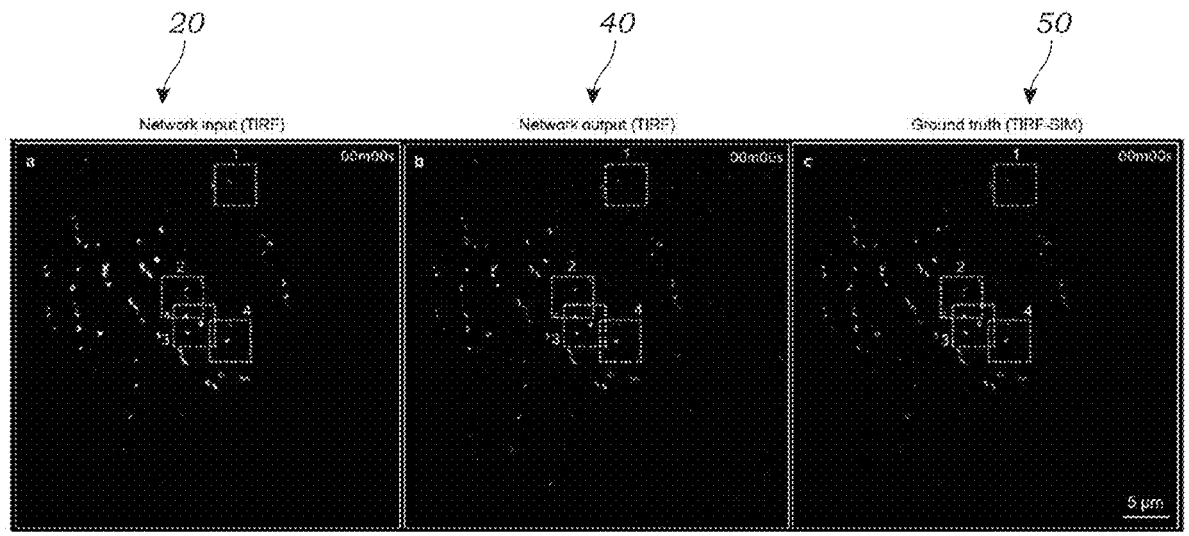
Figures 30D, 30E, 30F, 30G, 30H, 30I:
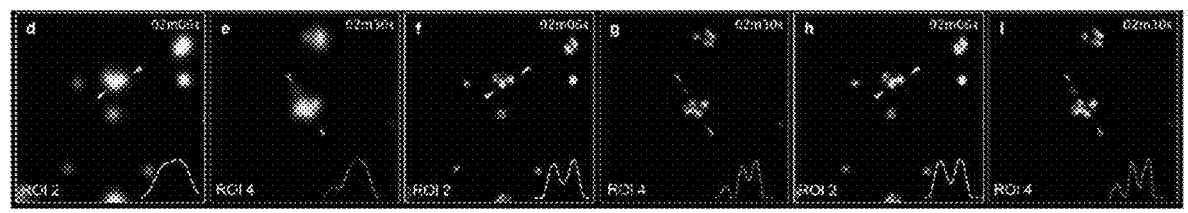
Figures 30J, 30K, 30L, 30M, 30N, 30O:
Figures 30P, 30Q, 30R, 30S, 30T, 30U:
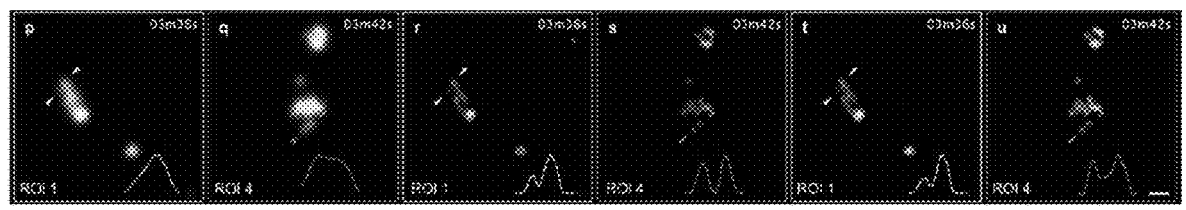

FIGS. 30A-30U shown the results of deep-learning enabled cross-modality image transformation from TIRF to TIRF-SIM. FIG. 30A is a TIRF image of a gene edited SUM159 cell expressing AP2-eGFP. The network model super-resolves the diffraction limited TIRF image (input—FIG. 30A) to generate output image (FIG. 30B) and matches TIRF-SIM reconstruction results (FIG. 30C). Temporal dynamics are seen in FIGS. 30D-30U. Scale bar in (FIG. 30U) is 500 nm. Arrows in each image refer to the line of the shown cross-section.

Figures 31A, 31B, 31C:
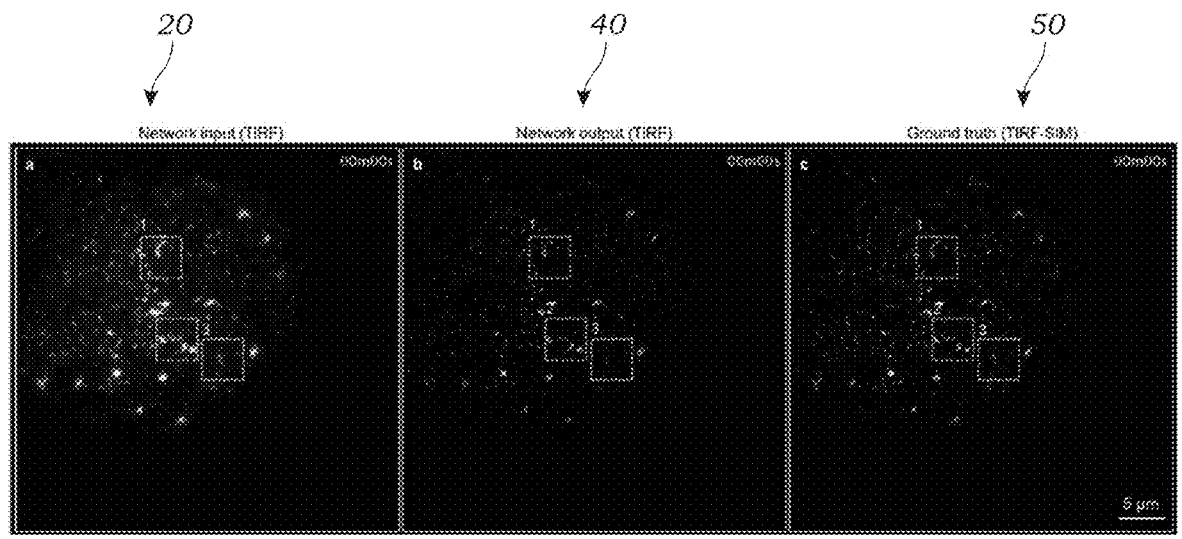
Figures 31D, 31E, 31F, 31G, 31H, 31I:
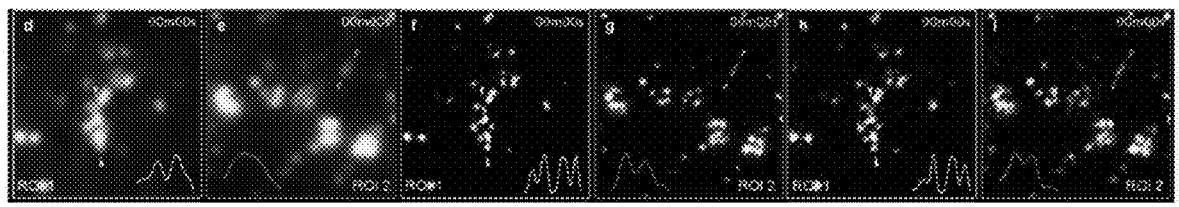
Figures 31J, 31K, 31L, 31M, 31N, 31O:
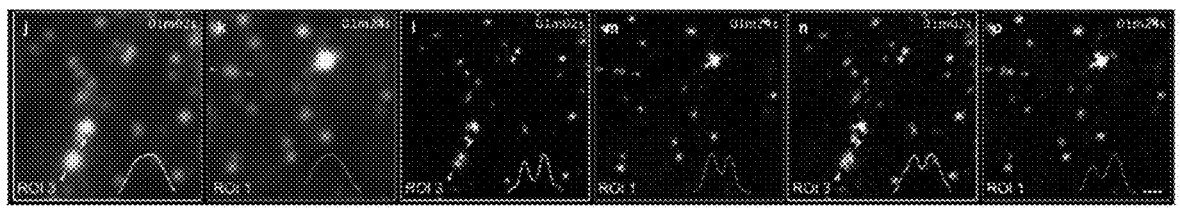

FIGS. 31A-31O) illustrate super-resolution imaging of amnioserosa tissues of a Drosophila embryo expressing Clathrin-mEmerald using the TIRF to TIRF-SIM transformation network that was trained only with AP2 images. These results provide additional examples of the generalization of the network's inference to new sample types that it has never seen before. To position the apical surface of amnioserosa cells within the evanescent excitation field of the TIRF system, the dechorionated embryo was gently pressed against the cover glass. Relatively high levels of reconstruction artifacts observed in the TIRF-SIM images are attributable to the autofluorescence of the vitelline membrane (surrounding the entire embryo) as well as the excitation/emission light scattering within amnioserosa cells that undergo rapid morphological changes during development, which negatively impacts the structured illumination/emission profiles. Scale bar in (FIG. 31O) is 500 nm. Arrows in each image refer to the line of the shown cross-section.

FIGS. 32A-32D illustrate spatially-varying PSFs that the confocal-to-STED transformation neural net has converged to. These spatially-varying PSFs are locally calculated within the imaging FOV, by deconvolving the network output with the network input (FIGS. 32A and 32B). These results clearly demonstrate the power of the deep neural network framework that achieves both cross-modality image transformations (i.e., confocal-to-STED in this case) and blind measurement of the inherent spatially-varying PSF (with respect to STED), statistically inferred through deep learning using image data.

FIGS. 33A-33C illustrate quantification of the SNR improvement achieved by the confocal-to-STED transformation network: input SNR=13.66, network output SNR=15.64, STED SNR=12.11. The dashed line regions are used to calculate the background mean and variation.

Figure 34:
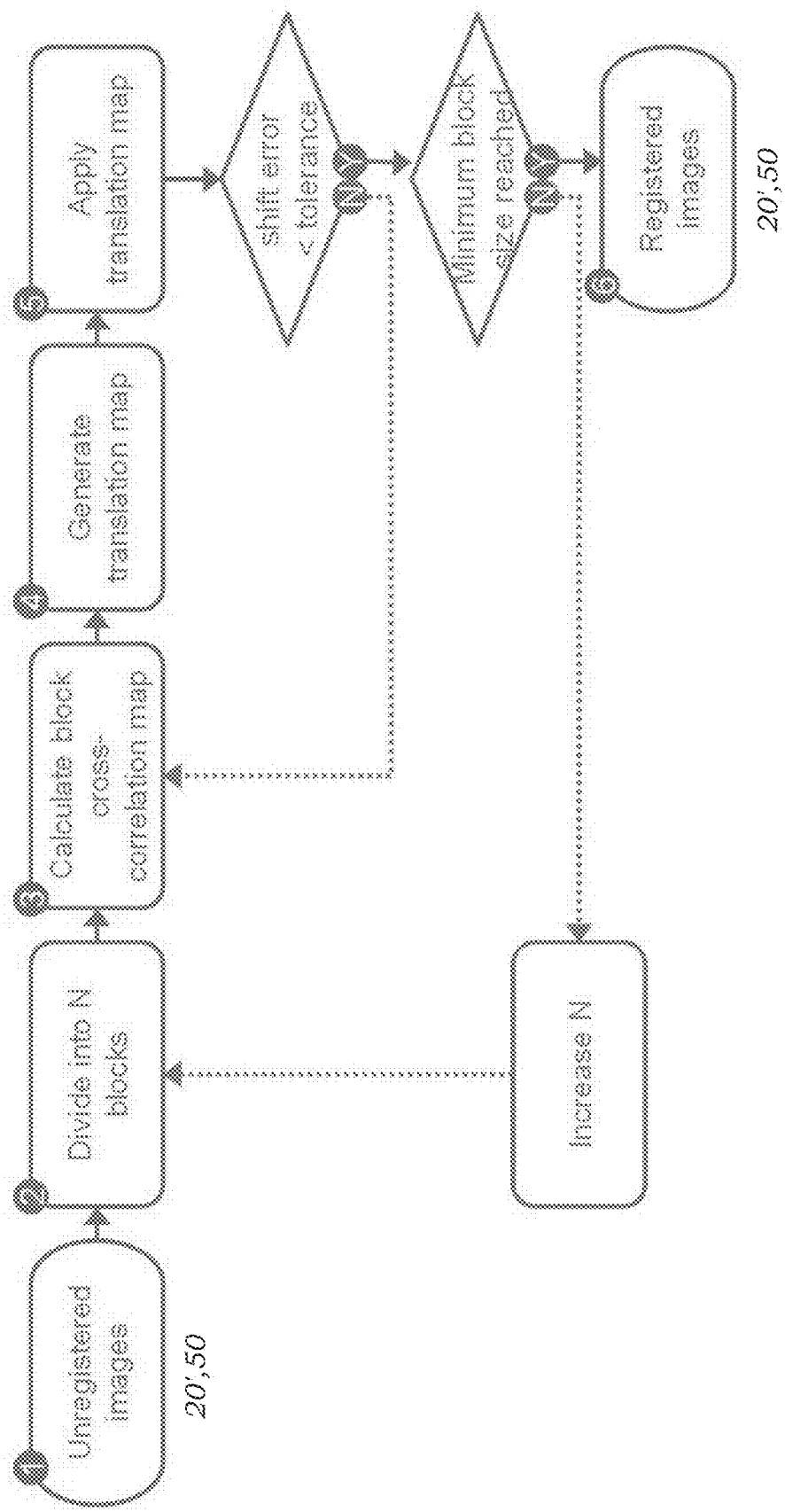

FIG. 34 illustrates the pyramidal elastic registration workflow (steps (1)-(6)). (1) The registration starts with roughly registered image pairs (e.g., 1024×1024 pixels). (2) The images are divided in to N blocks (e.g., N=4). (3) The 2D cross-correlation map of each block pair from the corresponding two input images is calculated. (4) The shift of each block is calculated by fitting a 2D Gaussian function to the peak of the cross-correlation map. This shift map (N×N) is interpolated to the image size (e.g., 1024×1024 pixels) as a translation map. (5) Apply the translation map to the image to be registered by linear interpolation. If the maximum value of the translation map is greater than the tolerance value (e.g. 0.2 pixels), repeat steps (3-5). Else if the block size is larger than the minimum block size (e.g. 64×64), increase N and shrink the block size (e.g., 1.2 times), and repeat steps (2-5). (6) When the shift error is below the tolerance, and the block size has reached the minimum set value, the input image pairs have been finely co-registered to each other with sub-pixel level of accuracy.

Figure 35A:
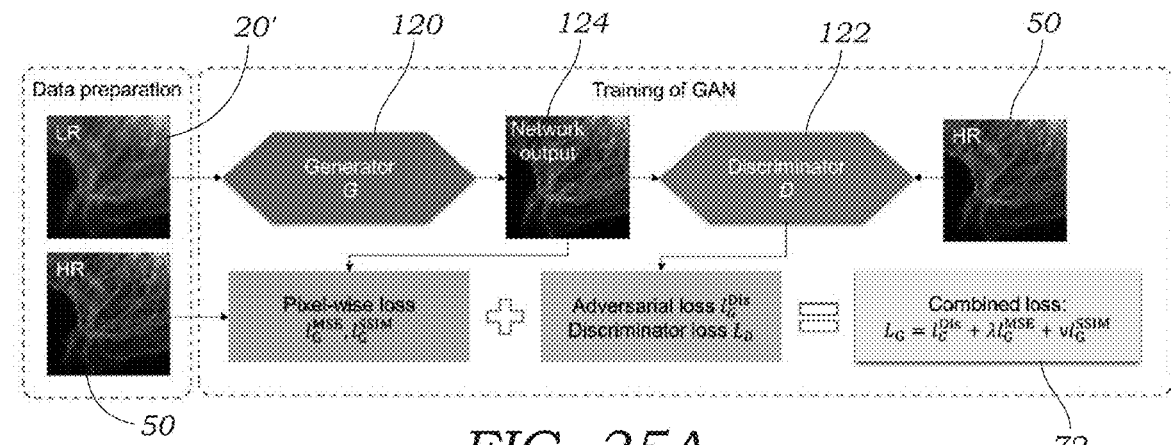
Figure 35B:
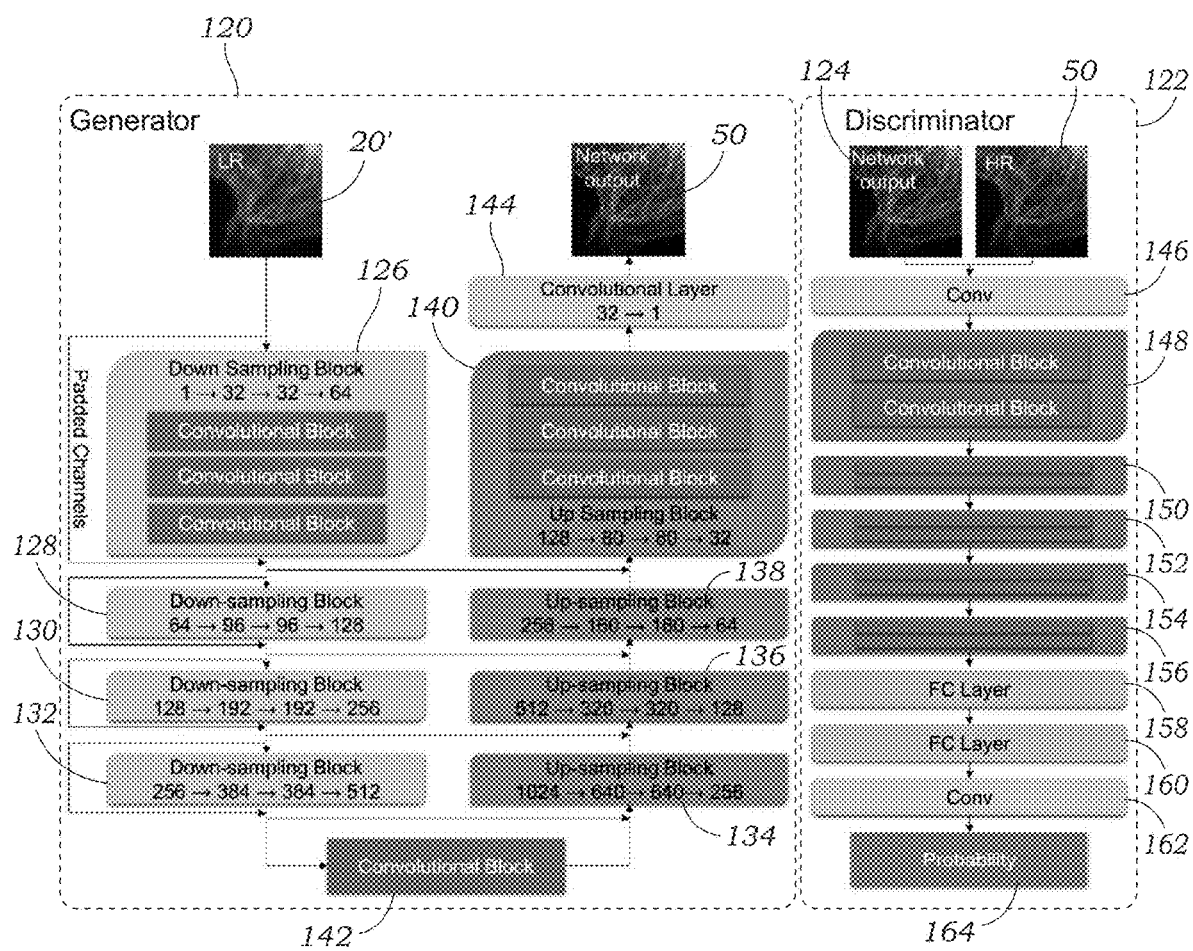

FIGS. 35A and 35B illustrate the training process and the architecture of the deep learning network, e.g., generative adversarial network that was used for super-resolution as disclosed herein. FIG. 35A illustrates the training of the GAN. FIG. 35B illustrates the architecture of the Generator network and the Discriminator network.

Figure 36:
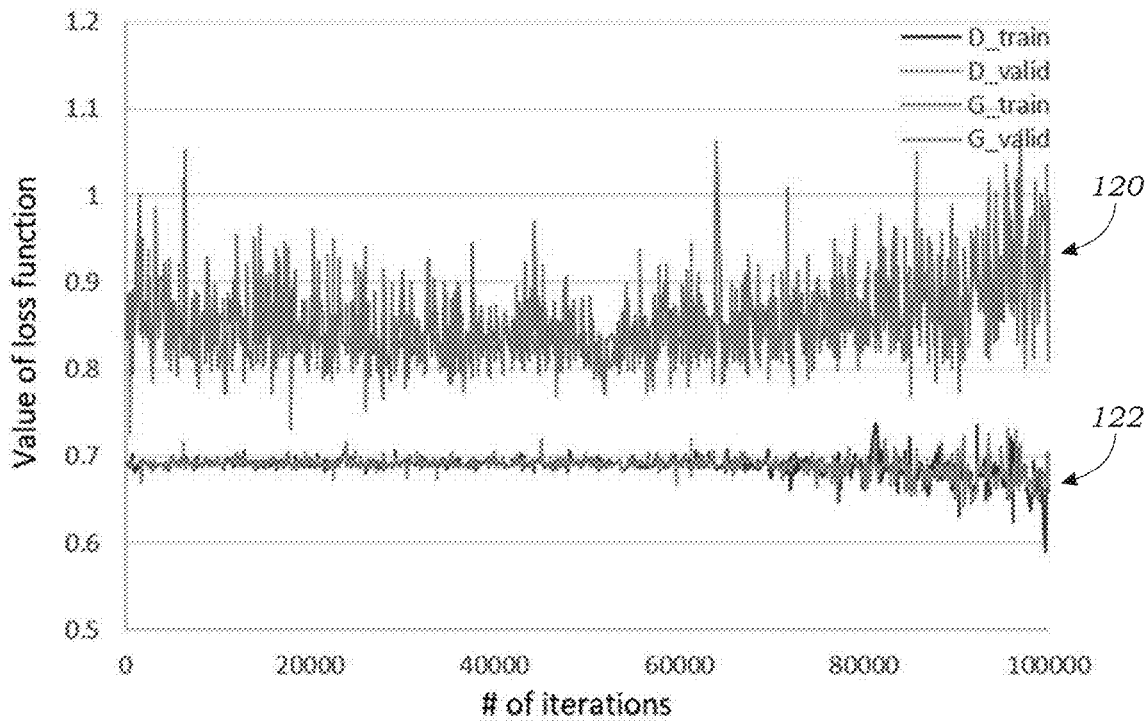

FIG. 36 is a typical plot of the loss functions of the Generator network and the Discriminator network models during the GAN training. The loss functions for the generator (G) and the discriminator (D) quickly converge to an equilibrium stage. The discriminator loss keeps stable while the generator loss slightly decreases, which means the MSE and SSIM losses that take a very small portion of the total generator loss are decreasing. In this competition process between G and D, the network gradually refines the learnt super-resolution image transformation and recovers better spatial details. After 60,000 iterations, the discriminator takes advantage and the generator loss begins to increase, which will lead to a mode collapse in the GAN network. Therefore, the trained model at 50,000 iterations was used as the final testing model.

Figure 37:
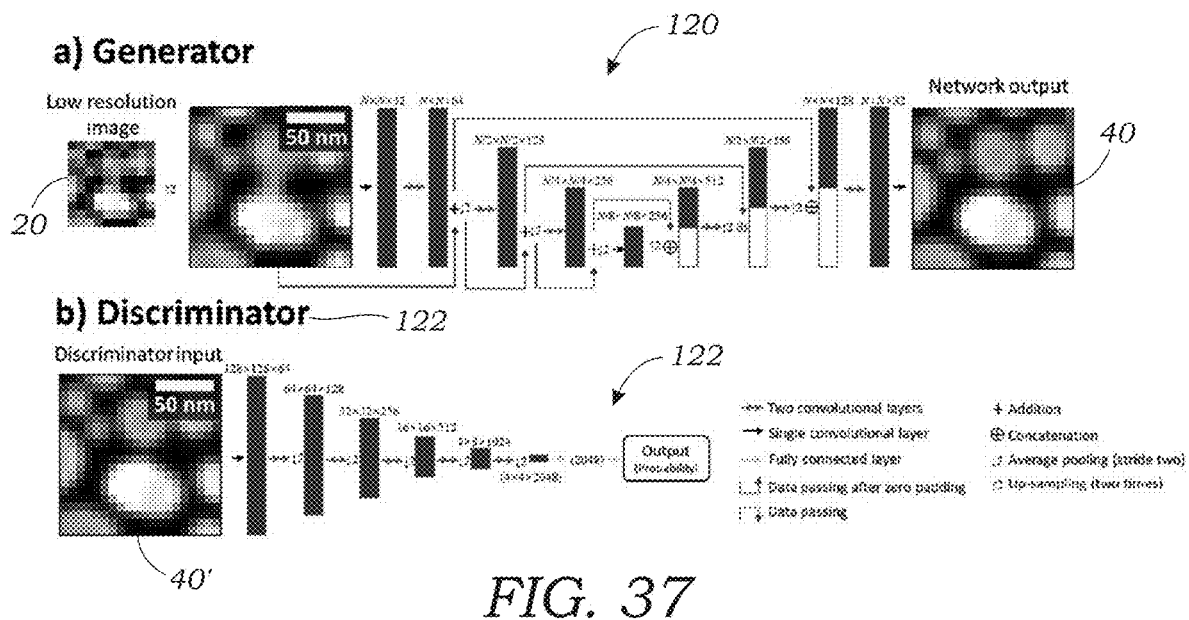

FIG. 37 schematically illustrates the network structure (Generator and Discriminator) used to improve the resolution of electron microscopy images. Every convolutional block is made up of two convolutional layers, each followed by a leaky rectified linear unit (ReLU) activation function. The second convolutional layer in each block changes the number of channels.

Figure 38:
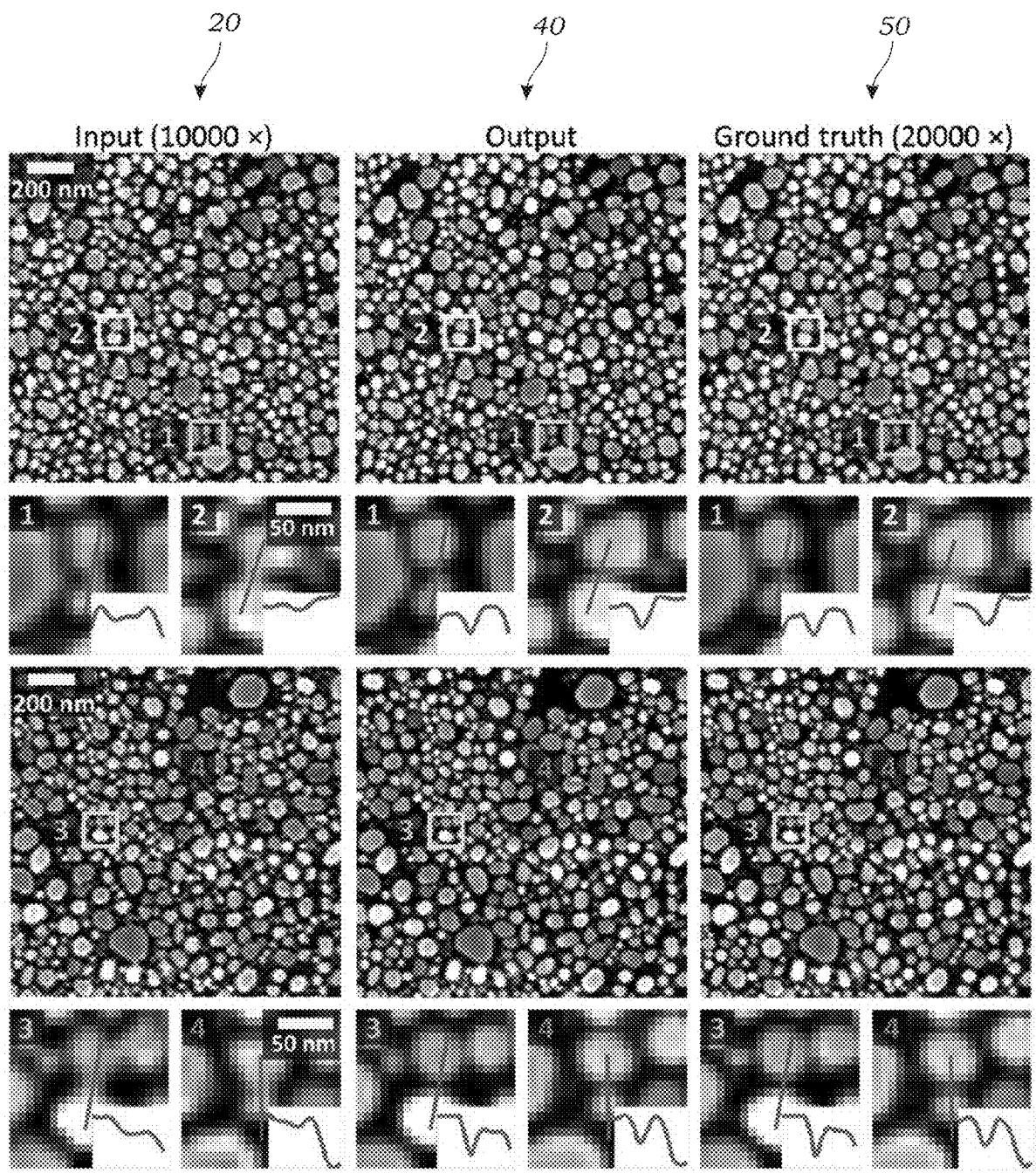

FIG. 38 illustrates examples of the up-sampled network input images compared to the output and ground truth SEM images. Cross sections of various spatial features with noticeable resolution enhancement are shown.

Figure 39:
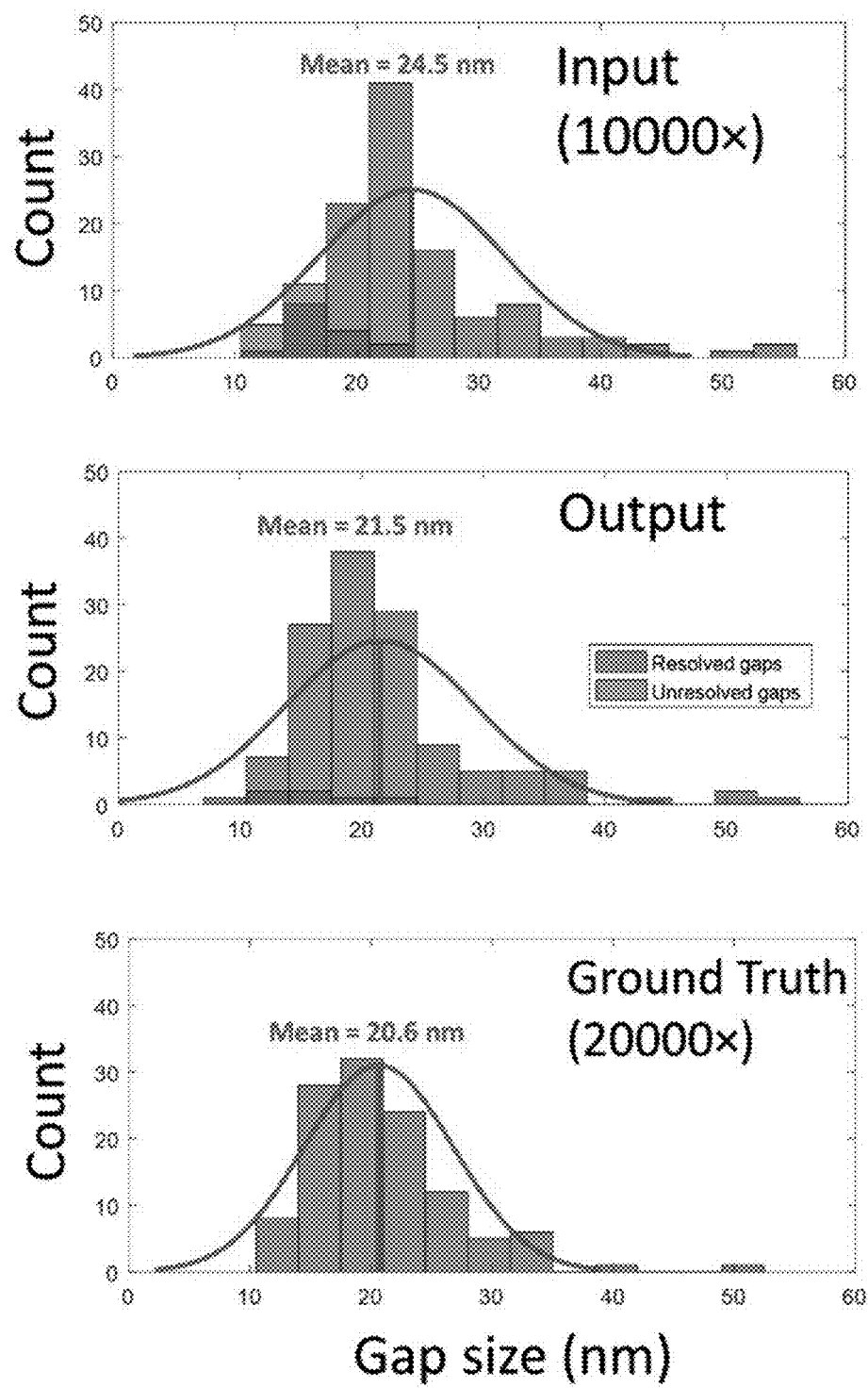

FIG. 39 illustrates histograms of the gap sizes inferred from the network input and the output images compared to the ground truth image. Total count changes among the histograms due to some of the gaps only being visible in specific images. In the input SEM images, 13.9% of the gaps were not detectable; the percentage of undetected gaps dropped to 3.7% for the output images. A Gaussian distribution, fitted to the gap histograms, with the corresponding mean gap size is also shown for each plot. The number of unresolved gaps in both the input and output images is also shown using a different color; unresolved gaps were not used for mean gap estimation. Pixel size per image is 7.1 nm; the input image is up-sampled by a factor of 2.

Figure 40:
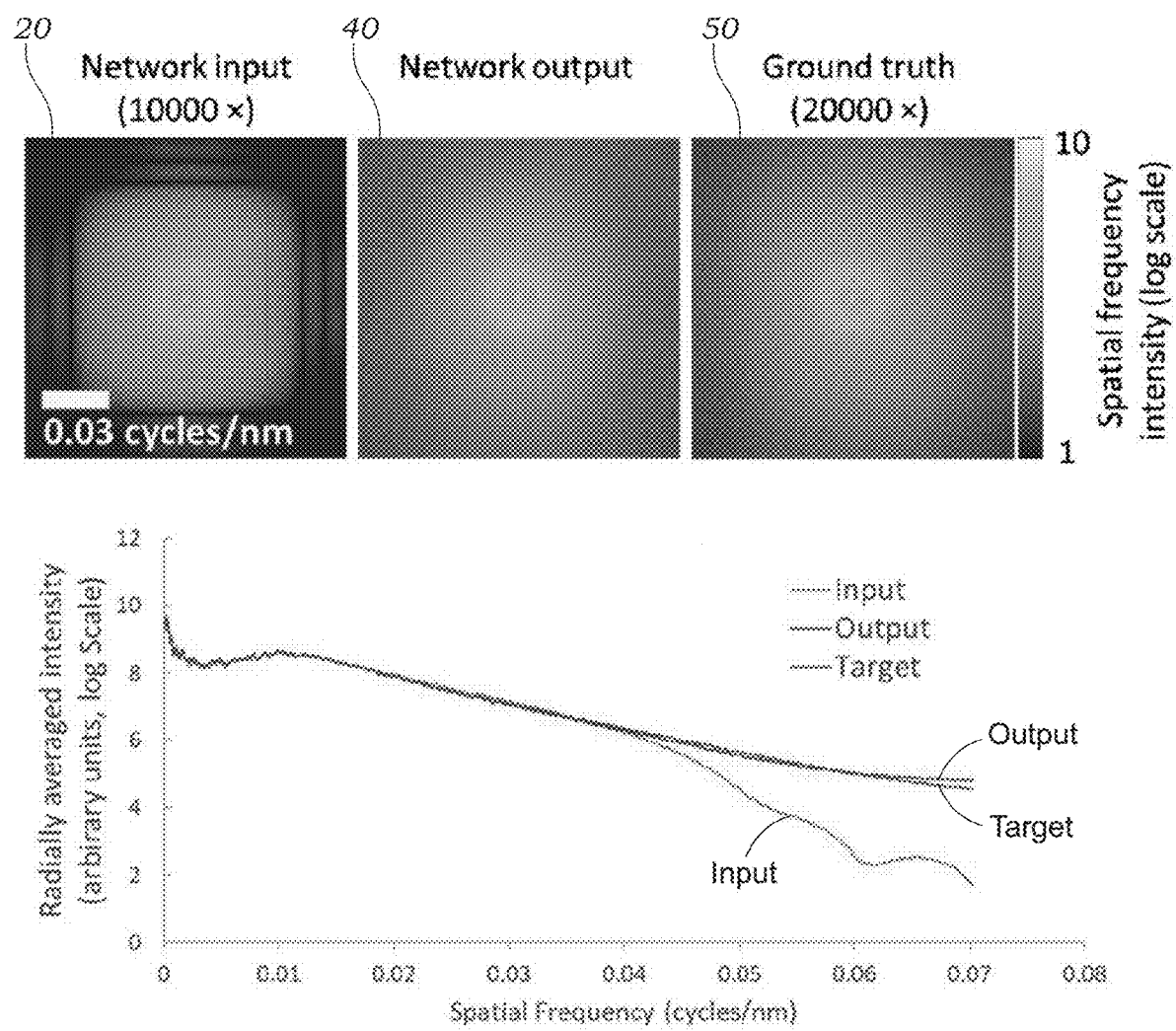

FIG. 40 illustrates (top) spatial frequency distribution of the up-sampled input, output, and ground truth images. Below is a radially-averaged plot of the above distributions. Analysis was performed on the uncropped versions of the SEM images shown in FIG. 38.

DETAILED DESCRIPTION OF THE ILLUSTRATED EMBODIMENTS

FIG. 1 schematically illustrates one embodiment of a system 2 for receiving an input image 20 obtained from a microscopy device 110 that outputs or generates an output image 40 that has improved one or more of resolution, depth-of-field, signal-to-noise ratio, and/or contrast. The system includes a computing device 100 that contains one or more processors 102 therein and software 104 such as image processing software that incorporates the trained deep neural network 10 (e.g., a convolutional neural network in certain embodiments). The computing device 100 may include, as explained herein, a personal computer, laptop, remote server, mobile computer, or the like, although other computing devices may be used (e.g., devices that incorporate one or more graphic processing units (GPUs) or other application specific integrated circuits (ASICs)). GPUs or ASICs can be used to accelerate training as well as final image output. As explained herein, the image processing software 104 can be implemented using Python and TensorFlow although other software packages and platforms may be used. The trained deep neural network 10 is not limited to a particular software platform or programming language and the trained deep neural network 10 may be executed using any number of commercially available software languages or platforms. The image processing software 104 that incorporates or runs in coordination with the trained deep neural network 10 may be run in a local environment or a remote cloud-type environment. In some embodiments, some functionality of the image processing software 104 may run in one particular language or platform (e.g., image pre-processing) while the trained deep neural network 10 may run in another particular language or platform. Nonetheless, both operations are carried out by image processing software 104.

As seen in FIG. 1, the trained deep neural network 10 receives a microscopy image 20 of a sample 22 obtained with a sensor 24. In some embodiments, such as for brightfield or fluorescence microscopy devices 110 the sensor 24 is an image sensor 24. For instance, the image sensor 24 may include a CMOS type image sensor that is well known and commercially available. In other embodiments, for example, when the microscopy device 110 is an electron microscope (e.g., scanning electron microscope (SEM)), the sensor 24 may include a sensor 24 that detects secondary or backscattered electrons that are used to generate images in scanning electron microscopes. Regardless of the nature of the nature or type of microscope device 110 the sensor 24 detects or captures the relevant signal(s) of interest.

The sample 22 may include, in some embodiments, tissue that is disposed on or in an optically transparent substrate 23 (e.g., a glass or plastic slide or the like). In this regard, the sample 22 may include a sample volume that is three dimensional. The sample 22 may also include particles, cells, or other micro-scale objects (those with micrometer-sized dimensions or smaller) located at various depths. The sample 22 may also include other organic or inorganic substances or materials. In some instances, the sample 22 may be need to be fixed prior to analysis. In addition, for some scanning electron microscope applications, the sample 22 may need to be coated with a metal such as gold which can be sputter-coated onto the sample 22.

The trained deep neural network 10 outputs or generates an "improved" output image 40 that has improved one or more of resolution, depth-of-field, signal-to-noise ratio, and/or contrast 40. The system and method described herein rapidly outputs output 40 images which, in some embodiments, is less than 1 second from being input to the trained deep neural network 10. The computing device 100 may be associated with or connected to a monitor or display 106 that is used to display the output images 40. The display 106 may be used to display a Graphical User Interface (GUI) that is used by the user to display and view the output images 40. In one preferred embodiment, the trained, deep neural network 10 is a Convolution Neural Network (CNN).

For example, in one preferred embodiment as is described herein, the trained deep neural network 10 is trained using a GAN model. In a GAN-trained deep neural network 10, two models are used for training. A generative model is used that captures data distribution while a second model estimates the probability that a sample came from the training data rather than from the generative model. Details regarding GAN may be found in Goodfellow et al., Generative Adversarial Nets., Advances in Neural Information Processing Systems, 27, pp. 2672-2680 (2014), which is incorporated by reference herein. Network training of the deep neural network 10 (e.g., GAN) may be performed the same or different computing device 100. For example, in one embodiment, a personal computer 100 may be used to train the GAN although such training may take a considerable amount of time. To accelerate this training process, one or more dedicated GPUs or ASICs may be used for training. Once the deep neural network 10 has been trained, the deep neural network 10 may be used or executed on a different computing device 100 which may include one with less computational resources used for the training process (although GPUs may also be integrated into execution of the trained deep neural network 10).

In order to train the deep neural network 10, there needs to be accurate alignment between the "lower" quality training images (or patches of images) 20' that are obtained with the microscopy device 110 and their corresponding high-resolution "gold standard" images 50. These gold standard or label images 50 are used to train the deep neural network 10 and may be obtained using the same microscopy device 110 but at a higher resolution or setting. This may include, for example, higher magnification settings (e.g., higher magnification or quality of lenses). In another embodiment, the gold standard images 50 may include super-resolved images that are obtained by multiple, lower resolution sub-pixel shifted images that are subject to image process algorithm performed by image processing software 104 whereby a higher resolution image is recovered/reconstructed. An example of this pixel super-resolution method may be found, for instance, in Bishara et al., Lensfree on-chip microscopy over a wide field-of-view using pixel super-resolution, Optics Express, 18(11), pp. 11181-11191 (2010), which is incorporated herein by reference. It should be understood, that in some embodiments, even the "lower" quality images 20 that are obtained may themselves be pixel super-resolved images. For example, the lower quality images 20 that are input to the trained neural network 10 may be super-resolved with fewer holograms (i.e., fewer shifts) that are then improved even beyond what was accomplished through the super-resolution process alone. Examples of using super-resolved images 20 as the input to a trained deep neural network 10 may be found, for example, in Liu et al., Deep learning-based super-resolution in coherent imaging systems, Scientific Reports, 9, Article number 3926 (2019), which is incorporated herein by reference.

Figure 2:
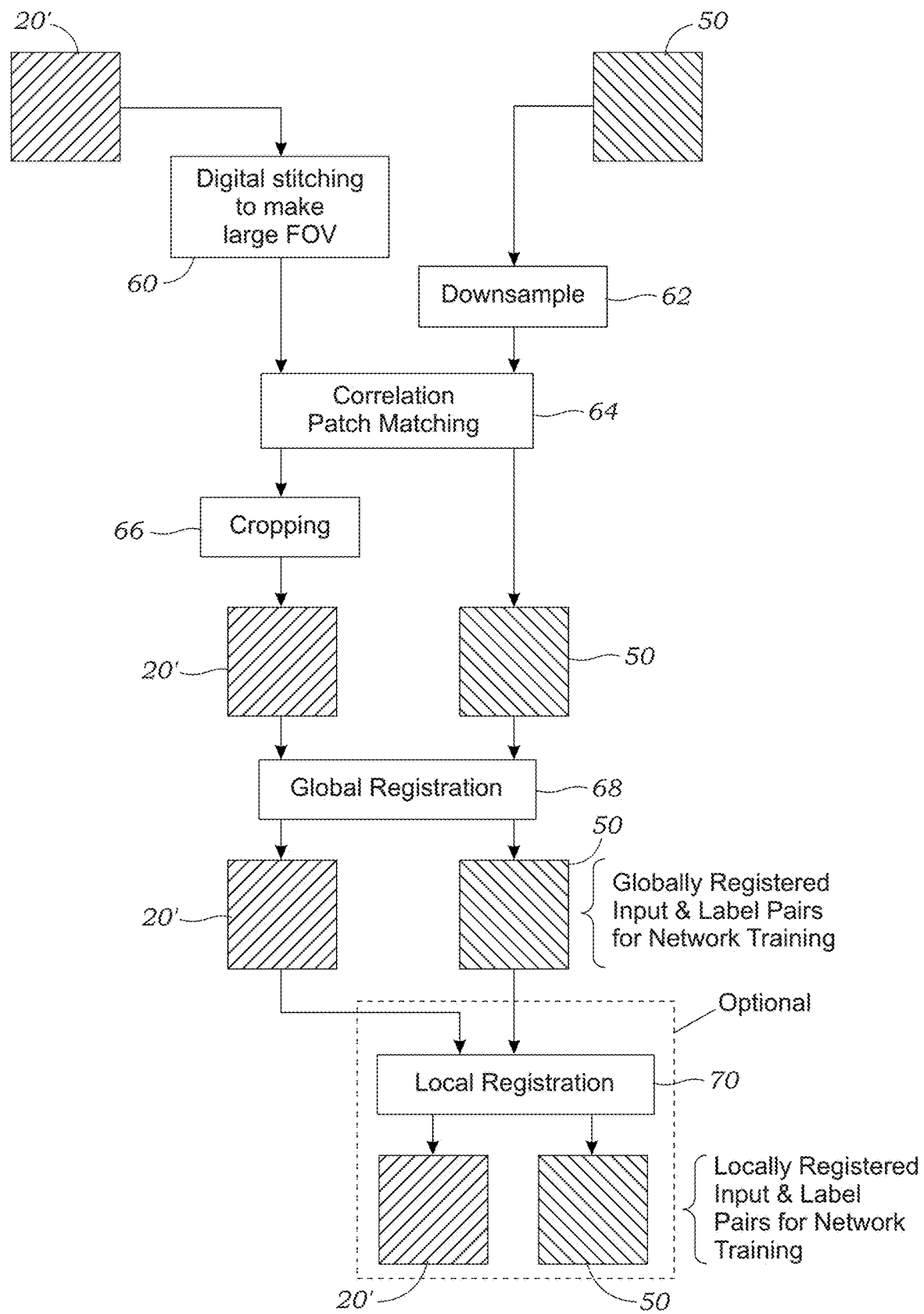
FIG. 2 schematically illustrates a global and local registration process whereby training image pairs are properly co-registered to one another for training of the deep neural network.

The gold standard or label images 50 may obtained by imaging the same sample 22 with a different type of microscopy device 110. This would enable images 20 be transformed from one imaging modality to another. As described herein, an example is provided that is able to transform confocal fluorescent images 20 to a STED microscopy image 40 of the same region of interest. Of course, other cross-modality transformations are contemplated. FIG. 2 illustrates one embodiment in which the training image pairs 20', 50 are properly co-registered to one another for training of the deep neural network 10. As seen in FIG. 2, this example refers to the training of bright-field images (or image patches) 20' of a tissue sample 22 that are accurately aligned with higher resolution images (or image patches) 50 of the same regions of interest of the sample 22.

As seen in FIG. 2, the lower resolution image 20' (which is converted to grayscale if color) is first subject to a digital stitching operation 60 to make a larger field-of-view image by digitally stitching a set of lower resolution images 20'. Each higher resolution image 50 is down-sampled 62. The down-sampled image is used as a template image to find the highest correlation patching patch in the low-resolution stitched image of 60. This correlation patch matching operation 64 is illustrated in FIG. 2. The highest correlating patch from the low-resolution stitched image 60 is then digitally cropped in operation 66. Operation 68 illustrates a global registration process where additional alignment is then performed on each of the input-label pairs to further refine the input-label matching, mitigating rotation, translation and scaling discrepancies between the lower resolution and higher resolution images 20', 50. These globally registered images (e.g., co-registered images) 20', 50 form an input-label pair, which is used for the network's 10 training and testing in one embodiment. In another embodiment as seen in FIG. 2, the globally registered images 20', 50 are then subject to an optional local registration operation 70 whereby sub-pixel level matching accuracy may be achieved. As described herein, this may include, for example, a pyramidal elastic registration process as described herein. These locally co-registered images 20', 50, like their globally-registered counterparts can be used for training of the deep neural network 10. Of course, there may be some instances where local registration 70 is not needed and sufficient image improvement is achieved even without local registration 70.

Figure 3A:
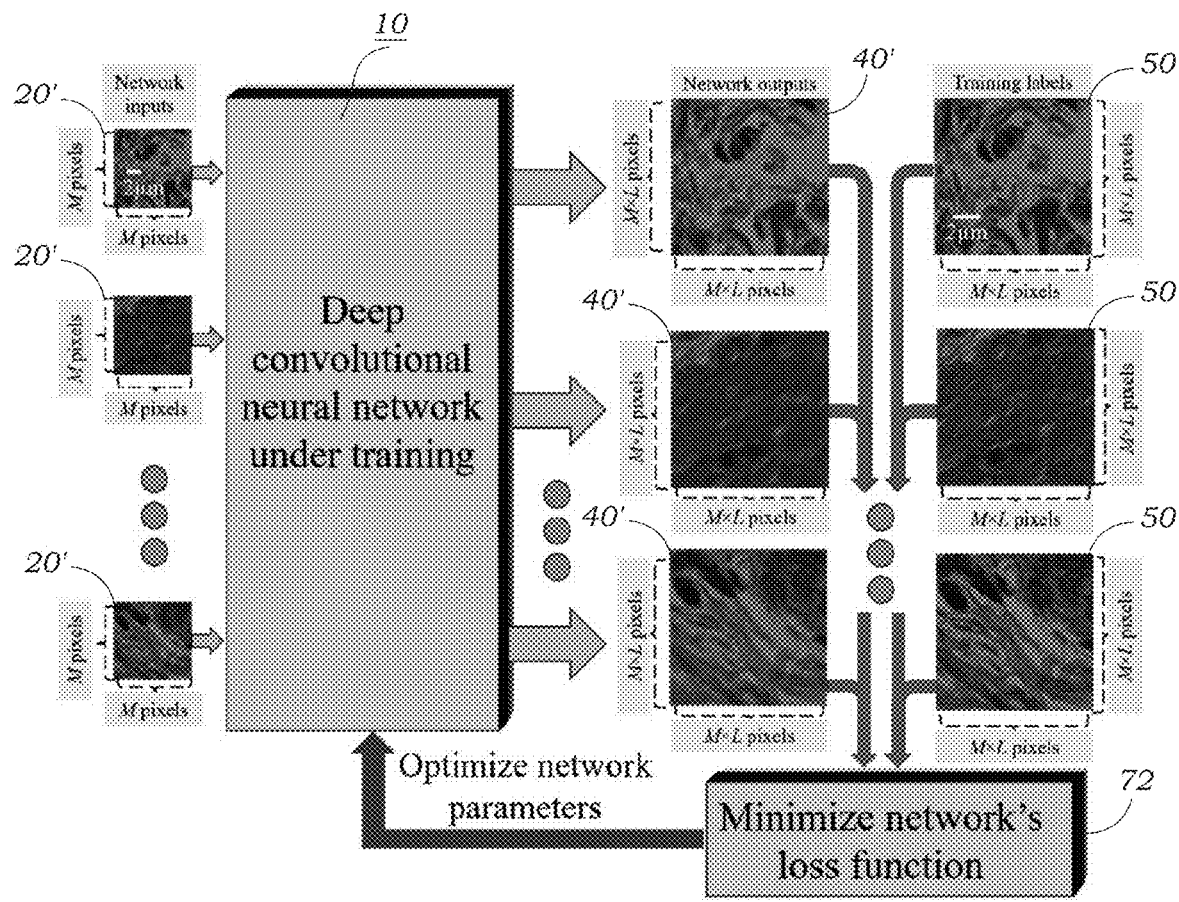
FIG. 3A schematically illustrates the training of the deep neural network according to one embodiment. The input is composed of a set of lower resolution images and the training labels are their corresponding high-resolution images. The deep neural network is trained by optimizing various parameters, which minimize the loss function between the network's output and the corresponding high-resolution training labels.
Figure 3B:
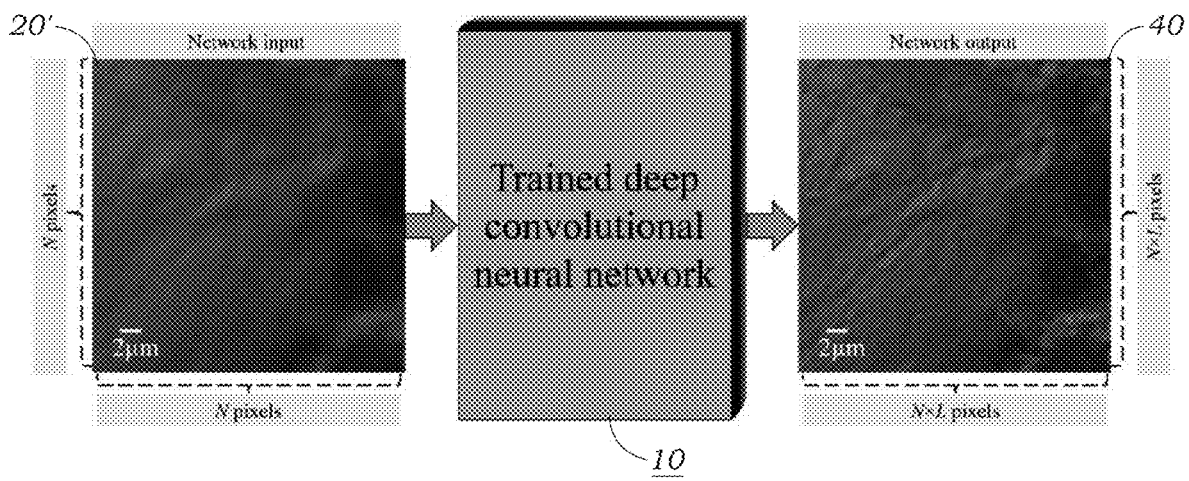
FIG. 3B schematically illustrates a trained deep neural network. After the training phase is complete, the network is blindly given an N×N pixel input image and rapidly outputs an (N×L)×(N×L) image, showing improved spatial resolution, field-of-view and depth-of-field.

FIG. 3A schematically illustrates one embodiment of the training of the deep neural network 10. As seen in FIG. 3A, the deep neural network 10 is trained by inputting the training image 20' to the deep neural network 10 and comparing the output image 40' that is generated by the deep neural network 10 as compared to the "gold standard" paired training label image 50. As seen in FIG. 3A, a loss function 72 is used to quantify the effective differences (e.g., error) between the output image 40 and the corresponding training labels. This loss function is optimized (minimized) by backpropagating the error through the deep neural network 10 so that the network's parameters are learnt in an optimization process. This process results in a final deep neural network 10 being established which is illustrated in FIG. 3B. The now trained deep neural network 10 can receive the input microscopy image 20 and output or generate the output image 40 that has improved one or more of resolution, depth-of-field, signal-to-noise ratio, and/or contrast.

Bright-Field Microscopy

In a first example, a trained deep neural network 10 was used to significantly enhance the performance of an optical microscope 110 (bright-field microscope) without changing its design or hardware. This network 10 uses a single image 20 that is acquired under a standard microscope 110 as the input and quickly outputs an improved image 40 of the same specimen, e.g., in less than 1 sec using a laptop, matching the resolution of higher numerical aperture (NA) objectives, while at the same time surpassing their limited field-of-view (FOV) and depth-of-field (DOF). The first step in the deep learning-based microscopy framework involves learning the statistical transformation between low-resolution and high-resolution microscopic images as described above, which is used to train the deep neural network 10 (e.g., CNN in one embodiment). Normally, this transformation can be physically understood as a spatial convolution operation followed by an under-sampling step (going from a high resolution and high magnification microscopic image to a low-resolution and low magnification one). However, the proposed CNN framework is detached from the physics of light-matter interaction and image formation, and instead focuses on training of multiple layers of artificial neural networks to statistically relate low-resolution images 20' (input) to high-resolution images 50 (output) of a sample 22.

In fact, to train and blindly test this deep learning-based network 10, bright-field microscopy was chosen with spatially and temporally incoherent broadband illumination, which presents challenges to provide an exact analytical or numerical modelling of light-sample interaction and the related physical image formation process, making the relationship between high-resolution images and low-resolution ones significantly more complicated to exactly model or predict. Although bright-field microscopy images 20 are the focus of the experiments described herein, the same deep learning framework is broadly applicable to other microscopy modalities, including e.g., holography, dark-field, fluorescence, multi-photon, optical coherence tomography, coherent microscopy, confocal microscopy, among others.

Experimental

To initially train the deep neural network 10, optical microscopy images of Masson's trichrome stained lung tissue sections using a pathology slide were acquired, obtained from an anonymous pneumonia patient. The lower resolution images 20' were acquired with a 40×/0.95 NA objective lens providing a FOV of 150 μm×150 μm per image, while the higher resolution training images 50 were acquired with a 100×/1.4 NA oil-immersion objective lens providing a FOV of 60 μm×60 μm per image, i.e., 6.25-fold smaller in area. Both the low-resolution 20' and high-resolution images 50 were acquired with 0.55-NA condenser illumination leading to a diffraction limited resolution of ~0.36 μm and 0.28 μm, respectively, both of which were adequately sampled by the image sensor chip, with an 'effective' pixel size of ~0.18 μm and ~0.07 μm, respectively. Following the digital registration procedure described in FIG. 2 to match the corresponding fields-of-view of each set of images, 179 low-resolution images 20' were generated corresponding to different regions of the lung tissue sample, which were used as input to the deep neural network 10, together with their corresponding high-resolution labels 50 for each FOV. Out of these images, 149 low-resolution input images 20' and their corresponding high-resolution labels 50 were randomly selected to be used as the training image set, while 10 low-resolution images 20 and their corresponding high-resolution labels 50 were used for selecting and validating the final network model, and the remaining 20 low-resolution images 20 and their corresponding high-resolution labels 50 formed the test images that were used to blindly quantify the average performance of the final network. This training dataset was further augmented by extracting 60×60-pixel and 150×150-pixel image patches with 40% overlap, from the low-resolution and high-resolution images 20', 50, respectively, which effectively increased the training data size by more than six-fold.

These patches of the training images 20' were randomly assigned to 149 batches, each containing 64, randomly drawn, low and high-resolution image pairs 20', 50, forming a total of 9,536 input patches for the network training process. The pixel count and the number of the image patches were empirically determined to allow rapid training of the deep neural network 10, while at the same time containing distinct sample features in each patch. In this training phase, as outlined herein, an optimization algorithm to adjust the network's 10 parameters using the training image set and utilized the validation image set to determine the best network model, also helping to avoid overfitting to the training image data.

Figure 4A:
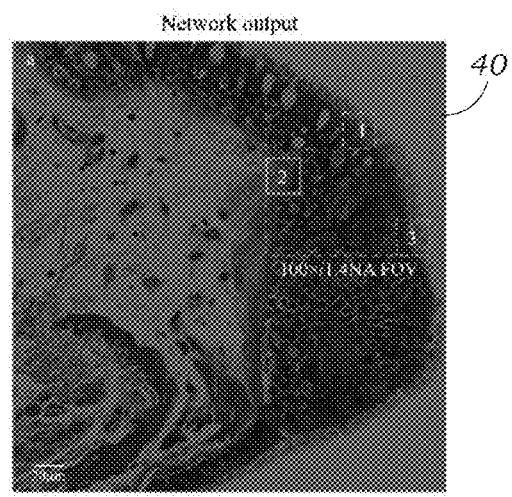
Figures 4B, 4C, 4D, 4E, 4F:
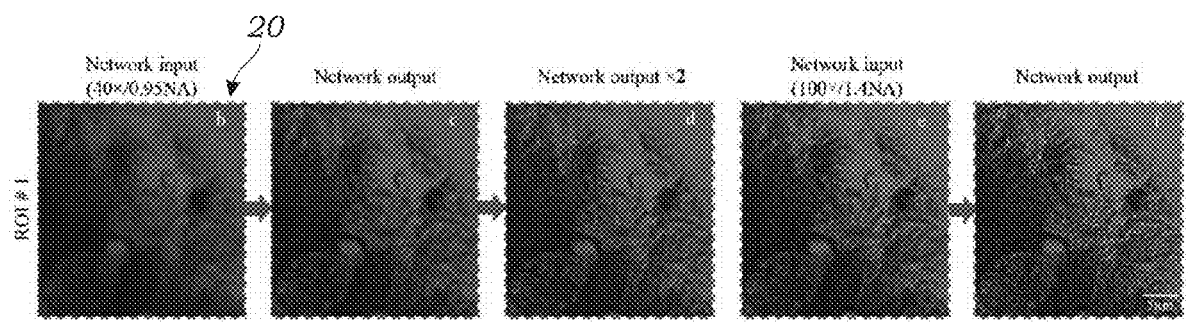

After this training procedure, which needs to be performed only once, the deep neural network 10 is fixed as seen in FIG. 3B and ready to blindly output high resolution images 40 of samples 22 of any type from a low resolution input image 20, e.g., not necessarily from the same tissue type that the deep neural network 10 has been trained on. To demonstrate the success of this deep learning enhanced microscopy approach, first the network's 10 model was blindly tested on entirely different sections of Masson's trichrome stained lung tissue, which were not used in the training process, and in fact were taken from another anonymous patient. These samples were imaged using the same 40×/0.95 NA and 100×/1.4 NA objective lenses with 0.55 NA condenser illumination, generating various input images for deep neural network 10. The output images of the deep neural network 10 for these input images are summarized in FIGS. 4A-4P, which clearly demonstrate the ability of the network 10 to significantly enhance the spatial resolution of the input images 20, whether or not they were initially acquired with a 40×/0.95 NA or a 100×/1.4 NA objective lens. For the network output image 40 shown in FIG. 4A, an input image 20 was acquired with a 40×/0.95 NA objective lens and therefore it has a FOV that is 6.25-fold larger compared to the 100× objective FOV, which is highlighted with a dashed-box in FIG. 4A. Zoomed in regions of interest (ROI) corresponding to various input and output images 20, 40 are also shown in FIGS. 4B-4P better illustrating the fine spatial improvements in the network output images 40 compared to the corresponding input images 20. To give an example on the computational load of this approach, the network output images 40 shown in FIGS. 4A and 4C, 4H, 4M (with FOVs of 378.8×378.8 μm and 29.6×29.6 μm, respectively) took on average 0.695 sec and 0.037 sec, respectively, to compute using a dual graphics processing unit (GPU) running on a laptop computer.

Figures 4G, 4H, 4I, 4J, 4K:
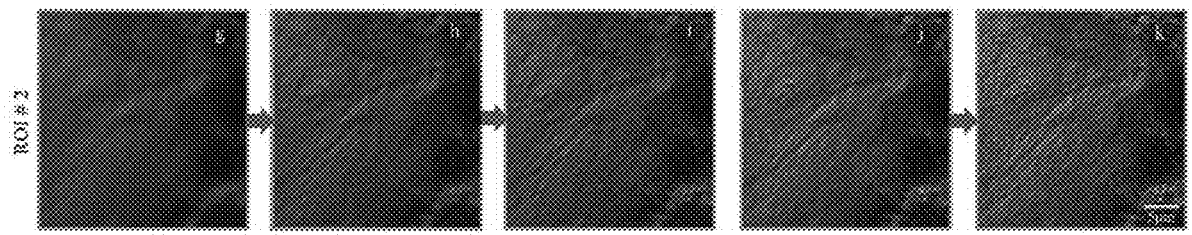
Figures 4L, 4M, 4N, 4O, 4P:
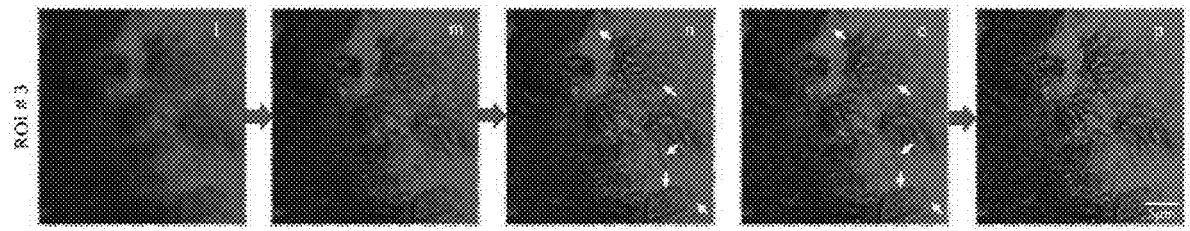

With reference to FIGS. 4D, 4I, and 4N, the 'self-feeding' of the output of the network as its new input significantly improves the resulting output image 40. A minor disadvantage of this self-feeding approach is increased computation time, e.g., ~0.062 sec on average for FIGS. 4D, 4I, and 4N on the same laptop computer 110, in comparison to ~0.037 sec on average for FIGS. 4C, 4H, 4M. After one cycle of feeding the network 10 with its own output, the next cycles of self-feeding do not change the output images 40 in a noticeable manner, as also highlighted in FIGS. 5A-5E.

Quite interestingly, when the same deep neural network 10 model was used on input images 20 acquired with a 100×/1.4 NA objective lens, the network output images 40 also demonstrate significant enhancement in spatial details that appear blurry in the original input images 20. These results are demonstrated in FIGS. 4F, 4K, 4P and FIGS. 6A-6I revealing that the same trained deep neural network 10 (which was trained on the transformation of 40×/0.95 NA images into 100×/1.4 NA images) can also be used to super-resolve images 20 that were captured with higher-magnification and higher numerical-aperture lenses compared to the input images 20' of the training model. This feature suggests the scale-invariance of the image transformation (from lower resolution input images to higher resolution ones) that the deep neural network 10 is trained on.

Next, the same lung tissue trained deep neural network 10 was blindly tested for improving the microscopic images 20 of a Masson's trichrome stained kidney tissue section obtained from an anonymous moderately advanced diabetic nephropathy patient. The network output images 40 shown in FIGS. 7A-7P emphasize several important features of the deep learning-based microscopy system 2. First, this tissue type, although stained with the same dye (Masson's trichrome) is entirely new to the lung tissue trained deep neural network 10, and yet, the output images 40 clearly show a similarly outstanding performance as in FIGS. 4A-4P. Second, similar to the results shown in FIGS. 4A-4P, self-feeding the output of the same lung tissue network 10 as a fresh input back to the network 10 further improves the reconstructed images, even for a kidney tissue that has not been part of the training process; see e.g., FIGS. 7D, 7I, 7N. Third, the output images 40 of the deep neural network 10 also exhibit significantly larger depth-of-field (DOF). To better illustrate this, the output image of the lung tissue trained deep neural network 10 on a kidney tissue section imaged with a 40×/0.95 NA objective was compared to an extended DOF image, which was obtained by using a depth-resolved stack of five (5) images acquired using a 100×/1.4 NA objective lens (with 0.4 μm axial increments). To create the gold standard, i.e., the extended DOF image used for comparison to the network output images 40, these five (5) depth-resolved images acquired with a 100×/1.4 NA objective lens were merged using a wavelet-based depth-fusion algorithm. The network's 10 output images 40, shown in FIGS. 7D, 7I, 7N, clearly demonstrate that several spatial features of the sample that appear in-focus in the deep learning output image 40 can only be inferred by acquiring a depth-resolved stack of 100×/1.4 NA objective images because of the shallow DOF of such high NA objective lenses—also see the pointers in FIGS. 7N and 7P to better visualize this DOF enhancement. Stated differently, the network output image 40 not only has 6.25-fold larger FOV (~379×379 µm) compared to the images of a 100×/1.4 NA objective lens, but it also exhibits a significantly enhanced DOF. The same extended DOF feature of the deep neural network image 40 inference is further demonstrated using lung tissue samples shown in FIGS. 4N and 4O.

Until now, the focus has been on bright-field microscopic images of different tissue types, all stained with the same dye (Masson's trichrome) and a deep neural network 10 was used to blindly transform lower resolution images of these tissue samples 22 into higher resolution ones 40, also showing significant enhancement in FOV and DOF of the output images. Next, it was tested to see if a deep neural network 10 that is trained on one type of stain can be applied to other tissue types that are stained with another dye. To investigate this, a new deep neural network 10 (CNN with the same network architecture) using microscopic images of a hematoxylin and eosin (H&E) stained human breast tissue section obtained from an anonymous breast cancer patient. As before, the training pairs 20', 50 were created from 40×/0.95 NA lower resolution images and 100×/1.4 NA high-resolution images (see Tables 1, 2 for specific implementation details). First, this trained deep neural network 10 was blindly tested on images of breast tissue samples (which were not part of the network training process) acquired using a 40×/0.95 NA objective lens. FIGS. 8A-8N illustrate the success of this blind testing phase, which is expected since this network 10 has been trained on the same type of stain and tissue (i.e., H&E stained breast tissue). To compare, in the same FIG. 8, the output images 40 of a previously used deep neural network model (trained using lung tissue sections stained with the Masson's trichrome) for the same input images 20 is also reported in FIGS. 8B, 8F, 8G, 8L, 8M. Except a relatively minor color distortion, all the spatial features of the H&E stained breast tissue sample have been resolved using a deep neural network 10 trained on Masson's trichrome stained lung tissue. These results, together with those discussed previously, clearly demonstrate the universality of the deep neural network 10, and how it can be used to output enhanced microscopic images of various types of samples 22, from different patients, different organs, and different types of stains. A similarly outstanding result, with the same conclusion, is provided in FIGS. 9A-9T, where the deep learning network trained on H&E stained breast tissue images was applied on Masson's trichrome stained lung tissue samples imaged using a 40×/0.95 NA objective lens, representing the opposite case of FIGS. 8A-8N.

Figures 10A, 10B, 10C, 10D:
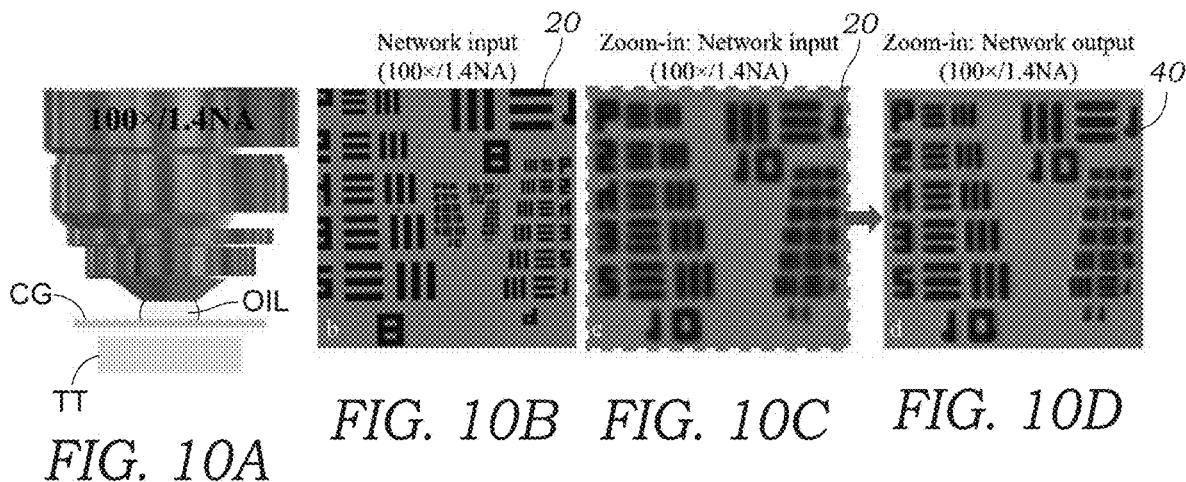
FIG. 10A illustrates the experimental apparatus used in one embodiment: the US air-force (USAF) resolution target lies on a glass slide, with an air-gap in-between, leading to an effective numerical aperture of ≤1. The resolution test target was illuminated using a condenser with a numerical aperture of 0.55, leading to lateral diffraction limited resolution of ≥0.355 μm.
FIG. 10B illustrates the input image acquired with a 100×/1.4 NA.
FIG. 10C illustrates a zoomed-in image of the highlighted region of interest highlighted in FIG. 10B
FIG. 10D illustrates the network output image of the deep neural network applied on the image of FIG. 10B, 10C
Figures 10E, 10F:
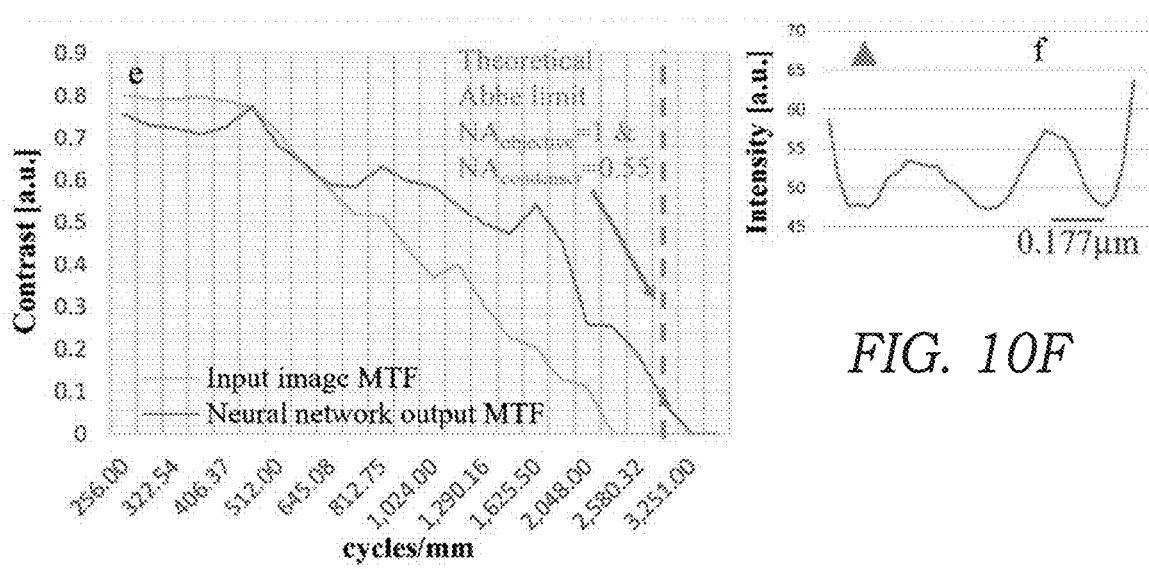
FIG. 10E is the modulation transfer function (MTF) calculated from the input and output images of the deep network.
FIG. 10F is the cross-sectional profile of group 11, element 4 (period: 0.345 μm) extracted from the network output image shown in FIG. 10D.

Finally, to quantify the effect of the deep neural network 10 on the spatial frequencies of the output image 40, the deep neural network 10 (e.g., CNN) that was trained using the lung tissue model was tested on a resolution test target, which was imaged using a 100×/1.4 NA objective lens, with a 0.55 NA condenser. The objective lens was oil immersed as depicted in FIG. 10A, while the interface between the resolution test target (TT) and the sample cover glass (CG) was not oil immersed, leading to an effective NA of ≤1 and a lateral diffraction limited resolution of ≥0.355 µm. The modulation transfer function (MTF) was evaluated by calculating the contrast of different elements of the resolution test target. Based on this experimental analysis, the MTFs for the input image 20 and the output image 40 of the deep neural network 10 that was trained on lung tissue are compared to each other in as described at within section entitled "Modulation Transfer Function (MTF) Analysis" herein. The output image 40 of the deep neural network 10, despite the fact that it was trained on tissue samples imaged with a 40×/0.95 NA objective lens, shows an increased modulation contrast for a significant portion of the spatial frequency spectrum (FIG. 10E), at especially high frequencies, while also resolving a period of 0.345 µm (FIG. 10F).

The method and system described herein demonstrates how deep learning significantly enhances optical microscopy images, by improving their resolution, FOV and DOF, and image contrast. This deep learning approach is extremely fast to output an improved image, e.g., taking on average ~0.69 sec per image with a FOV of ~379×379 µm even using a laptop computer, and only needs a single image taken with a standard optical microscope without the need for extra hardware or user specified post-processing. After appropriate training, the deep neural network framework is universally applicable to all forms of optical microscopy and imaging techniques and can be used to transfer images that are acquired under low resolution systems into high resolution and wide-field images, significantly extending the space bandwidth product of the output images. Furthermore, using the same deep learning approach the extension of the spatial frequency response of the imaging system has been demonstrated along with an extended DOF. In addition to optical microscopy, this entire framework can also be applied to other computational imaging approaches, also spanning different parts of the electromagnetic spectrum, and can be used to design computational imagers with improved resolution, FOV and DOF.

Methods

Sample Preparation:

De-identified formalin-fixed paraffin-embedded (FFPE) hematoxylin and eosin (H&E) stained human breast tissue section from a breast cancer patient, Masson's trichrome stained lung tissue section from two pneumonia patients, and Masson's trichrome stained kidney tissue section from a moderately advanced diabetic nephropathy patient were obtained from the Translational Pathology Core Laboratory at UCLA. Sample staining was done at the Histology Lab at UCLA. All the samples were obtained after de-identification of the patient and related information and were prepared from existing specimen. Therefore, this work did not interfere with standard practices of care or sample collection procedures.

Microscopic Imaging:

Image data acquisition was performed using an Olympus IX83 microscope equipped with a motorized stage and controlled by MetaMorph® microscope automation software (Molecular Devices, LLC). The images were acquired using a set of Super Apochromat objectives, (UPLSAPO 40×2/0.95 NA, 100×0/1.4 NA—oil immersion objective lens). The color images were obtained using a Qimaging Retiga 4000R camera with a pixel size of 7.4 µm.

Deep Learning Network Architecture

Figure 11:
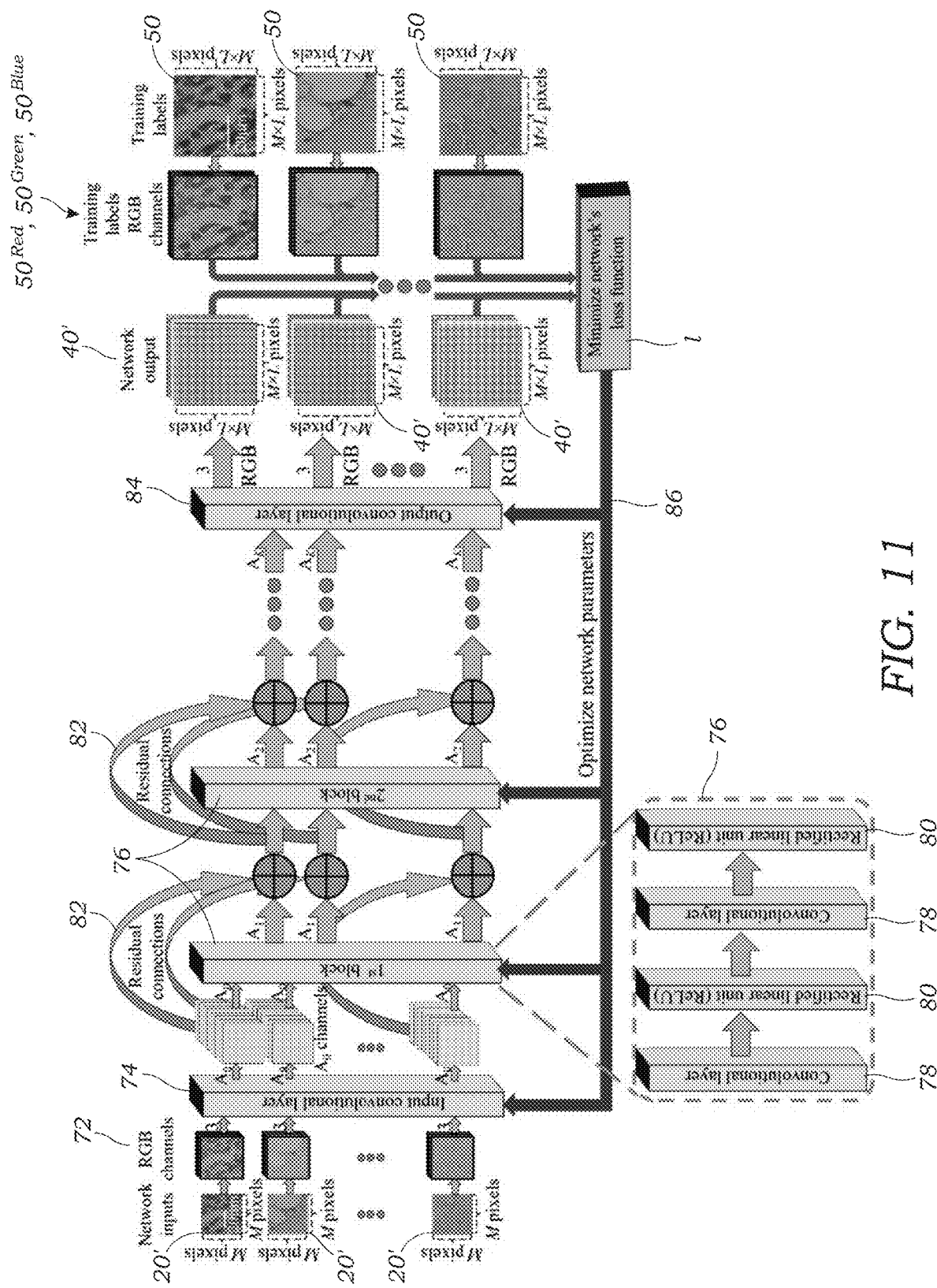
FIG. 11 is a schematic illustration of the deep neural network during the training phase according to one embodiment.
Figure 12:
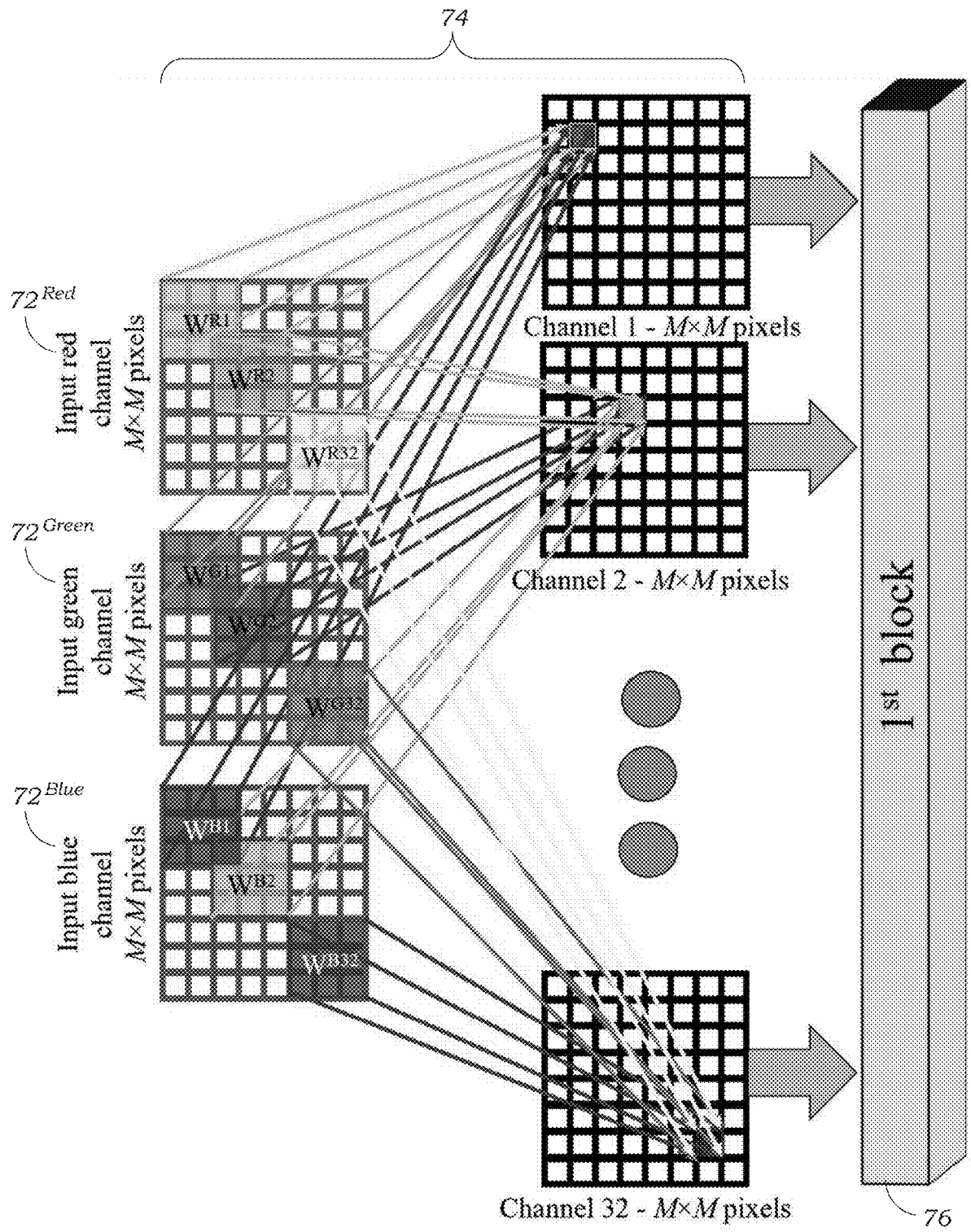
FIG. 12 is a schematic illustration of the input layer of the deep neural network according to one embodiment.

The schematics of the architecture for training the deep neural network 10 is depicted in FIG. 11. The input training images 20' are mapped into three (3) color channels: red, green and blue (RGB) as illustrated by operation 72. The input convolutional layer 74 maps the 3 input color channels, into 32 channels, as depicted in FIG. 12. The number of output channels of the first convolutional layer 74 was empirically determined to provide the optimal balance between the deep neural network's size (which affects the computational complexity and image output time) and its image transform performance. The input convolutional layer is followed by K=5 residual blocks 76. Each residual block 76 is composed of two (2) convolutional layers 78 and two (2) rectified linear units (ReLU) 80, as shown in FIG. 11.

The ReLU is an activation function which performs ReLU (x)=max(0, x). The formula of each block can be summarized as:

$$X_{k+1} = X_k + \text{ReLU}(\text{ReLU}(X_k * W_k^{(1)}) * W_k^{(2)}), \quad (1)$$

where * refers to convolution operation, $X_k$ is the input to the k-th block, $X_{k+1}$ denotes its output, $W_k^{(1)}$ and $W_k^{(2)}$ denote an ensemble of learnable convolution kernels of the k-th block, where the bias terms are omitted for simplicity. The output feature maps of the convolutional layers in the network are calculated as follows:

$$g_{k,j} = \sum_i f_{k,i} * w_{k,i,j} + \beta_{k,j}\Omega, \quad (2)$$

where $w_{k,i,j}$ is a learnable 2D kernel (i.e., the (i,j)-th kernel of $W_k$) applied to the i-th input feature map, $f_{k,i}$ (which is an M×M-pixel image in the residual blocks), $\beta_{k,j}$ is a learnable bias term, $\Omega$ is an M×M matrix with all its entries set as 1, and $g_{k,j}$ is the convolutional layer j-th output feature map (which is also an M×M-pixel image in the residual blocks). The size of all the kernels (filters) used throughout the network's 10 convolutional layers is 3×3. To resolve the dimensionality mismatch of Eq. (2), prior to convolution, the feature map $f_{k,i}$ is zero-padded to a size of (M+2)×(M+2) pixels, where only the central M×M-pixel part is taken following the convolution with kernel $w_{k,i,j}$.

To allow high level feature inference the number of features learnt in each layer in increased by gradually increasing the number of channels, using the pyramidal network concept. Using such pyramidal networks helps to keep the network's width compact in comparison to designs that sustain a constant number of channels throughout the network. The channel increase formula was empirically set according to:

$$A_k = A_{k-1} \text{ floor}((\alpha \times k)/K + 0.5) \quad (3)$$

where $A_0=32$, k=[1:5], which is the residual block number, K=5 is the total number of residual blocks used in the architecture and a is a constant that determines the number of channels that will be added at each residual block. In this implementation, $\alpha=10$ was used, which yields $A_5=62$ channels at the output of the final residual block. In addition, residual connections 82 were used (shortcutting the block's input to its output, see FIG. 11), which was demonstrated to improve the training of deep neural network 10 by providing a clear path for information flow and speed up the convergence of the training phase. Nevertheless, increasing the number of channels at the output of each layer leads to a dimensional mismatch between the inputs and outputs of a block, which are element-wise summed up in Eq. (1). This dimensional mismatch is resolved by augmenting each block's input channels with zero valued channels, which virtually equalizes the number of channels between a residual block input and output.

Figure 13:
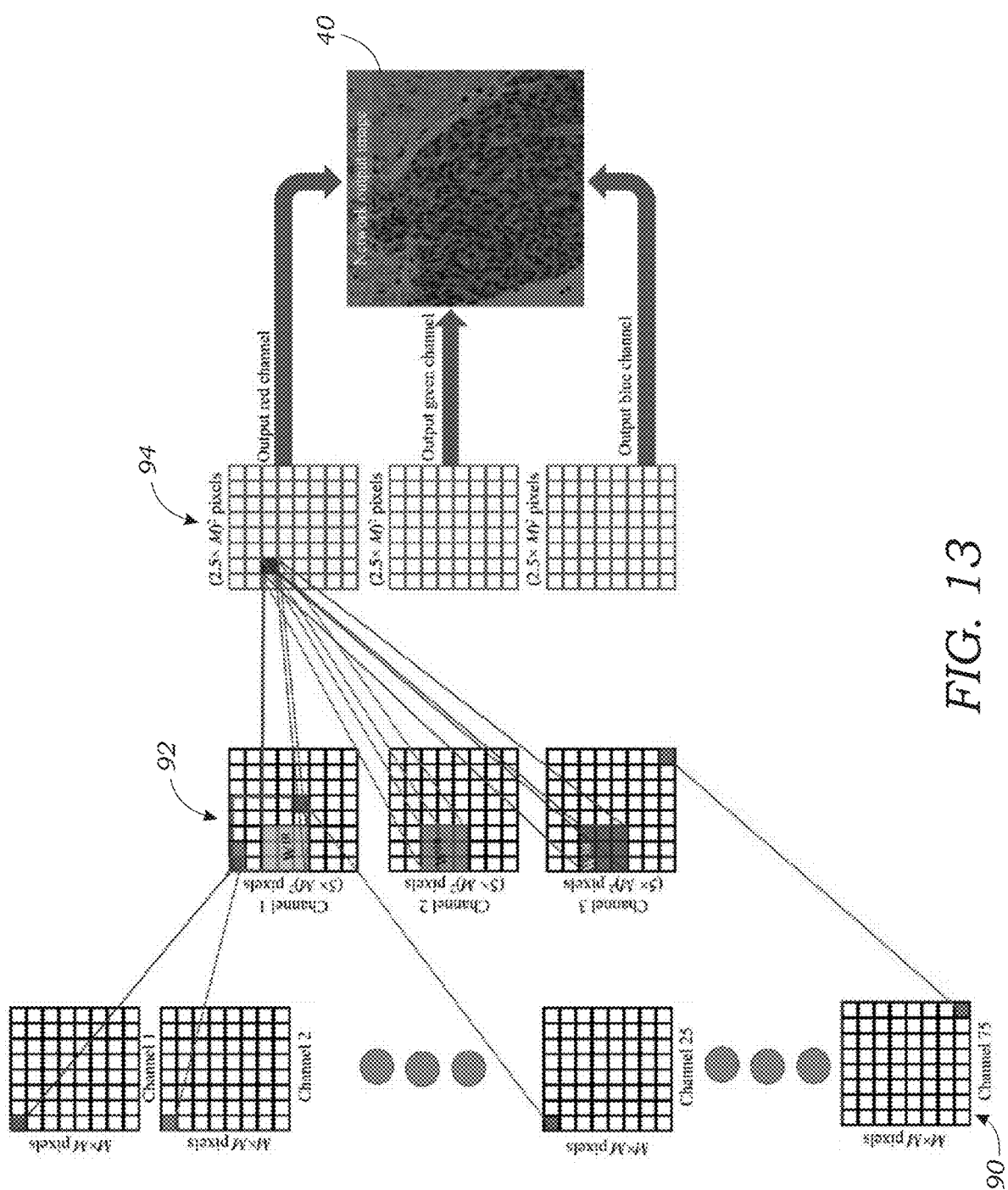
FIG. 13 is a schematic illustration of the output layer of the deep neural network for L=2.5.

In the experiments, the deep neural network 10 was trained to extend the output image space-bandwidth-product by a non-integer factor of $L^2=2.5^2=6.25$ compared to the input images. To do so, first the network learns to enhance the input image by a factor of 5×5 pixels followed by a learnable down-sampling operator of 2×2, to obtain the desired L=2.5 factor (see FIG. 13). More specifically, at the output of the K-th residual block $A_K=A_5=62$ channels are mapped to $3\times5^2=75$ channels as seen by operation 90 of FIG. 13, followed by resampling of these 75 (M×M) pixels channels to three channels with (M×5)×(M×5) pixels grid as seen in operation 92. These three (M×5)×(M×5) pixels channels are then used as input to an additional convolutional layer 84 as seen in FIG. 11 (with learnable kernels and biases, as the rest of the network), that two-times down-samples these images to three (M×2.5)×(M×2.5) color pixels seen in operation 94 of FIG. 13. This is performed by using a two-pixel stride convolution, instead of a single pixel stride convolution, as performed throughout the other convolutional layers of the network. This way, the deep neural network 10 learns the optimal down-sampling procedure for the microscopic imaging task. It is important to note that during the testing phase, if the number of input pixels to the network is odd, the resulting number of output image pixels will be determined by the ceiling operator. For instance, a 555×333-pixel input image will result in a 1388×833-pixel image for L=2.5.

The above-discussed deep network architecture provides two major benefits: first, the up-sampling procedure becomes a learnable operation with supervised learning, and second, using low resolution images throughout the network's layers makes the time and memory complexities of the algorithm $L^2$ times smaller when compared to approaches that up-sample the input image as a precursor to the deep neural network. This has a positive impact on the convergence speed of both the training and image transformation phases of the network 10.

Data Pre-Processing

To achieve optimal results, the network should be trained with accurately aligned low-resolution input images and high-resolution label image data. According to one embodiment, which is illustrated in FIG. 2, the corresponding input and label image pairs 20', 50 are matched using the following steps: (A) Color images are converted to grayscale images (step no illustrated in FIG. 2); (B) A large field-of-view image is formed by stitching a set of low-resolution images together as seen in operation 60; (C) Each high-resolution label image is down-sampled (bicubic) by a factor L as illustrated in operation 62. This down-sampled image is used as a template image to find the highest correlation matching patch in the low-resolution stitched image as seen in operation 64 of FIG. 2. The highest correlating patch from the low-resolution stitched image is then digitally cropped as seen in operation 66. This cropped low-resolution image and the original high-resolution image, form an input-label pair, which is used for the network's training and testing. Global registration is performed as illustrated in operation 68 whereby additional alignment is then performed on each of the input-label pairs 20', 50 to further refine the input-label matching, mitigating rotation, translation and scaling discrepancies between the lower resolution and higher resolution images. Optionally, further local registration 70 may be performed as described herein with respect to other embodiments.

Network Training

The network was trained by optimizing the following loss function (l) (similar to loss function 72 illustrated in FIG. 3A) given the high-resolution training labels $Y^{HR}$:

$$\ell(\Theta) = \frac{1}{3 \times M^2 \times L^2} \sum_{c=1}^{3} \sum_{u=1}^{M \times L} \sum_{v=1}^{M \times L} \|Y_{c,u,v}^{\Theta} - Y_{c,u,v}^{HR}\|^2 + \quad (4)$$

$$\lambda \frac{1}{3 \times M^2 \times L^2} \sum_{c=1}^{3} \sum_{u=1}^{M \times L} \sum_{v=1}^{M \times L} |\nabla Y^{\Theta}|_{c,u,v}^2,$$

where $Y_{c,u,v}^{\Theta}$ $Y_{c,u,v}^{HR}$ denote the u,v-th pixel of the c-th color channel (where in this implementation three color channels, RGB were used $50^{Red}$, $50^{Green}$, $50^{Blue}$) of the network's output image 40' and the high resolution training label image 50, respectively (FIG. 11). The network's output is given by $Y^\Theta = F(X_{input}^{LR}; \Theta)$, where F is the deep neural network's operator on the low-resolution input image $X_{input}^{LR}$ and $\Theta$ is the network's parameter space (e.g., kernels, biases, weights). Also, (M×L)×(M×L) is the total number of pixels in each color channel, $\lambda$ is a regularization parameter, empirically set to ~0.001. $|\nabla Y^\Theta|_{c,u,v}^2$ is u,v-th pixel of the c-th color channel of the network's output image gradient, applied separately for each color channel, which is defined as: $|\nabla Y^\Theta|^2 = (h*Y^\Theta)^2 + (h^T*Y^\Theta)^2$, with:

$$h = \begin{bmatrix} -1 & 0 & 1 \\ -2 & 0 & 2 \\ -1 & 0 & 1 \end{bmatrix}, \quad (5)$$

and $(\bullet)^T$ refers to the matrix transpose operator.

The above defined loss function (1) balances between the mean-squared-error (MSE) and the image sharpness with a regularization parameter, $\lambda$. The MSE is used as a data fidelity term and the $l_2$-norm image gradient approximation helps mitigating the spurious edges that result from the pixel up-sampling process. Following the estimation of the loss function, the error is backpropagated through the network, and the network's parameters are learnt by using the Adaptive Moment Estimation (ADAM) optimization as seen in operation 86, which is a stochastic optimization method, that was empirically set a learning rate parameter of $10^{-4}$ and a mini-batch size of 64 image patches (Table 2). All the kernels (for instance $w_{k,i,j}$) used in convolutional layers have 3×3 elements and their entries are initialized using truncated normal distribution with 0.05 standard deviation and 0 mean. All the bias terms (for instance, $\beta_{k,j}$) are initialized with 0.

Network Testing

Figure 14:
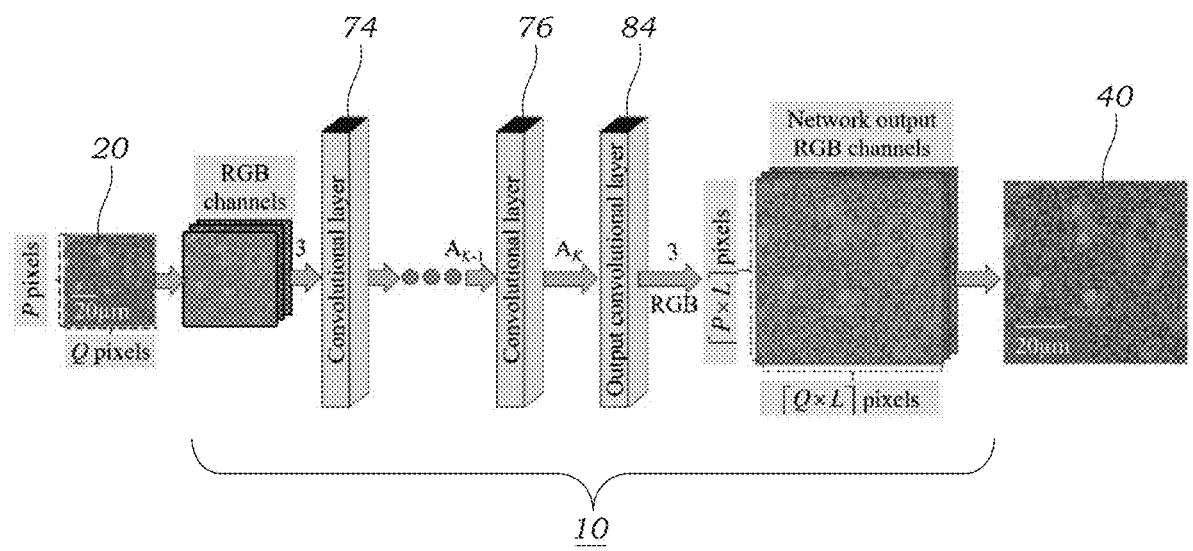
FIG. 14 is a schematic illustration of the trained deep neural network. The trained deep neural network was used during high-resolution image inference (i.e., the testing phase).
Figure 15:
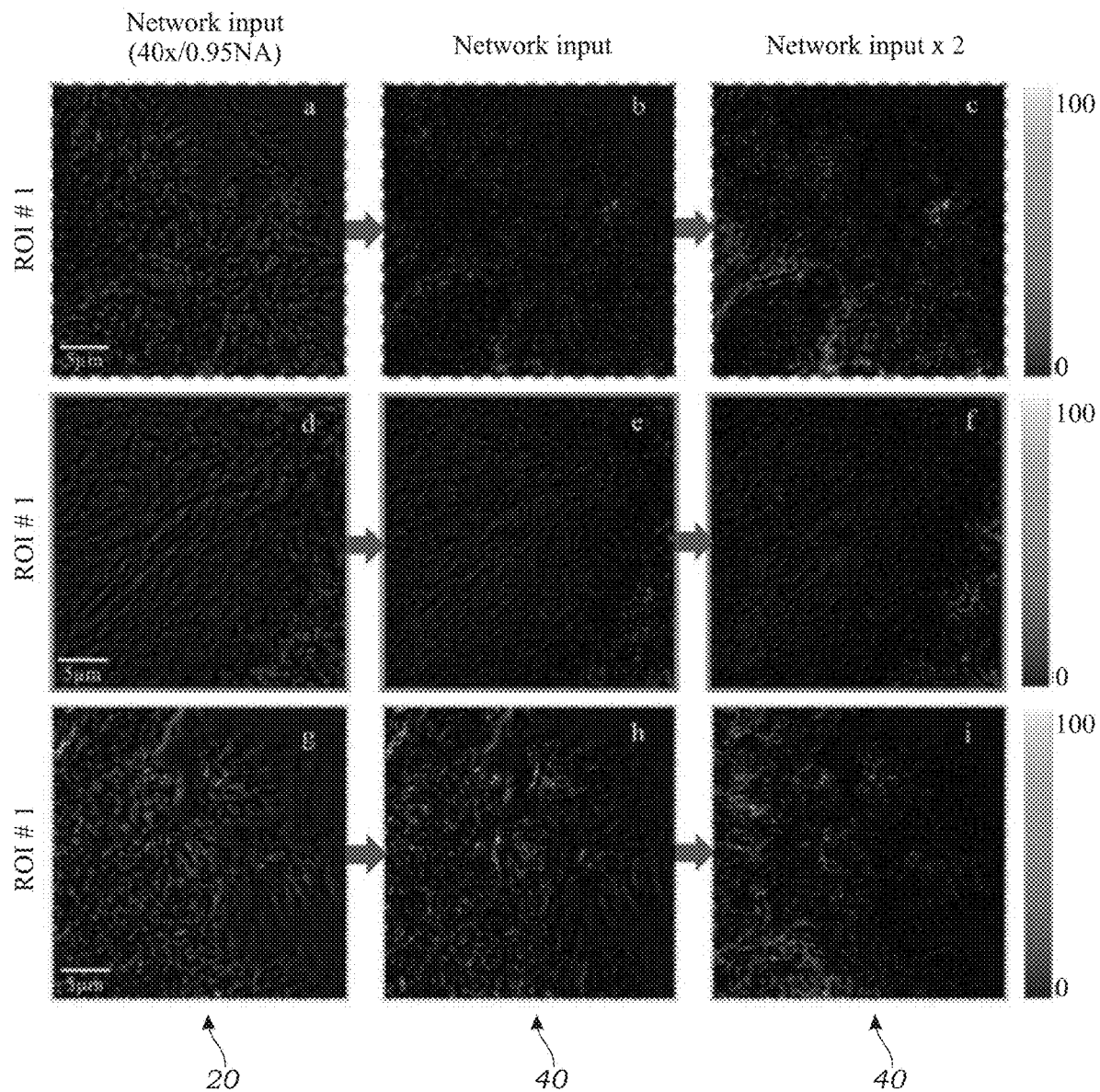
FIG. 15 illustrates the percentage of pixel-level differences for the network input or output images calculated with respect to the gold standard images captured using a 100×/

A fixed network architecture of the deep neural network 10, following the training phase is shown in FIG. 14, which receives an input of P×Q-pixel image 20 and outputs a $\lceil(P \times L)\rceil \times \lceil(Q \times L)\rceil$-pixel image 40, where $\lceil\bullet\rceil$ is the ceiling operator. To numerically quantify the performance of the trained deep neural network 10 models, it was independently tested using validation images, as detailed in Table 2 below. The output images 40 of the network 10 were quantified using the structural similarity index (SSIM). SSIM, which has a scale between 0 and 1, quantifies a human observer's perceptual loss from a gold standard image by taking into account the relationship among the contrast, luminance, and structure components of the image. SSIM is defined as 1 for an image that is identical to the gold standard image. Table 1 below illustrates the average structural similarity index (SSIM) for the Masson's trichrome stained lung tissue and H&E stained breast tissue datasets, comparing bicubic up-sampling and the deep neural network output. FIG. 15 illustrates another comparison showing pixel-level differences with respect to the gold standard.

TABLE 1

| Test set | Bicubic up-sampling SSIM | Deep neural network SSIM |
|---|---|---|
| Masson's trichrome stained lung tissue | 20 images (224 × 224 pixels) | 0.672 | 0.796 |
| H&E stained breast tissue | 7 images (660 × 660 pixels) | 0.685 | 0.806 |

TABLE 2

| | Number of input-output patches (number of pixels for each low-resolution image) | Validation set (number of pixels for each low-resolution image) | Number of epochs till convergence | Training time |
|---|---|---|---|---|
| Masson's trichrome stained lung tissue See FIG. 16 | 9,536 patches (60 × 60 pixels) | 10 images (224 × 224 pixels) | 630 | 4 hr, 35 min |
| H&E stained breast tissue | 51,008 patches (60 × 60 pixels) | 10 images (660 × 660 pixels) | 460 | 14 hr, 30 min |

Implementation Details

The program was implemented using Python version 3.5.2, and the deep neural network 10 was implemented using TensorFlow framework version 0.12.1 (Google). A laptop computer was used with Core i7-6700K CPU @ 4 GHz (Intel) and 64 GB of RAM, running a Windows 10 professional operating system (Microsoft). The network training and testing were performed using GeForce GTX 1080 GPUs (NVidia). For the training phase, using a dual-GPU configuration resulted in ~33% speedup compared to training the deep neural network 10 with a single GPU. The training time of the deep neural networks 10 for the lung and breast tissue image datasets is summarized in Table 2 (for the dual-GPU configuration).

Following the conclusion of the training stage, the fixed deep neural network 10 intakes an input stream of 100 low-resolution images 20 each with 2,048×2,048-pixels, and outputs for each input image a 5,120×5,120-pixel high-resolution image 40 at a total time of ~119.3 seconds (for all the 100 images) on a single laptop GPU. This runtime was calculated as the average of 5 different runs. Therefore, for L=2.5 the network takes 1.193 sec per output image on a single GPU. When employing a dual-GPU for the same task, the average runtime reduces to 0.695 sec per 2,048×2,048-pixel input image (see Table 3 for additional details on the network output runtime corresponding to other input image sizes, including self-feeding of the network output for the different regions-of-interest shown in FIGS. 4A-4P).

TABLE 3

| | | Single GPU runtime (sec) | | Dual GPU runtime (sec) | |
|---|---|---|---|---|---|
| Image FOV | Number of Pixels (input) | Network Output | Network Output x2 (Self-feeding) | Network Output | Network Output x2 (Self-feeding) |
| 378.8 × 378.8 μm (e.g., FIG. 2A) | 2048 × 2048 | 1.193 | 8.343 | 0.695 | 4.615 |
| 151.3 × 151.3 μm (e.g., dashed box in FIG. 2A) | 818 × 818 | 0.209 | 1.281 | 0.135 | 0.730 |
| 29.6 × 29.6 μm (e.g., FIGS. 2B-L) | 160 × 160 | 0.038 | 0.081 | 0.037 | 0.062 |

Modulation Transfer Function (MTF) Analysis

To quantify the effect of the deep neural network 10 on the spatial frequencies of the output image 40, the deep neural network 10 that was trained using the Masson's trichrome stained lung tissue samples was tested on a resolution test target (Extreme USAF Resolution Target on 4×1 mm Quartz Circle Model 2012B, Ready Optics), which was imaged using a 100×/1.4 NA objective lens, with a 0.55 NA condenser. The objective lens was oil immersed as depicted in FIG. 10A, while the interface between the resolution test target and the sample cover glass was not oil immersed, leading to an effective objective NA of ≤1 and a lateral diffraction limited resolution ≥0.354 µm (assuming an average illumination wavelength of 550 nm). MTF was evaluated by calculating the contrast of different elements of the resolution test target. For each element, the resulting image was horizontally averaged along the element lines (~80-90% of the line length). The center pixels of the element's minima and maxima were located and their values were used for contrast calculation. To do that, the length of the element's cross-section was calculated from the resolution test target group and element number in micrometers, cut out a corresponding cross section length from the center of the horizontally averaged element lines. This also yielded the center pixel locations of the element's local maximum values (2 values) and minimum values (3 values). The maximum value, $I_{max}$, was set as the maximum of the local maximum values and the minimum value, $I_{min}$, was set as the minimum of the local minimum values. For the elements, where the minima and maxima of the pattern matched their calculated locations in the averaged cross section, the contrast value was calculated as: $(I_{max}-I_{min})/(I_{max}+I_{min})$. For the elements where the minima and maxima were not at their expected positions, thus the modulation of the element was not preserved, the contrast was set to 0. Based on this experimental analysis, the calculated contrast values are given Table 4 and the MTFs for the input image and the output image of the deep neural network (trained on Masson's trichrome lung tissue) are compared to each other in FIG. 10E.

TABLE 4

| Period (Cycles/mm) | 100×/1.4 NA input contrast (a.u.) | Network output contrast (a.u.) |
|---|---|---|
| 256 | 0.801 | 0.756 |
| 287.350 | 0.790 | 0.729 |
| 322.539 | 0.790 | 0.724 |
| 362.038 | 0.795 | 0.709 |
| 406.374 | 0.787 | 0.726 |
| 456.140 | 0.771 | 0.774 |
| 512 | 0.713 | 0.681 |
| 574.700 | 0.636 | 0.640 |
| 645.079 | 0.577 | 0.588 |
| 724.077 | 0.517 | 0.585 |
| 812.749 | 0.516 | 0.634 |
| 912.280 | 0.439 | 0.597 |
| 1024 | 0.369 | 0.585 |
| 1290.159 | 0.303 | 0.538 |
| 1448.154 | 0.229 | 0.473 |
| 1625.498 | 0.201 | 0.542 |
| 1824.560 | 0.128 | 0.455 |
| 2048 | 0.111 | 0.259 |
| 2298.802 | 0 | 0.254 |
| 2580.318 | 0 | 0.1827 |
| 2896.309 | 0 | 0.072 |
| 3250.997 | 0 | 0 |
| 3649.121 | 0 | 0 |

Fluorescence Microscopy

The trained neural network 10 may also be used to super-resolve the raw images captured by different imaging modalities, including a wide-field fluorescence microscope, a confocal microscope, and a total-internal reflection fluorescence (TIRF) microscope. In the wide-field fluorescence imaging case, the images acquired using a 10×/0.4 NA objective lens are transformed into super-resolved images that match the images of the same samples acquired with a 20×/0.75 NA objective lens. In another embodiment, cross-modality transformation is achieved of diffraction-limited confocal microscopy images to match the images that were acquired using a stimulated emission depletion (STED) microscope, super-resolving Histone 3 distributions within HeLa cell nuclei and also showing a PSF width that is improved from ~290 nm down to ~110 nm. As another example of trained deep neural network 10, super-resolved time-lapse TIRF microscopy images are transformed to match TIRF-SIM images of endocytic clathrin-coated structures in SUM159 cells and Drosophila embryos. This deep learning-based fluorescence super-resolution approach improves both the field-of-view (FOV) and imaging throughput of fluorescence microscopy tools and can be used to transform lower-resolution and wide-field images acquired using various imaging modalities and hardware into higher resolution ones.

The deep neural network 10 is able to significantly enhance the performance of a fluorescent microscope without changing its design or hardware. This network uses a single image 20 that is acquired by a fluorescent microscope as the input and quickly outputs an improved image 40 of the same specimen, e.g., in less than 1 sec using a laptop, matching the resolution of higher numerical aperture (NA) objectives, while at the same time surpassing their limited field-of-view (FOV) and depth-of-field (DOF). The first step in this deep learning-based microscopy framework involves learning the statistical transformation between low-resolution and high-resolution microscopic images, which is used to train the deep neural network 10 as explained herein.

This data-driven approach does not require any numerical models of the imaging process or the estimation of a point spread function, and is solely based on training a generative adversarial network, which statistically learns to transform low-resolution input images 20 into higher or super-resolved images 40. Using this method, super-resolved wide-field images 40 acquired with low numerical aperture objective lenses are achieved, matching the resolution that is acquired using high numerical aperture objectives. Further, cross-modality super-resolution may be achieved with the deep neural network 10, where diffraction-limited confocal microscopy images 20 can be transformed by the same framework into super-resolved fluorescence images 40, matching the image resolution acquired with a STED microscope. The deep neural network 10 rapidly outputs these super-resolution images 40, without any iterations or parameter search, and even works for types of samples that it was not trained for. Further, rather than localizing specific filamentous structures of a sample 22, the generalization of this approach is seen by super-resolving various sub-cellular structures, such as nuclei, microtubules, F-actin and mitochondria. The system 2 is further demonstrated that can be generalized to multiple microscopic imaging modalities, including cross-modality image transformations (e.g., confocal microscopy to STED or TIRF to TIRF structured illumination microscopy).

In one embodiment, a microscopy method includes providing a trained deep learning network 10 embodied in software 104 that is executed using one or more processors 102 of a computing device 100. A fluorescence input image 20 of a sample 22 is input to the trained deep learning network 10. The fluorescence input image 20 may be wide-field fluorescent image that is acquired using, for example, a scanned sample using a conventional inverted microscope using standard objective lens/filter sets use for fluorescent images. The input fluorescent image 20 may also include a confocal microscope image.

The trained deep learning network 10 outputs a fluorescence output image 40, the fluorescence output image having improved one or more of spatial resolution, depth-of-field, signal-to-noise ratio, and/or contrast. In one embodiment, the trained deep learning network 10 is trained using, for example, microscopy images 20' (or image patches) of the same sample 22 type (or objects contained therein) of the sample 22 that is to be imaged. For example, if cell nuclei are desired to be imaged, the training images 20' also contain cell nuclei. Alternatively, the trained deep learning network 10 is trained using microscopy images 20' (or image patches) of different sample types (or objects contained therein) than the sample 22 that is to be imaged. For instance, the training images may contain images of other objects (e.g., mitochondria or other organelle) yet this still is able to train the deep learning network 10 to image cell nuclei. Of course, a mixture of the same and different type of objects may also be used for training images 20'. The same applies with fluorescent dyes or stains that are used to image the sample.

The training images 20' may include, for example, samples stained with the same fluorescent stain or dye used in the sample to be imaged. Alternatively, the training images 20' may include slide samples 22 that were stained with a different stain. The system may be implemented using a computer or computing device 100 that is configured to execute software that contains or embodies the trained deep learning network 10. In one embodiment, the deep learning network is configured as a Convolution Neural Network (CNN) that is a GAN-trained model or deep neural network 10. The computer 10 may include a personal computer, laptop, server, mobile computer, or the like. The computer 100 may also include one or more GPUs that are used for image training and image output.

Super-Resolution of Fluorescently-Labeled Intracellular Structures Using Widefield Microscopy The super-resolution capability of the trained deep neural network 10 was first demonstrated by imaging bovine pulmonary artery endothelial cell (BPAEC) structures; the raw images, used as input to the network 10, were acquired using a 10×/0.4 NA objective lens and the results of the network 10 were compared against the ground truth images 50, which were captured using a 20×/0.75 NA objective lens. An example of the network input image 20 is shown in FIG. 17A, where the field-of-view (FOV) of the 10× and 20× objectives (FIGS. 17D, 17G) are also labeled. FIGS. 17B, 17E show some zoomed-in regions-of-interest (ROIs) revealing further details of a cell's F-actin and microtubules. A pre-trained deep neural network 10 is applied to each color channel of these input images 20 (10×/0.4 NA), outputting the resolution-enhanced images 40 shown in FIGS. 17C, 17F, where various features of F-actin, microtubules, and nuclei are clearly resolved at the network output image 40, providing a very good agreement to the ground truth images 50 (20×/0.75 NA) shown in FIGS. 17D, 17G. Note that all the network output images 40 shown herein were blindly generated by the deep network 10, i.e., the input images 20 were not previously seen by the network 10.

Next, the results of deep learning-based super-resolution was compared against widely-used image deconvolution methods, i.e., the Lucy-Richardson (LR) deconvolution and the non-negative least square (NNLS) algorithm. For this, an estimated model of the PSF of the imaging system was used, which is required by these deconvolution algorithms to approximate the forward model of the image blur. Following its parameter optimization, the LR deconvolution algorithm, as expected, demonstrated resolution improvements compared to the input images, as shown in FIGS. 18A-3, FIG. 18B-3, and FIG. 18C-3; however compared to deep learning results (FIGS. 18A-2, 18B-2, and 18C-2), the improvements observed with LR deconvolution are modest, despite the fact that it used parameter search/optimization and a priori knowledge on the PSF of the imaging system. The NNLS algorithm, on the other hand, yields slightly sharper features (see FIGS. 18A-4, 18B-4, 18C-4) compared to LR deconvolution results, at the cost of having additional artifacts; regardless, both of these deconvolution methods are inferior to the deep learning results reported in FIGS. 18A-2, 18B-2, and 18C-2, exhibiting a shallower modulation depth in comparison to the deep learning results. FIGS. 19A-19J illustrate the quantification of super-resolution artifacts in the network output, LR deconvolution, and NNLS deconvolution using the NanoJ-Squirrel Plugin.

The deep network output image shows sharper details compared to the ground truth image, especially for the F-actin structures (e.g., FIGS. 18C-2). This result is in-line with the fact that all the images were captured by finding the autofocusing plane within the sample using the FITC channel (see e.g., FIG. 18B-5), and therefore the Texas-Red channel can remain slightly out-of-focus due to the thickness of the cells. This means the shallow depth-of-field (DOF) of a 20×/0.75 NA objective lens (~1.4 μm) might have caused some blurring in the F-actin structures (FIG. 18C-5). This out-of-focus imaging of different color channels is not impacting the network output image as much since the input image to the network was captured with a much larger DOF (~5.1 μm), using a 10×/0.4 NA objectives lens. Therefore, in addition to an increased FOV resulting from a low NA input image, the network output image 40 is also benefiting from an increased DOF, helping to reveal some finer features that might be out-of-focus in different color channels using a high NA objective lens.

Next, the generalization of the trained deep neural network 10 model was tested in improving image resolution on new types of samples that were not present in the training phase. FIGS. 20A-1, 20A-2, 20A-3, 20B-1, 20B-2, 20B-3, 20C-1, 20C-2, 20C-3, 20D-1, 20D-2, 20D-3 demonstrates the resolution enhancement when applying the network trained deep neural network 10 model trained with F-actin (FIG. 20A-1, 20A-2, 20A-3) to super-resolved images of mitochondria in BPAEC (FIGS. 20B-1, 20B-2, 20B-3), blood vessels in a mouse brain tumor (FIGS. 20C-1, 20C-2, 20C-3), and actin in a mouse kidney tissue (FIGS. 20D-1, 20D-2, 20D-3). Even though these new types of objects were not part of the training set for the deep neural network 10, the deep neural network 10 was able to correctly infer their fine structures through blind inference. Another example of this generation behavior of this approach is shown in FIGS. 21A-1, 21A-2, 21A-3, 21B-1, 21B-2, 21B-3, 21C-1, 21C-2, 21C-3, 21D-1, 21D-2, 21D-3, where the F-actin in BPAEC (FIGS. 21B-1, 21B-2, 21B-3), melanoma cells in a mouse brain tumor (FIGS. 21C-1, 21C-2, 21C-3), and glomeruli and convoluted tubules in a mouse kidney tissue (FIGS. 21D-1, 21D-2, 21D-3) are super-resolved by a neural network that was trained with only the images of microtubules captured with FITC filter set. In these experiments both the training and the blind testing images were taken with the same fluorescence filter set. FIGS. 20B-1, 20B-3, FIGS. 20C-2, 20C-3, FIGS. 20D-2, 20D-3), FIGS. 21B-2, 21B-3, FIGS. 21C-2, 21C-3 and FIGS. 21D-2, 21D-3 further support the enhanced DOF of the network output images 40 for various types of samples 22 when compared to the ground truth, higher NA images. To further exemplify the robustness of this approach, the deep neural network 10 model was trained with only the images of F-actin captured with Texas Red (TxRed) filter set to blindly super-resolve the images captured with DAPI and FITC filter sets (see FIGS. 22A-1, 22A-2, 22A-3, 22A-4, 22B-1, 22B-2, 22B-3, 22B-4). Compared with the optimal network models trained with the images acquired with the right filter sets, the TxRed model was still able to infer almost identical images, although it was applied on other filters' image data. All of these results highlight that the deep neural network 10 does not overfit to a specific type of structure or specimen, and in fact learns to generalize the transformation between two different fluorescence imaging conditions.

Next, quantification of the deep neural network 10 results was quantified using spatial frequency spectrum analysis: in FIGS. 23A-23G the spatial frequency spectrum of the network output images 40 (for BPAEC structures) are compared with respect to the network input images 20 to demonstrate the frequency extrapolation nature of the deep learning framework. The cross-section of the radially-averaged power spectrum confirms the success of the network output 40, matching the extended spatial frequency spectrum that is expected from a higher-resolution imaging system (as illustrated with the overlap of the curves in FIG. 23G.

To further quantify the resolution improvement achieved using this approach fluorescent beads (20 nm) were imaged at an emission wavelength of 645 nm and used the images 20 acquired with a 10×/0.4 NA objective lens as input to the deep neural network 10 model, which was trained only with F-actin. The super-resolution results of the deep neural network 10 are summarized in FIGS. 24A-24D. To quantify the resolution improvement in these results, the PSFs arising from the images of single/isolated nano-beads across the imaging FOV were measured; this was repeated for >100 individual particles that were tracked in the network input 20 and output images 40, as well as the ground truth images 50 (acquired using a 20×/0.75 NA objective lens). The full-width at half-maximum (FWHM) of the 10× input image PSF is centered at ~1.25 µm, corresponding to a sampling rate limited by an effective pixel size of ~0.65 µm. Despite the fact that the fluorescent signal from 20 nm beads is rather weak, the deep neural network 10 (trained only with BPAEC samples) successfully picked up the signal from individual nano-beads and blindly improved the resolution to match that of the ground truth 50, as shown in the PSF comparison reported in FIG. 24D. These results further highlight the robustness of the deep learning method to low SNR (signal-to-noise ratio) as well as its generalizability to different spatial structures of the object. The broadening of the PSF distribution in 20×/0.75 NA images (see FIG. 24D) can be attributed to the smaller DOF of the high NA objective lens, where the nano-beads at slightly different depths are not in perfect focus and therefore result in varying PSF widths. The deep network results, on the other hand, once again demonstrate the enhanced DOF of the network output image 40, showing uniform focusing with improved resolution at the network output image 40.

Cross-Modality Super-Resolution Imaging from Confocal to STED

In addition to wide-field fluorescence microscopy, the deep neural network 10 framework was applied to transform confocal microscopy images (e.g., input images 20) into images that match STED microscopy (e.g., output images 40); these results are summarized in FIG. 25A-25L and FIG. 26, where 20 nm fluorescent beads with 645 nm emission wavelength were imaged on the same platform using both a confocal microscope and a STED microscope. After the training phase, the deep neural network 10, as before, blindly takes an input image (confocal image 20) and outputs a super-resolved image that matches the STED image of the same region of interest (STED image 40). Some of the nano-beads in the samples were spaced close to each other, within the classical diffraction limit, i.e., under ~290 nm, as shown in e.g., FIGS. 25D, 25F, and therefore could not be resolved in the raw confocal microscopy images. The deep neural network 10 super-resolved these closely-spaced nano-particles, providing a good match to STED images of the same regions of the sample, see FIGS. 25G, 25H, 25I vs. FIGS. 25J, 25K, 25L.

To further quantify this resolution improvement achieved by the deep neural network 10, the PSFs arising from the images of single/isolated nano-beads across the sample FOV were measured following the same method described earlier, repeated for ≥400 individual nanoparticles that were tracked in the images of the confocal microscope and STED microscope, as well as the network output image 40 (in response to the confocal image). The results are summarized in FIG. 26, where the full-width half-maximum (FWHM) of the confocal microscope PSF is centered at ~290 nm, roughly corresponding to the lateral resolution of a diffraction limited imaging system at an emission wavelength of 645 nm. As shown in FIG. 26, PSF FWHM distribution of the network output provides a very good match to the PSF results of the STED system, with a mean FWHM of ~110 nm vs. ~120 nm, respectively.

Next, this confocal-to-STED image transformation framework was used to super-resolve Histone 3 distributions within fixed HeLa cell nuclei (see FIGS. 27A-27F). Because nanoparticles do not accurately represent the spatial feature diversity observed in biological specimens, direct application of a network 10 that is trained only with nanobeads would not be ideal to image complex biological systems (see FIG. 28B of FIGS. 28A-28D). That is why, "transfer learning" was used, in which a learned neural network (trained e.g., with nanoparticles) was used for another task. The network of FIGS. 25A-L and 26 was used to initialize a model to super-resolve cell nuclei using confocal-to-STED transformation; this transfer learning approach also significantly speeds up the training process. Despite some challenges associated with STED imaging of densely labeled specimen as well as sample drift, after transfer learning, the deep neural network 10 successfully improved the resolution of a confocal microscope image (input), matching the STED image of the same nuclei, as shown in FIGS. 27A-27F. Some of the discrepancies between the network output and the STED image can be related to the fluctuation observed in STED imaging, as shown in FIGS. 27D-27F, where three consecutive STED scans of the same FOV show frame-to-frame variations due to fluorophore state changes and sample drift. In this case, the network's 10 output image 40 better correlates with the average of three STED images that are drift-corrected (see FIGS. 27B, 27C). Using the same confocal-STED experimental data, FIGS. 29A-29D further illustrates the advantages of the presented GAN-based super-resolution approach over a standard CNN (convolutional neural network) architecture without the discriminative loss, which results in a lower resolution image compared to GAN-based inference.

Cross-Modality Super-Resolution Imaging from TIRF to TIRF-SIM

The cross-modality image transformation capability of the method was further demonstrated by super-resolving diffraction-limited TIRF images to match TIRF-SIM reconstructions, as shown in FIGS. 30A-30U and FIGS. 31A-31O. In this experiment, the sample 22 was exposed to nine different structured illumination patterns following a reconstruction method used in SIM, whereas the low-resolution (diffraction-limited) TIRF images were obtained using a simple average of these nine exposures. The deep neural network 10 model was trained using images of gene-edited SUM159 cells expressing eGFP labeled clathrin adaptor AP2, and blindly tested its inference as shown in FIGS. 30A-30U. To highlight some examples, the neural network 10 was able to detect the dissociation of clathrin-coated pits from larger clathrin patches (i.e. plaques) as shown in FIGS. 30R, 30T as well as the development of curvature-bearing clathrin cages, which appear as doughnuts under SIM (see FIGS. 30L-30O). Next, to provide another demonstration of the network's 10 generalization, it was blindly applied to amnioserosa tissues of *Drosophila* embryos (never seen by the network 10) expressing clathrin-mEmerald (see FIGS. 31A-31O). Highly motile clathrin-coated structures within the embryo that cannot be resolved in the original TIRF image can be clearly distinguished as separate objects in the network output, as illustrated in FIGS. 31A-31O. These results demonstrate that the deep neural network 10 model can super-resolve individual clathrin-coated structures within cultured cells and tissues of a developing metazoan embryo. While TIRF to TIRF-SIM was specifically demonstrated the general method is applicable more broadly such that an input image obtained using a first microscopy method is transformed by the deep neural network to an output image that resembles an image that was obtained by a second microscopy modality. This may include, for example, a first microscopy method that is fluorescence microscopy while the second method resembles structured illumination microscopy.

Discussion

The generalized point spread function of an imaging system, which accounts for the finite aperture of the optical system, as well as its aberrations, noise and optical diffraction, can be considered as a probability density function, $p(\zeta, \eta)$, where $\zeta, \eta$ denote the spatial coordinates. $p(\zeta, \eta)$ represents the probability of photons emitted from an ideal point source on the sample to arrive at a certain displacement on the detector plane. Therefore, the super-resolution task that the presented deep learning framework has been learning is to transform the input data distribution $X(p_{LR}(\zeta, \eta))$ into a high-resolution output, $Y(p_{HR}(\zeta, \eta))$, where the former is created by a lower resolution (LR) imaging system and the latter represents a higher resolution (HR) imaging system. The architecture of the deep neural network that was used for training, i.e., GANs have been proven to be extremely effective in learning such distribution transformations ($X \rightarrow Y$) without any prior information on or modelling of the image formation process or its parameters. Unlike other statistical super-resolution methods, the presented approach is data-driven, and the deep neural network 10 is trying to find a distribution generated by real microscopic imaging systems that it was trained with. This feature makes the network 10 much more robust to poor image SNR or aberrations of the imaging system, also eliminating the need for prior information on, e.g., the PSF and sensor-specific noise patterns, which are required for any standard deconvolution and localization method. A similar resilience to spatial and spectral aberrations of an imaging system has also been demonstrated for bright-field microscopic imaging using a neural network.

Since a data-driven image transformation (from lower resolution to higher resolution images, after the network converges) is established, one can estimate the effective local PSF of the lower-resolution imaging system with respect to the ground truth modality used in the training phase. This can also be useful to shed more light onto the inner workings of the deep neural network 10 and help better understand its inference success. For this, the confocal-to-STED transformation results were used to calculate the "learned" PSFs of the deep neural network 10 by locally deconvolving the network output with the network input, through sub-regions of 20 nm particle images.

The local PSFs were calculated with a pair of network input (confocal) and network output images, by deconvolving the same local regions of the input images with the corresponding output images using the regularized inverse filter (RIF), with regularization parameter defined as the inverse of the noise variance so that the RIF becomes equivalent to Wiener filtering. This algorithm is performed using Fiji plugin DeconvolutionLab2, while setting the input local region as the image to be deconvolved. The resulting deconvolved image from this process can be regarded as the local PSF (with respect to the ground truth modality used in the training phase) that is learned by the deep neural network 10.

As shown in FIGS. 32A-32D, the results reveal a significant variation in the inferred PSF as a function of the FOV, which highlights another advantage of the deep neural network 10 framework in comparison to standard deconvolution methods that assume a shift-invariant PSF. Thus, using the deep neural network 10 the spatially-varying PSF information is indirectly learned at the end of the training phase through image data, without any prior assumptions about the image formation process or related aberrations.

To further highlight the SNR improvement achieved by the deep learning-based super-resolution approach, an additional analysis was conducted using the confocal-to-STED network results (see FIGS. 33A-33C). For this analysis, a small FOV was selected containing a single 20 nm bead and calculated the SNR for the network input (confocal image 20), the network output 40 and the ground truth image 50 (STED).

The results, shown in FIGS. 33A-33C, reveal that the deep neural network 10 suppresses noise and improves the SNR compared to the input image 20 as well as the ground truth image 50 (STED). The SNR of the fluorescence image of a nano-particle is defined as:

$$SNR = \left| \frac{s - \bar{b}}{\sigma_b} \right| \quad (6)$$

where s is the peak value of the signal calculated from a Gaussian fit to the particle (see the Methods section), $\bar{b}$ is the mean value of the background (e.g. the regions defined with the dashed lines in FIGS. 33A-33C), $\sigma_b$ is the standard deviation of the background.

In general, the resolution limit of a microscopy modality is fundamentally limited by its SNR; stated differently, the lack of some spatial frequencies at the image plane (e.g., carried by evanescent waves) does not pose a fundamental limit for the achievable resolution of a microscope. These missing spatial frequencies (although not detected at the image) can in principle be extrapolated based on the measured or known spatial frequencies of an object. For example, the full spatial frequency spectrum of an object function that has a limited spatial extent with finite energy (all practical specimens fall under this category) can in theory be recovered from the partial knowledge of its spectrum using the analytical continuation principle since its Fourier transform defines an entire function. In practice, however, this is a challenging task and the success of such a frequency extrapolation method and how far it can be extended is strongly dependent on the SNR of the measured image information and a priori information regarding the object. The neural network-based super-resolution approach described herein does not include any such analytical continuation models, or any a priori assumptions about the known frequency bands or support information of the object. Instead, through image data the deep neural network 10 learns in its training phase to statistically separate out noise patterns from the structural information of the object, achieving effectively much improved frequency extrapolation (see e.g., FIGS. 23A-23G) and image enhancement compared to the state-of-the-art methods. The capability of transforming a fluorescence microscopic image 20 into a higher resolution one (i.e., output image 40) not only shortens the image acquisition time because of the increased FOV of low NA systems, but also enables new opportunities for imaging objects that are vulnerable to photo-bleaching or photo-toxicity. For example, in the experiments reported in FIGS. 25A-25L, FIG. 26, and FIGS. 27A-27F, the required excitation power for STED microscopy was 3-10-fold stronger than that of confocal microscopy. Furthermore, the depletion beam of STED microscopy is typically orders of magnitude higher than its excitation beam, which sets practical challenges for some biomedical imaging applications.

Most of these issues become less pronounced when using a confocal microscopy system, which is also quite simpler in its hardware compared to a STED microscope. Using the deep learning-based approach described herein, the diffraction induced resolution gap between a STED image and a confocal microscope image can be closed, achieving super-resolution microscopy using relatively simpler and more cost-effective imaging systems, also reducing photo-toxicity and photo-bleaching. For the cross-modality image transformation from TIRF to TIRF-SIM, the same conclusion applies: the presented approach can considerably simplify the experimental setup as it does not need structured illumination and can significantly reduce the number of frames acquired for a given imaging experiment.

Another important feature of the deep network-based super-resolution approach is that it can resolve features over an extended DOF because a low NA objective is used to acquire the input image; see e.g., FIG. 18C-2, FIG. 20A-2. A similar observation was also made for deep learning-enhanced bright-field microscopy images. This extended DOF is also favorable in terms of photo-damage to the sample, by eliminating the need for a fine axial scan within the sample volume, which might reduce the overall light delivered to the sample, also making the imaging process more efficient. Although some thicker samples will ultimately require axial-scanning, the presented approach will still reduce the number of scans required by inferring high-resolution images from parts of the sample that would have been defocused when using higher NA objective lenses.

A common concern for computational approaches that enhance image resolution is the potential emergence of spatial artifacts which may degrade the image quality, such as the Gibbs phenomenon in Lucy-Richardson deconvolution. To explore this, an example in the test image dataset was randomly selected and the artifacts of the network output image were quantified using the NanoJ-Squirrel Plugin; this analysis revealed that the network output image does not generate noticeable super-resolution artifacts and in fact has the same level of spatial mismatch error that the ground truth high-resolution (HR) image has with respect to the lower-resolution (LR) input image of the same sample. This is seen in FIGS. 19A-19J which illustrate the quantification of super-resolution artifacts using the NanoJ-Squirrel Plugin.

The statistical image transformation that is learned by the deep neural network 10 using training images 20' collected with one microscope hardware would ideally apply to other nominally identical microscopes. Along the same lines, in FIGS. 22A(1-4), B(1-4), C(1-4) illustrate results where a deep neural network 10, trained on a specific image dataset and hardware (e.g., super-resolution model from 10×/0.4 NA objective to 20×/0.75 NA objective, using a Texas Red excitation/emission filter cube, trained with only the images of F-actin) was blindly applied on image datasets that originated from different types of samples and imaging hardware, including e.g., different fluorescence filter cubes. These results can be even further improved through transfer learning, by optimizing the image transformation to take into account subtle differences among different microscope hardware (due to e.g., manufacturing tolerances, component-to-component variations, aberrations, etc.). This adaptation of the network to new datasets could be rapidly achieved with a few tens of epochs using significantly less training data, and could increase the applicability of this framework to various microscopic imaging hardware. Furthermore, as training image pairs are accumulated at a larger scale, spanning different microscope hardware, a universal deep neural network 10 can also be formed, potentially eliminating the need for local fine tuning of the deep neural network 10 for accurate image transformations and resolution enhancement. Finally, the presented deep learning-based super-resolution framework can also be extended to other imaging modalities beyond fluorescence microscopy, including e.g., coherent imaging.

Quantification of Super-Resolution Artifacts Using NanoJ-Squirrel

The level of artifacts in the network output images was quantified using the Fiji software plugin NanoJ-Squirrel. The plugin iteratively estimates a resolution scaling function (RSF) from the low-resolution (LR) image to the high-resolution (HR) image, convolves the HR image with this RSF and calculates its pixel-wise absolute difference from the LR image. The plugin also provides two globally averaged scores: Resolution Scaled Error (RSE) and Resolution Scaled Pearson coefficient (RSP), defined as:

$$RSE(f, g) = \sqrt{\frac{\sum_{x,y}(f(x, y) - g(x, y))^2}{n}} \qquad (7)$$

$$RSP(f, g) = \frac{\sum_{x,y}(f(x,y) - \bar{f})(g(x,y) - \bar{g})}{\sqrt{\sum_{x,y}(f(x,y) - \bar{f})}\sqrt{\sum_{x,y}(g(x,y) - \bar{g})}}$$

where, f and g are the LR and simulated LR images, respectively, and (¯) refers to the two-dimensional mean operator. Generally, the RSE is more sensitive to brightness and contrast differences, while the RSP helps to assess the image qualities across modalities, by quantifying their correlation.

In the implementation using this plugin, the "Reference image" was set to the LR input image, the "Super-resolution reconstruction" was set to the network output image. "RSF Estimate Image" was set to "RSF unknown, estimate via optimization" with "Max. Mag. in Optimization" set to 5. The error map of the network's output image with respect to the network's input (LR image) is shown in FIG. 19E, resulting in RSE=0.912 and RSP=0.999.

The same operations detailed above were repeated, estimating the error map between the low-resolution input image and the ground truth (HR) image, as shown in FIG. 19F, which resulted in RSE=1.509 and RSP=0.998. These results show that the network output image does not generate noticeable super-resolution related artifacts and in fact has the same level of spatial mismatch error that the ground truth HR image has with respect to the LR input image (with a correlation of ~1 and an absolute error ~1 out of 255). This conclusion is further confirmed by FIG. 19D, which overlays the network output image 40 and the ground truth image 50 in different colors, revealing no obvious feature mismatch between the two.

The same conclusion remained consistent for other test images as well. Since the deep neural network 10 models are trained within the GAN framework, potential image artifacts and hallucinations of the generative network were continuously being suppressed and accordingly penalized by the discriminative model during the training phase, which helped the final generative network to be robust and realistic in its super-resolution inference. Moreover, in case feature hallucinations are observed in e.g., the images of new types of samples, these can be additionally penalized in the loss function as they are discovered, and the network can be further regularized to avoid such artifacts from repeating.

Methods

Wide-Field Fluorescence Microscopic Image Acquisition

The fluorescence microscopic images (e.g., FIGS. 17A-17G and 18A(1-5), 18B(1-5), 18C(1-5)) were captured by scanning a microscope slide containing multi-labeled bovine pulmonary artery endothelial cells (BPAEC) (FluoCells Prepared Slide #2, Thermo Fisher Scientific) on a standard inverted microscope which is equipped with a motorized stage (IX83, Olympus Life science). The low-resolution (LR) and high-resolution (HR) images were acquired using 10×/0.4 NA (UPLSAPO10X2, Olympus Life Science) and 20×/0.75 NA (UPLSAPO20X, Olympus Life Science) objective lenses, respectively. Three bandpass optical filter sets were used to image the three different labelled cell structures and organelles: Texas Red for F-actin (OSFI3-TXRED-4040C, EX562/40, EM624/40, DM593, Semrock), FITC for microtubules (05F13-FITC-2024B, EX485/20, EM522/24, DM506, Semrock), and DAPI for cell nuclei (OSFI3-DAPI-5060C, EX377/50, EM447/60, DM409, Semrock). The imaging experiments were controlled by MetaMorph microscope automation software (Molecular Devices), which performed translational scanning and auto-focusing at each position of the stage. The auto-focusing was performed on the FITC channel, and the DAPI and Texas Red channels were both exposed at the same plane as FITC. With a 130 W fluorescence light source set to 25% output power (U-HGLGPS, Olympus Life science), the exposure time for each channel was set to: Texas Red 350 ms (10×) and 150 ms (20×), FITC 800 ms (10×) and 400 ms (20×), DAPI 60 ms (10×) and 50 ms (20×). The images were recorded by a monochrome scientific CMOS camera (ORCA-flash4.0 v2, Hamamatsu Photonics K.K.) and saved as 16-bit grayscale images with regards to each optical filter set. The additional test images (FIGS. 20A(1-3), 20B(1-3), 20C(1-3), 20D(1-3) and 21A(1-3), 21B(1-3), 21C(1-3), 21D(1-3)) are captured using the same setup with FluoCells Prepared Slide #1 (Thermo Fisher Scientific), with the filter setting of Texas Red for mitochondria, FITC for F-actin, and FluoCells Prepared Slide #3 (Thermo Fisher Scientific), with the filter setting of Texas Red for actin, and FITC for glomeruli and convoluted tubules. The mouse brain tumor sample was prepared with mouse brains perfused with Dylight 594 conjugated Tomato Lectin (1 mg/ml) (Vector Laboratories, CA), fixed in 4% para-formaldehyde for 24 hours and incubated in 30% sucrose in phosphate-buffered saline, then cut in 50 μm thick sections as detailed in, and imaged using Texas Red filter set for blood vessels, and FITC filter set for tumor cells.

Confocal and STED Image Acquisition

For the Histone 3 imaging experiments, the HeLa cells were grown as a monolayer on high-performance coverslips (170 μm+/−10 μm) and fixed with methanol. Nuclei were labelled with a primary Rabbit anti-Histone H3 trimethyl Lys4 (H3K4me3) antibody (Active motif #39159) and a secondary Atto-647N Goat anti-rabbit IgG antibody (Active Motif #15048) using the reagents of the MAXpack Immunostaining Media Kit (Active Motif #15251). The labelled cells were then embedded with Mowiol 4-88 and mounted on a standard microscope slide.

The nano-bead samples for confocal and STED experiments (FIGS. 25A-25L and FIG. 26) were prepared with 20 nm fluorescent nano-beads (FluoSpheres Carboxylate-Modified Microspheres, crimson fluorescent (625/645), 2% solids, Thermo Fisher Scientific) that were diluted 100 times with methanol and sonicated for 3×10 minutes, and then mounted with antifade reagents (ProLong Diamond, Thermo Fisher Scientific) on a standard glass slide, followed by placing on high-performance coverslips (170 μm+/−10 μm) (Carl Zeiss Microscopy).

Samples were imaged on a Leica TCS SP8 STED confocal using a Leica HC PL APO 100×/1.40 Oil STED White objective. The scanning for each FOV was performed by a resonant scanner working at 8000 Hz with 16 times line average and 30 times frame average for nanobeads, and 8 times line average and 6 times frame average for cell nuclei. The fluorescent nano-beads were excited with a laser beam at 633 nm wavelength. The emission signal was captured with a hybrid photodetector (HyD SMD, Leica Microsystems) through a 645~752 nm bandpass filter. The excitation laser power was set to 5% for confocal imaging, and 50% for STED imaging, so that the signal intensities remained similar while keeping the same scanning speed and gain voltage. A depletion beam of 775 nm was also applied when capturing STED images with 100% power. The confocal pinhole was set to 1 Airy unit (e.g., 168.6 μm for 645 nm emission wavelength and 100× magnification) for both the confocal and STED imaging experiments. The cell nuclei samples were excited with a laser beam at 635 nm and captured with the same photodetector which is set to 1× gain for confocal and 1.9× gain for STED with a 650-720 nm bandpass filter. The confocal pinhole was set to 75.8 μm (e.g., 0.457 Airy unit for 650 nm emission wavelength and 100× magnification) for both the confocal and STED imaging experiments. The excitation laser power was set to 3% and 10% for confocal and STED experiments, respectively. The scanning step size (i.e., the effective pixel size) for both experiments was ~30 nm to ensure sufficient sampling rate. All the images were exported and saved as 8-bit grayscale images.

TIRF-SIM Image Acquisition

Gene edited SUM159 cells expressing AP2-eGFP were grown in F-12 medium containing hydrocortisone, penicillin-streptomycin and 5% fetal bovine serum (FBS). Transient expression of mRuby-CLTB (Addgene; Plasmid #55852) was carried using Gene Pulser Xcell electroporation system (Bio-Rad Laboratories, CA, USA) following the manufacturer's instructions, and imaging was performed 24-48 hours after transfection. Cells were imaged in phenol-red-free L15 (Thermo Fisher Scientific) supplemented with 5% FBS at 37° C. ambient temperature. Clathrin dynamics were monitored in lateral epidermis and amnioserosa tissues of *Drosophila* embryos using UAS/GAL4 system as described in Willy, N. M. et al. Membrane mechanics govern spatiotemporal heterogeneity of endocytic clathrin coat dynamics. Mol. Biol. Cell 28, 3480-3488 (2017), which is incorporated by reference herein. *Drosophila* embryos were gently pressed against the cover glass to position the apical surface of the lateral epidermis and amnioserosa cells within the evanescence field of the TIRF system. Arm-GAL4 strain was provided by the Bloomington *Drosophila* Stock Center; CLC-mEmerald strain was provided by Dr. Henry Chang (Purdue University, USA). TIRF-SIM images were acquired by a 100×/1.49 NA objective lens (Olympus Life Science, CA, USA) fitted on an inverted microscope (Axio Observer; ZEISS) equipped with a sCMOS camera (ORCA-Flash4.0; Hamamatsu). Structured illumination was provided by a spatial light modulator as described in Li, D. et al. Extended-resolution structured illumination imaging of endocytic and cytoskeletal dynamics. Science 349, aab3500 (2015), which is incorporated by reference herein.

Image Pre-Processing

For widefield images (FIGS. 17, 18, 20, 21), a low intensity threshold was applied to subtract background noise and auto-fluorescence, as a common practice in fluorescence microscopy. The threshold value was estimated from the mean intensity value of a region without objects, which is ~300 out of 65535 in the 16-bit images. The LR images are then linearly interpolated two times to match the effective pixel size of the HR images. Accurate registration of the corresponding LR and HR training image pairs 20', 50 is needed since the objective function of the deep neural network 10 consists of adversarial loss and pixel-wise loss.

A two-step registration workflow to achieve the needed registration with sub-pixel level accuracy. This involves a global registration operation 68 like that of FIG. 2 along with a subsequent local registration operation 70. First, the fields-of-view of LR and HR images are digitally stitched in a MATLAB script interfaced with Fiji Grid/Collection stitching plugin through MIJ, and matched by fitting their normalized cross-correlation map to a 2D Gaussian function and finding the peak location (see calculation of normalized cross-correlation map (nCCM)) (operation #3 in FIG. 34). The translation map is generated and then applied as seen in operations #4 and #5 of FIG. 34. However, due to optical distortions and color aberrations of different objective lenses, the local features might still not be exactly matched. To address this, the globally matched images are fed into a pyramidal elastic registration algorithm as illustrated in FIG. 34 to achieve sub-pixel level matching accuracy, which is an iterative version of the registration module in Fiji Plugin NanoJ, with a shrinking block size (images divided into N blocks as seen in operation #2) with increasing N until minimum block size reached. This registration step starts with a block size of 256×256 and stops at a block size of 64×64, while shrinking the block size by 1.2 times every 5 iterations with a shift tolerance of 0.2 pixels. Due to the slightly different placement and the distortion of the optical filter sets, the pyramidal elastic registration was performed for each fluorescence channel independently. At the last step, the precisely co-registered images (operation #6 in FIG. 34) were cropped 10 pixels on each side to avoid registration artifacts, and converted to single-precision floating data type and scaled to a dynamic range of 0~255. This scaling step is not mandatory but creates convenience for fine tuning of hyper-parameters when working with images from different microscopes/sources.

For confocal and STED images (FIGS. 20, 21, 27) which were scanned in sequence on the same platform, only a drift correction step was required, which was calculated from the 2D Gaussian fit of the cross-correlation map. The drift was found to be ~10 nm for each scanning FOV between the confocal and STED images. Thresholding to the nanobead dataset was not performed for the network training. However, after the test images were enhanced by the network 10, a constant value was subtracted (calculated by taking the mean value of an empty region) from the confocal (network input 20), the super-resolved (network output 40), and the STED (ground truth 50) images, respectively, for better visualization and comparison of the images. The total number of images used for training, validation and blind testing of each network are summarized in Table 5 below (each image has 1024×1024 pixels).

TABLE 5

| Super-resolution network | Number of training image pairs | Number of validation image pairs | Number of testing image pairs |
|---|---|---|---|
| Wide-field (TxRed) | 1945 | 680 | 94 |
| Wide-field (FITC) | 1945 | 680 | 94 |
| Wide-field (DAPI) | 1945 | 680 | 94 |
| Confocal-STED (nanobeads) | 607 | 75 | 75 |
| Confocal-STED (transfer learning) | 1100 | 100 | 63 |
| TIRF-SIM | 3003 | 370 | 1100 |

Calculation of the Image Shift from Normalized Cross-Correlations

Given two images to be registered, the first step is to calculate the normalized cross-correlation map, which is defined as:

$$nCCM = \frac{CCM - \min(CCM)}{\max(CCM) - \min(CCM)} \cdot (PPMCC_{max} - PPMCC_{min}) + PPMCC_{min} \quad (8)$$

where CCM is the cross-correlation map defined as:

$$CCM(u,v) = \sum_{x,y} [f(x,y) - \bar{f}][g(x-u, y-v) - \bar{g}] \quad (9)$$

where, f and g represent two images, and $(\overline{\phantom{-}})$ refers to the two-dimensional mean operator. The locations of the maximum and minimum values of CCM indicate the most likely and the most unlikely (respectively) relative shifts of the input image pair. PPMCC is the Pearson product-moment correlation coefficient, defined as:

$$PPMCC(X, Y) = \frac{\text{cov}(X, Y)}{\sigma_X \sigma_Y} \quad (10)$$

where coy is the covariance function, $\sigma_X$ is the standard deviation of X, and $\sigma_Y$ is the standard deviation of Y. The values of $PPMCC_{max}$ and $PPMCC_{min}$ refer to the Pearson product-moment correlation coefficients calculated when applying the most likely and the most unlikely shifts to the input images, respectively. The normalized cross-correlation map (nCCM) is then fit to a 2D Gaussian function, which is defined as:

$$G(x, y) = A\exp\left(-\left(\frac{(x-x_o)^2}{2\sigma_x^2} + \frac{(y-y_o)^2}{2\sigma_y^2}\right)\right). \quad (11)$$

where $x_o$ and $y_o$ refer to the refined sub-pixel shift amount in x and y direction, respectively, between the input image pairs, and A refers to the similarity of the two images.

Generative Adversarial Network Structure and Training

The deep neural network 10 was trained following the generative adversarial network (GAN) framework, which has two sub-networks being trained simultaneously, a Generator network 120 which enhances the input LR image, and a Discriminator network 122 which returns an adversarial loss to the resolution-enhanced image, as illustrated in FIGS. 35A and 35B. FIG. 35A illustrates training the of the GAN-based deep neural network 10 which uses a low-resolution image or image patch 20' and a corresponding high-resolution image or image patch 50. The Generator network 120 aims to learn the learn the statistical transformation between the low-resolution input image 20' and the corresponding high-resolution images 50 of the same sample 12. The Generator network 120 generates a network output 124 that is run through the Discriminator network 122. The Discriminator network 122 learns how to discriminate between a true high-resolution fluorescence image 50 of a sample and the generator network's output image 124. A loss function 72 which includes pixel-wise loss and adversarial loss and discriminator loss is optimized (minimized) to optimize the network 10 parameters.

Here, the objective function was designed as the combination of the adversarial loss with two regularization terms: the mean square error (MSE), and the structural similarity (SSIM) index. Specifically, the goal is to minimize:

$$L(G;D) = -\log D(G(x)) + \lambda \times \text{MSE}(G(x),y) - \nu \times \log[(1+\text{SSIM}(G(x),y))/2]$$

$$L(D;G) = -\log D(y) - \log[1 - D(G(x))] \quad (12)$$

where x is the LR input, G(x) is the generative model output, D(•) is the discriminative model prediction of an image (network output or ground truth image), and y is the HR image used as ground truth. The structural similarity index is defined as:

$$SSIM(x, y) = \frac{(2\mu_x\mu_y + c_1)(2\sigma_{x,y} + c_2)}{(\mu_x^2 + \mu_y^2 + c_1)(\sigma_x^2 + \sigma_y^2 + c_2)} \quad (13)$$

where $\mu_x,\mu_y$ are the averages of x, y; $\sigma_x^2,\sigma_y^2$ are the variances of x, y; $\sigma_{x,y}$ is the covariance of x and y; and $c_1$, $c_2$ are the variables used to stabilize the division with a small denominator. An SSIM value of 1.0 refers to identical images. When training with the wide-field fluorescence images, the regularization constants $\lambda$ and $\nu$ were set to accommodate the MSE loss and the SSIM loss to be ~1-10% of the combined generative model loss L (G; D), depending on the noise level of the image dataset. When training with the confocal-STED image datasets, $\lambda$ was kept the same and set $\nu$ to 0. While the adversarial loss guides the generative model to map the LR images into HR, the two regularization terms assure that the generator output image is established on the input image with matched intensity profile and structural features. These two regularization terms also help stabilize the training schedule and smoothen out the spikes on the training loss curve before it reaches equilibrium. For the sub-network models, a similar network structure was employed as described in Rivenson, Y. et al. Deep learning-based virtual histology staining using auto-fluorescence of label-free tissue. ArXiv180311293 Phys. (2018), which is incorporated by reference herein.

Generative Model

U-net is a CNN architecture, which was first proposed for medical image segmentation, yielding high performance with very few training datasets. The structure of the generative network used herein is illustrated in FIG. 35B, which consists of four down-sampling blocks 126, 128, 130, 132 and four up-sampling blocks 134, 136, 138, 140. Each down-sampling block consists of three residual convolutional blocks, within which it performs:

$$x_k = x_{k-1} + \text{LReLU}[\text{Conv}\{\text{LReLU}[\text{Conv}\{\text{LReLU}[\text{Conv}\{x_{k-1}\}]\}]\}], k=1,2,3,4. \quad (14)$$

where $x_k$ represents the output of the k-th down-sampling block, and $x_0$ is the LR input image. Conv{ } is the convolution operation, LReLU[ ] is the leaky rectified linear unit activation function with a slope of $\alpha=0.1$, i.e., $$\text{LReLU}(x;\alpha) = \text{Max}(0,x) - \alpha \times \text{Max}(0,-x) \quad (15)$$

The input of each down-sampling block is zero-padded and added to the output of the same block. The spatial down-sampling is achieved by an average pooling layer after each down-sampling block. A convolutional layer 142 lies at the bottom of this U-shape structure that connects the down-sampling and up-sampling blocks.

Each up-sampling block also consists of three convolutional blocks, within which it performs:

$$y_k = \text{LReLU}[\text{Conv}\{\text{LReLU}[\text{Conv}\{\text{LReLU}[\text{Conv}\{\text{Concat}(x_{5-k},y_{k-1})\}]\}]\}], k=1,2,3,4 \quad (16)$$

where $y_k$ represents the output of the k-th up-sampling block, and $y_0$ is the input of the first up-sampling block. Concat( ) is the concatenation operation of the down-sampling block output and the up-sampling block input on the same level in the U-shape structure. The last layer is another convolutional layer 144 that maps the thirty-two (32) channels into one (1) channel that corresponds to a monochrome grayscale image.

Discriminative Model

As shown in FIG. 35B, the structure of the Discriminator network 122 begins with a convolutional layer 146, which is followed by 5 convolutional blocks 148, 150, 152, 154, 156, each of which performs the following operation:

$$z_k = \text{LReLU}[\text{Conv}\{\text{LReLU}[\text{Conv}\{z_{k-1}\}]\}], k=1,2,3,4,5 \quad (17)$$

where $z_k$ represents the output of the k-th convolutional block, and $z_0$ is the input of the first convolutional block. The output of the last convolutional block is fed into an average pooling layer (not illustrated) whose filter shape is the same as the patch size, i.e., H×W. This layer is followed by two fully connected layers 158, 160 for dimension reduction. The last layer 162 is a sigmoid activation function whose output is the probability 164 of an input image being ground truth, defined as:

$$D(z) = \frac{1}{1+\exp(-z)} \quad (18)$$

Network Training Schedule

During the training, the patch size is set to be 64×64, with a batch size of 12 on each of the two GPUs. Within each iteration, the Generator network 120 and the Discriminator network 122 are each updated once while keeping the other unchanged. Both the Generator network 120 (e.g., generative model) and the Discriminator network 122 (e.g., discriminative model) were randomly initialized and optimized using the adaptive moment estimation (Adam) optimizer with a starting learning rate of $1\times10^{-4}$ and $1\times10^{-5}$, respectively. This framework was implemented with TensorFlow framework version 1.7.0 and Python version 3.6.4 in Microsoft Windows 10 operating system. The training was performed on a consumer grade laptop (EON17-SLX, Origin PC) equipped with dual GeForce GTX1080 graphic cards (NVIDIA) and a Core i7-8700K CPU @ 3.7 GHz (Intel). The final model for widefield images were selected with the smallest validation loss at around ~50,000$^{th}$ iteration, which took ~10 hours to train. The final model for confocal-STED transformation (FIGS. 25A-25L and FIG. 26) is selected with the smallest validation loss at around ~500,000$^{th}$ iteration, which took ~90 hours to train. The transfer learning for confocal-STED transformation network (FIGS. 27A-27F) was implemented with the same framework on a desktop computer with dual GTX1080Ti graphic cards, while setting the patch size to be 256×256 with 4 patches on each GPU. It was first initialized with confocal-STED model trained with nano-beads, and then refined with cell nuclei image data with ~20,000 iterations, which took ~24 hours. The training of TIRF to TIRF-SIM transformation network was also implemented with dual GTX1080Ti graphic cards, while setting the patch size to be 64×64, and 64 patches on each GPU. The final model was trained for 20,000 iterations which took ~18 hours. A typical plot of the loss functions during the GAN training is shown in FIG. 36, where the Generator network 120 and the Discriminator network 122 compete in an equilibrium state for 60,000 iterations before they start to diverge. The iteration time is also dependent on the patch and batch size. FIGS. 29A-29D demonstrate that the role of the Discriminator network 122 of the GAN deep neural network 10 is critical to achieving super-resolution, as it provides an adaptive loss function and helps the Generator network 120 to jump out of local minima. Training without the discriminative loss will result in over-smoothed images (see e.g., FIG. 29A-D) as the Generator network 120 only optimizes a specific group of statistical metrics.

Implementation of Lucy-Richardson (LR) and NNLS Deconvolution

To make a fair comparison, the lower resolution images were up-sampled 2 times by bilinear interpolation before being deconvolved. The Born and Wolf PSF model was used, with parameters set to match the experimental setup, i.e., NA=0.4, immersion refractive index=1.0, pixel size=325 nm. The PSF is generated by a Fiji PSF Generator Plugin. An exhaustive parameter search was performed by running the Lucy-Richardson algorithm with 1~100 iterations and damping threshold 0%~10%. The results were visually assessed, with the best one obtained at 10 iterations and 0.1% damping threshold (FIGS. 18A-3, 18B-3, 18C-3). The NNLS deconvolution was performed with Fiji Plugin DeconvolutionLab2 with 100 iterations and a step size of 0.5. The deconvolution for Texas Red, FITC, and DAPI channels were performed separately, assuming the central emission wavelengths to be 630 nm, 532 nm, and 450 nm, respectively.

Characterization of the Lateral Resolution by PSF Fitting

The resolution differences among the network input (confocal), the network output (confocal), and the ground truth (STED) images were characterized by fitting their PSFs to a 2D Gaussian profile, as shown in FIG. 26. To do so, more than 400 independent bright spots were selected from the ground truth STED images and cropped out with the surrounding 19×19-pixel regions, i.e., ~577×577 nm². The same locations were also projected to the network input and output images, followed by cropping of the same image regions as in the ground truth STED images. Each cropped region was then fitted to a 2D Gaussian profile. The FWHM values of all these 2D profiles were plotted as histograms, shown in FIG. 26. For each category of images, the histogram profile within the main peak region is fitted to a 1D Gaussian function (FIG. 26). A similar process was repeated for the results reported in FIG. 24D.

Scanning Electron Microscopy (SEM)

In another embodiment, a deep neural network 10 is used to improve the resolution of electron microscopy images and in particular SEM images 20 using trained deep neural network 10. By training a deep neural network 10 as a convolutional neural network (CNN) with a set of co-registered high-resolution and low-resolution SEM images 50, 20' of the same set of samples, the trained deep neural network 10 was able to blindly super resolve individual SEM images 20, reducing sample charging and beam damage without losing image quality or adding extra sample preparation steps. In contrast to previous methods, this approach can be implemented over a wide-range of sample types and only requires a single SEM image 20 as input. This data-driven approach has the added benefit of reducing the scanning time of the electron beam, and thus increasing the imaging throughput by enabling the use of a lower magnification scan over a larger field-of-view without sacrificing image quality. Once trained, the deep neural network 10 can quickly process input SEM images 20 in a feed-forward and non-iterative manner to blindly infer images with improved quality and resolution, thus making it an attractive and practical tool for rapid SEM image enhancement.

The image dataset employed to train the CNN was made up of unique high- and low-resolution pairs 50, 20' of the test specimen or sample 22, each taken from the same region of interest. Once the high-resolution and low-resolution image pairs 50, 20' were taken, they were co-registered (using global and/or local registration) before being inputted to the neural network 10 for the training phase. These training images 20' were first roughly matched to each other by cropping the center of each of the low-resolution images 20' and using a Lanczos filter to up-sample the images 20'. After this rough alignment, additional steps were taken to register the images with higher accuracy. First, image rotation and size misalignment were corrected by using the correlation between the two images to define an affine matrix which was then applied to the high-resolution images 50. Next, local registration was performed using a pyramid elastic registration algorithm as described herein. This algorithm breaks the images into iteratively smaller blocks (see e.g., FIG. 34), registering the local features within the blocks each time, achieving sub-pixel level agreement between the lower-resolution and higher-resolution SEM images 20', 50. The trained neural network 10 model utilized in this work was a Generative Adversarial Network (GAN) which uses a generator network to create the enhanced images, and a discriminator network (D) that helps the generator network (G) to learn how to create realistic high-resolution images as described previously (e.g., FIGS. 35A and 35B and accompanying description). The system 2 may be implemented using a computer or computing device 100 that is configured to execute software 104 that contains or embodies the trained deep learning network 10. In one embodiment and as noted above, the deep learning network 10 is configured as a Convolution Neural Network (CNN) that is a GAN-trained model or deep neural network 10. The computer 100 may include a personal computer, laptop, server, mobile computing device, or the like. The computer 100 may also include one or more GPUs or ASICs that are used for image training and image output.

In one embodiment, a system 2 for generating resolution-enhanced electron microscopy images 40 of a sample 22 includes a computing device 100 having image processing software 104 executed thereon, the image processing software 104 comprising a trained deep neural network 10 that is executed using one or more processors 102 of the computing device 100, wherein the trained neural network 10 is trained with a plurality of co-registered lower resolution and higher resolution electron microscopy training images 20', 50, the image processing software 104 configured to receive one or more input electron microscopy image(s) 20 of the sample 22 and output corresponding images 40 of the sample 22 having improved resolution. In one embodiment, the images having improved resolution that are output by the deep neural network have frequency spectra that substantially match higher resolution images of the same field-of-view. In another embodiment, a method for generating resolution-enhanced electron microscopy images 40 of a sample 20 includes providing a trained deep neural network 10 embodied in software 104 that is executed by one or more processors 102. Once trained, the deep neural network 10 is input with an electron microscopy input image 20 of a sample 22 to the trained deep neural network 10 which outputs output image 40 of the sample 22 from the trained deep neural network 10, the output image 40 having improved resolution.

Experimental

The efficacy of the trained deep neural network 10 for SEM and other electron microscope 110 applications was shown using a gold-on-carbon resolution test specimen 22 [Ted Pella 617-a]. This test specimen 22 has a random assortment of gold nanoparticles of varying sizes ranging from 5 nm to 150 nm immobilized on carbon, and is commonly employed to measure the resolution of SEM systems at different scales using the gaps between various gold nanoparticles.

The image dataset employed to train the deep neural network 10 (e.g., CNN) was made up of unique high-resolution and low-resolution pairs 50, 20' of the test specimen 22, each taken from the same region of interest where there is a distribution of nanoparticles. The low-resolution images 20' were taken at a magnification of 10000× (14.2 nm pixel size), while the high-resolution images 50 were taken at 20000× magnification (7.1 nm pixel size.) In both cases the image resolution is limited by the number of pixels and therefore the lower magnification images can be modeled as aliased versions of the higher resolution images. A Nova 600 DualBeam-SEM (FEI Company) was used with a 10 kV accelerating voltage, 0.54 nA beam current, and a monopole magnetic immersion lens for high-resolution imaging. All images were acquired with 30 μs pixel dwell time.

Once the high-resolution and low-resolution image pairs 50, 20' were taken, they were co-registered before being inputted to the neural network 10 for the training phase. These training images 20' were first roughly matched to each other by cropping the center of each of the low-resolution images 20' and using a Lanczos filter to up-sample the images. After this rough alignment, additional steps were taken to register the images with higher accuracy. First, image rotation and size misalignment were corrected by using the correlation between the two images to define an affine matrix which was then applied to the high-resolution images. Next, local registration was performed using a pyramid elastic registration algorithm. This algorithm breaks the images into iteratively smaller blocks, registering the local features within the blocks each time, achieving sub-pixel level agreement between the lower and higher resolution SEM images. FIG. 2 and FIG. 34 illustrate an example of the global and local registration operations used to co-register pairs of low-resolution images 20' (or image patches) and high-resolution images 50 (or image patches).

Forty (40) pairs of accurately registered images (924×780 pixels) were split into 1920 patches (128×128 pixels) which were then used to train the deep neural network 10. The size of the training dataset was further increased by randomly rotating and flipping each image patch. The deep neural network 10 utilized in this work was a Generative Adversarial Network (GAN) which uses a generator network (G) 120 to create the enhanced images, and a discriminator network (D) 122 that helps the generator network (G) to learn how to create realistic high-resolution images 40. In addition to the standard discriminator loss, an L1 loss term was also added to ensure that the generated images 40' are structurally close to the target, high-resolution images 50; the anisotropic total variation loss (TV) was also used to increase the sparsity of the output images and reduce noise. Based on this, the overall loss function for the generator network can be written as:

$$l_{generator} = L_1\{G(x),z\} + \alpha \times TV\{G(x)\} + \beta \times [1 - D(G(x))]^2 \quad (19)$$

where x is the low-resolution input image 20 to the generator network 120 and z is the matching high-resolution ground truth image 50 corresponding to the same field-of-view. $\alpha$ and $\beta$ are tunable parameters to account for the relative importance of the different loss terms. The $L_1$ loss is the mean pixel difference between the generator's output 124 and the ground truth image 50, defined as:

$$L_1\{G(x), z\} = \frac{1}{M \times N} \sum_i \sum_j |z_{i,j} - G(x)_{i,j}| \quad (20)$$

where i and j are the pixel indices in an M×N pixel image. The anisotropic total variation loss is defined as:

$$TV\{G(x)\} = \Sigma_i \Sigma_j (|G(x)_{i+1,j} - G(x)_{i,j}| + |G(x)_{i,j+1} - G(x)_{i,j}|) \quad (21)$$

The discriminator loss, on the other hand, penalizes the discriminator when it is unable to discriminate between the generated and the ground truth images, and is defined as:

$$l_{discriminator} = D(G(X))^2 + (1 - D(z))^2 \quad (22)$$

The discriminator loss, L1 loss, and the total variation loss make up 84%, 14%, and 2% of the total loss for the generator, respectively. Details of network architectures used for the Generator (G) network 120 and Discriminator (D) network 122 are shown in FIG. 37. The deep neural network 10 was implemented in Python (version 3.6.2) using the TensorFlow library (version 1.8.0). The Generator (G) network 120 was trained for 48,000 iterations with the Discriminator (D) network 122 updating every fourth iteration to avoid overfitting. This took the network 10 one hour and twenty minutes to train using a single Nvidia GTX 1080 Ti graphics processing unit (GPU) and an Intel Core i9-7900 processor. The same computer is able to infer 3.66 images 20 per second, for an image size of 780×780 pixels. This inference time is sixteen (16) times faster than the low-resolution SEM imaging of the corresponding sample field-of-view; stated differently, real-time visualization of the super-resolved images, immediately after a low-resolution image is taken or while a new scan is ongoing, is feasible.

This super resolution technique computationally enhances the resolution of lower magnification SEM images 20 such that the network's output images 40 accurately matches the resolution given by the higher resolution SEM images 50 of the same samples 22. A demonstration of this can be seen in FIG. 38, which reports several blindly tested examples of nanoparticles that are not clearly resolved in the input images 20, but become distinct after the application of the deep neural network 10. Pixel-intensity cross-sections are also reported to illustrate the resolution enhancement more clearly (peaks more evident from output images 40). From these examples, one can see that the deep neural network 10 is able to reveal spatial details that are not clear in the input (lower magnification) SEM images 20, matching at its output 40 the corresponding higher magnification SEM images 50 of the same fields-of-view. This is particularly evident in the gaps between the gold nanoparticles shown in FIG. 38.

FIG. 39 illustrates the results of statistical analysis of these gaps to quantify the enhancement provided by the trained network. For this analysis, 300 gaps between arbitrary adjacent nanoparticles were randomly selected using the high-resolution SEM images 50. They were then analyzed to determine whether the neighboring particles are resolvable, as well as to quantify the gap-size in the input image 20, output image 40, and target or ground truth image 50. The gap width was defined as the distance between the points at which the intensity drops below 80% of highest intensity value of the adjacent particles, and a gap was determined to exist if the lowest intensity point between the particles fell below 60% of the peak value. In the input SEM image 20 (lower magnification), 13.9% of these gaps were not detectable, i.e., could not be resolved (see FIG. 39). However, after super-resolving the input SEM images 20 using the trained neural network 10, the percentage of undetected gaps dropped to 3.7%. Additionally, the average difference between the measured gap sizes in the low-resolution and high-resolution SEM images 20, 40 decreases from 3.8 nm to 2.1 nm after passing through the network 10.

Another way to illustrate the resolution improvement is reported in the spatial frequency analysis shown in FIG. 40. This FIG. compares the magnitudes of the spatial frequencies for the low-resolution SEM images 20 and high-resolution SEM images 50 as well as those of the network output images 40. From this comparative analysis one can see that the deep neural network 10 enhances the high frequency details of the input SEM image 20 such that the spatial frequency distribution of the network output image 40 is consistent with the high-resolution SEM image 50; including the spatial frequencies that are aliased in the input image 20 due to the large pixel size.

With reference to FIG. 1, in one embodiment the trained deep neural network 10 receives an electron microscopy input image 20 (e.g., a SEM input image). The electron microscopy input image 20 is obtained using an electron microscope 110. The trained deep neural network 10 outputs or generates an output image 40 that has improved resolution as compared to the input image. In one embodiment, the images having improved resolution that are output by the deep neural network 10 have frequency spectra that substantially match higher resolution images of the same field-of-view (i.e., the gold standard training images). The system and method described herein rapidly outputs an improved output image 40 as explained herein. In one preferred embodiment, the trained deep neural network is a Convolution Neural Network (CNN). For example, in one preferred embodiment as is described herein, the trained, neural network 10 is a GAN-trained deep neural network.

It should be appreciated that the trained neural network 10 may be used with other microscope device 110 modalities other than those specifically recited in the experimental data disclosed herein. This includes a holographic microscopy device 110, a coherent microscopy device 110, a dark-field microscopy device 110, multi-photon microscopy device 110, an optical coherence tomography (OCT) microscopy device 110, a confocal microscopy device 110. Further, as explained herein, in some embodiments the "low" or "lower" resolution image 20 that is input to the trained deep neural network 10 may itself be image enhanced or super-resolved in some embodiments. For example, a slightly or moderately super-resolved image 20 may be input to the trained deep neural network 10 to even further increase to resolution of the output image 40 as compared to the super-resolved input image 20.

While embodiments of the present invention have been shown and described, various modifications may be made without departing from the scope of the present invention. The invention, therefore, should not be limited, except to the following claims, and their equivalents.

What is claimed is:

1. A microscopy method comprising:
   providing a trained deep neural network that is executed by software using one or more processors of a computing device, the trained deep neural network trained with a training set of non-fluorescence images comprising co-registered pairs of high-resolution microscopy images or image patches of a sample and their corresponding low-resolution microscopy images or image patches of the same sample;
   inputting a non-fluorescence microscopy input image of a second sample to the trained deep neural network;

outputting an output image of the second sample from the trained deep neural network, the output image having improved one or more of spatial resolution, depth-of-field, signal-to-noise ratio, and/or image contrast; and wherein the non-fluorescence microscopy input image comprises one of a bright-field microscopy image, a holographic microscopy image, a dark-field microscopy image, and an optical coherence tomography (OCT) image.

2. The microscopy method of claim 1, wherein the trained deep neural network comprises a trained convolutional neural network (CNN).

3. The method of claim 2, wherein the trained CNN is trained using a training set of non-fluorescence images and wherein a parameter space of the CNN is established during the training by optimization of a statistical transformation between the low-resolution microscopy images or image patches and the high-resolution microscopy images or image patches.

4. The method of claim 3, wherein the trained CNN is trained as a generative adversarial network (GAN) model comprising first and second sub-networks trained simultaneously, wherein the first sub-network comprises a generative model configured to enhance the input low-resolution images or image patches and the second sub-network comprises a discriminative model configured to return an adversarial loss to a resolution-enhanced image or image patch, resulting from the generative model.

5. A microscopy method comprising:
providing a trained deep neural network that is executed by software using one or more processors of a computing device, the trained deep neural network trained with a training set of non-fluorescence histopathological slide images of tissue comprising co-registered pairs of high-resolution microscopy images or image patches of a tissue sample and their corresponding low-resolution microscopy images or image patches of the same tissue sample;
inputting a non-fluorescence microscopy input histopathological slide image of a second sample of tissue to the trained deep neural network; and
outputting an output image of the second sample of tissue from the trained deep neural network, the output image having improved one or more of spatial resolution, depth-of-field, signal-to-noise ratio, and/or image contrast.

6. The microscopy method of claim 5, wherein the high-resolution microscopy images or image patches are obtained by synthesizing a higher resolution image from multiple, sub-pixel shifted low-resolution images.

7. The microscopy method of claim 5, wherein the trained deep neural network is trained using a training set of non-fluorescence images of tissue of the same type of tissue as the second sample.

8. The microscopy method of claim 5, wherein the trained deep neural network is trained using a training set of non-fluorescence images of tissue of a different type of tissue as the second sample.

9. The microscopy method of claim 5, wherein the trained deep neural network is trained using a training set of non-fluorescence images of tissue stained with the same stain or dye used to stain the second sample.

10. The microscopy method of claim 5, wherein the trained deep neural network is trained using a training set of non-fluorescence images of tissue stained with a different stain or dye used to stain the second sample.

11. A microscopy method comprising:
providing a trained deep neural network that is executed by software using one or more processors of a computing device, the trained deep neural network trained with a training set of non-fluorescence images comprising co-registered pairs of high-resolution microscopy images or image patches of a sample and their corresponding low-resolution microscopy images or image patches of the same sample;
inputting a non-fluorescence microscopy input image of a second sample to the trained deep neural network;
outputting an output image of the second sample from the trained deep neural network, the output image having improved one or more of spatial resolution, depth-of-field, signal-to-noise ratio, and/or image contrast; and
wherein the high-resolution microscopy images or image patches are obtained by synthesizing a higher resolution image from multiple, sub-pixel shifted low-resolution images.

12. A microscopy method comprising:
providing a trained deep neural network that is executed by software using one or more processors of a computing device, the trained deep neural network trained with a training set of fluorescence images comprising co-registered pairs of high-resolution microscopy images or image patches of one or more samples and their corresponding low-resolution microscopy images or image patches of the same sample(s), wherein each one of the high-resolution microscopy images or image patches of the sample(s) and their corresponding low-resolution microscopy images or image patches comprises an image that captures at a single image exposure a fluorescence radiation signal emitted from the entire sample that lies within the image;
inputting a fluorescence microscopy input image of a second sample to the trained deep neural network that comprises an image that captures at a single image exposure a fluorescence radiation signal emitted from the entire sample that lies within the image;
outputting an output image of the second sample from the trained deep neural network, the output image having improved one or more of spatial resolution and depth-of-field, signal-to-noise ratio, and/or image contrast.

13. The microscopy method of claim 12, wherein the training set of images comprise histopathological slide images of tissue and the microscopy input image comprises a histopathological slide image of tissue.

14. The microscopy method of claim 13, wherein the trained deep neural network is trained using a training set of images of tissue of the same type of tissue as the second sample.

15. The microscopy method of claim 13, wherein the trained deep neural network is trained using a training set of images of tissue of a different type of tissue as the second sample.

16. The microscopy method of claim 13, wherein the trained deep neural network is trained using a training set of images of tissue stained with the same stain or dye used to stain the second sample.

17. The microscopy method of claim 13, wherein the trained deep neural network is trained using a training set of images of tissue stained with a different stain or dye used to stain the second sample.

18. The microscopy method of claim 12, wherein the fluorescence microscopy input image comprises a multi-photon microscopy image and/or a confocal microscopy image.

19. The microscopy method of claim 12, wherein the trained deep neural network comprises a trained convolutional neural network (CNN).

20. The microscopy method of claim 12, wherein the output image of the second sample has spatial frequency spectra that substantially matches that obtained from a higher-resolution image of the same field-of-view.

21. The microscopy method of claim 12, wherein the second microscopy method comprises one of structured illumination microscopy, stimulated emission depletion (STED) microscopy, or a super-resolution microscopy.

* * * * *